US012804495B2

(12) United States Patent
Mostafa et al.

(10) Patent No.: US 12,804,495 B2
(45) Date of Patent: Nov. 17, 2026

(54) CELLULAR SERVICES SWITCHING SYSTEM FOR WIRELESS DEVICES

(71) Applicant: Apple Inc., Cupertino, CA (US)

(72) Inventors: Amr Abdelrahman Yousef A. Mostafa, Munich (DE); Raj S. Chaugule, Santa Clara, CA (US); Sherman X. Jin, Santa Clara, CA (US); Srirang A. Lovlekar, Fremont, CA (US)

(73) Assignee: Apple Inc., Cupertino, CA (US)

(*) Notice: Subject to any disclaimer, the term of this patent is extended or adjusted under 35 U.S.C. 154(b) by 329 days.

(21) Appl. No.: 18/648,009

(22) Filed: Apr. 26, 2024

(65) Prior Publication Data

US 2025/0031119 A1 Jan. 23, 2025

Related U.S. Application Data

(60) Provisional application No. 63/514,551, filed on Jul. 19, 2023.

(51) Int. Cl.

*H04W 36/12* (2009.01)
*H04W 12/06* (2021.01)
*H04W 60/04* (2009.01)
*H04W 60/06* (2009.01)

(52) U.S. Cl.

CPC ......... *H04W 36/125* (2018.08); *H04W 12/06* (2013.01); *H04W 60/04* (2013.01); *H04W 60/06* (2013.01)

(58) Field of Classification Search

CPC ... H04W 36/125; H04W 12/06; H04W 60/04; H04W 60/06

See application file for complete search history.

(56) References Cited

U.S. PATENT DOCUMENTS

| | | | | |
|---|---|---|---|---|
| 11,197,150 | B2 | 12/2021 | Yoon et al. | |
| 2016/0374040 | A1* | 12/2016 | Kajitani ........... | H04W 56/0015 |
| 2018/0070201 | A1 | 3/2018 | Golla | |
| 2020/0178155 | A1* | 6/2020 | Xu .................... | H04W 36/0072 |
| 2021/0006964 | A1 | 1/2021 | Lee et al. | |
| 2023/0030914 | A1 | 2/2023 | Jung et al. | |
| 2023/0075591 | A1 | 3/2023 | Jin et al. | |

OTHER PUBLICATIONS

PCT Patent Application No. PCT/US2024/036775—International Search Report and Written Opinion dated Jan. 3, 2025.

* cited by examiner

*Primary Examiner* — Wayne H Cai
(74) *Attorney, Agent, or Firm* — DICKINSON WRIGHT RLLP

(57) ABSTRACT

This Application sets forth techniques for cellular service management of cellular wireless service subscriptions for a set of wireless devices, including switching one or more cellular wireless service subscription among different wireless devices in the set of mobile wireless devices based on user-initiated triggers and/or autonomously when one or more cellular service switching criteria are satisfied.

20 Claims, 32 Drawing Sheets

INDIRECT CELLULAR SERVICE ACCESS

DIRECT CELLULAR SERVICE ACCESS

CELLULAR SERVICES SWITCHING SYSTEM FOR WIRELESS DEVICES

CROSS-REFERENCE TO RELATED APPLICATIONS

The present application claims the benefit of U.S. Provisional Application No. 63/514,551, entitled "CELLULAR SERVICES SWITCHING SYSTEM FOR WIRELESS DEVICES," filed Jul. 19, 2023, the content of which is incorporated by reference herein in its entirety for all purposes.

FIELD

The described embodiments set forth techniques for cellular service management of cellular wireless service subscriptions for a set of wireless devices, including switching one or more cellular wireless service subscription among different wireless devices in the set of mobile wireless devices based on user-initiated triggers and/or autonomously when one or more cellular service switching criteria are satisfied.

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. More recently, integrated SIMs (iSIMs) have been proposed as a type of SIM that integrates directly into device hardware, e.g., a device processor and/or attached memory and/or a system on a chip (SoC) component, without use of a separate eUICC to store the iSIM.

Cellular capability continues to be added to a broad variety of wireless devices. In addition, cellular-capable wireless devices often include non-cellular wireless capability. A user can own and use multiple different wireless devices that each are capable of cellular wireless communication; however, the user may prefer not to subscribe to separate cellular wireless service subscriptions for each wireless device and instead seek to share or re-use a cellular wireless service subscription among multiple wireless devices. A set of wireless devices can be associated with a common user account managed via a cloud-based network service. A user of the set of wireless devices can seek to switch one or more cellular wireless service subscriptions among different wireless devices in the set of wireless devices.

SUMMARY

This Application sets forth techniques for switching cellular wireless service subscriptions among different wireless devices in a set of associated wireless devices. Each wireless device can include a cellular wireless access credential, e.g., a subscriber identity module (SIM), electronic SIM (eSIM), or an integrated SIM (iSIM), installed therein for access to cellular wireless services of a cellular wireless network, where the cellular wireless access credentials, e.g., SIMs/eSIMs/iSIMs, in the wireless devices are associated with a common cellular wireless service subscription. Each wireless device in the set of mobile wireless devices can be associated with a common user account managed by a cloud-based service, e.g., using an iCloud® account that is network accessible to the wireless devices via cloud-based network servers. A software service, referred to as a cellular services switching (CSS) service, is provided on each wireless device in the set of wireless devices and can be used to switch the common cellular wireless service subscription between different wireless devices in the set of wireless devices. The number of wireless devices that can be active and configured to access cellular wireless services associated with the cellular wireless service subscription simultaneously can be limited, e.g., at most one wireless device can have an active status to access cellular wireless services of the cellular wireless service subscription at a given time. Based one or more criteria, the cellular wireless service subscription can be switched from an originating wireless device to a destination wireless device in the set of wireless devices. In some cases, a user triggers switching the cellular wireless service subscription, e.g., via selection at the originating wireless device or at the destination wireless device. In some cases, the cellular wireless service subscription switches autonomously between different wireless devices based on a set of one or more criteria being satisfied. Autonomous switching of the cellular wireless service subscription can provide automatic access tailored to a user's preferences and/or habits. Cellular wireless service subscription information can be preloaded on multiple wireless devices to facilitate switching the cellular wireless service subscription among the multiple wireless devices. There may be no limitation on the number of times that a cellular wireless service subscription is switched between different wireless devices in the set of wireless devices. In some cases, there may be substantially no limitation on the number of wireless devices in the set of wireless devices among which the cellular wireless service subscription may be switched. A mobile network operator (MNO) home subscriber server (HSS) can maintain a list of wireless devices associated with the cellular wireless service subscription and a status indication for each wireless device as i) active and allowed to access cellular wireless services of the cellular wireless service subscription or ii) inactive and disallowed to access cellular wireless services of the cellular wireless service subscription. Wireless devices can be added and removed from the list of wireless devices by a wireless device in the set of wireless devices by communicating with the MNO HSS through an MNO authentication and entitlement server that authenticates the wireless device and determines authority of the wireless device to manage inclusion or exclusion of wireless devices in the set of wireless devices with access to the common cellular wireless service subscription. In some embodiments, multiple cellular wireless service subscriptions are shared among multiple associated wireless devices.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
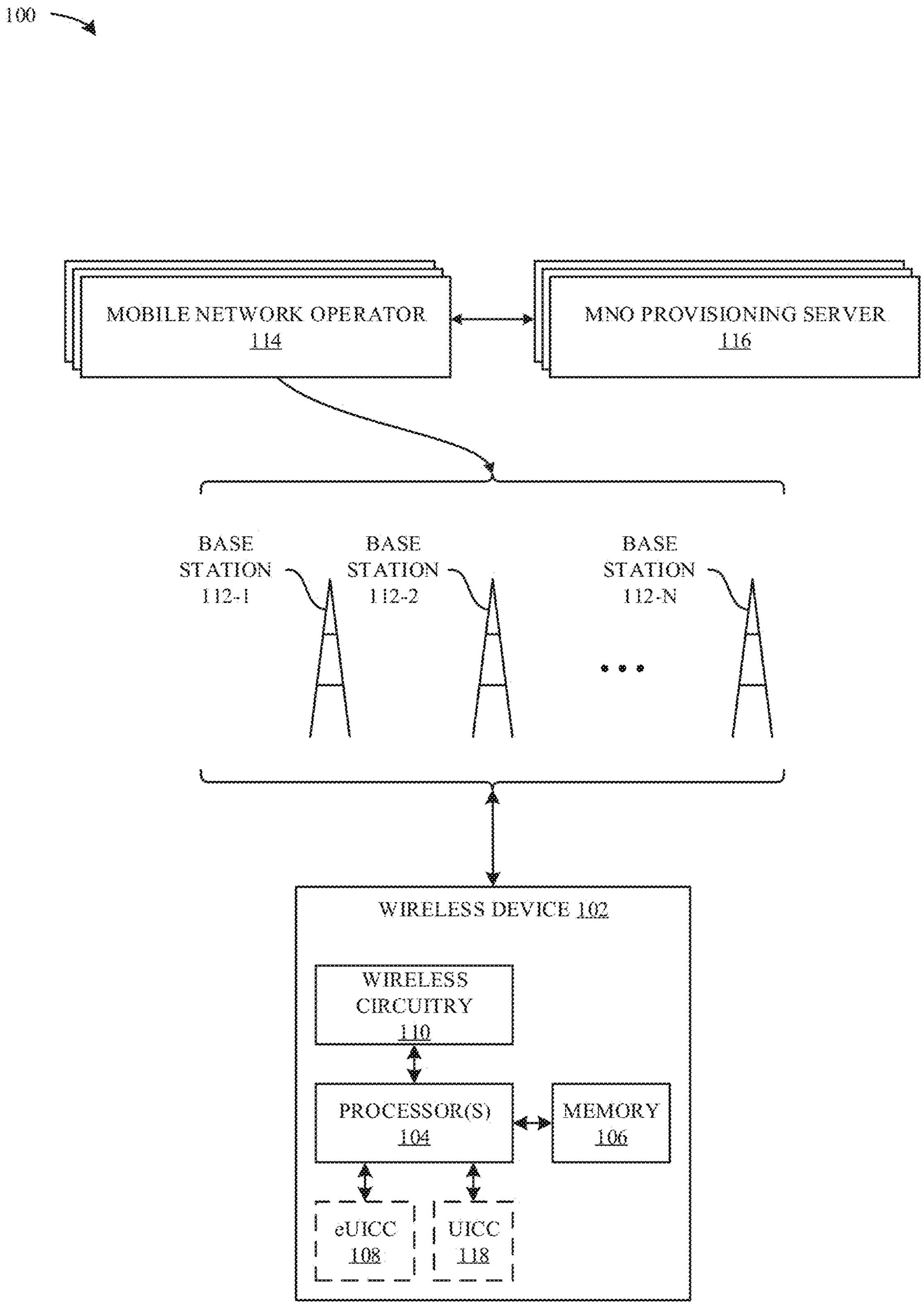
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for switching cellular wireless service subscriptions among different wireless devices in a set of associated wireless devices. Each wireless device can include a cellular wireless access credential, such as a subscriber identity modules (SIM), an electronic SIM (eSIM), or an integrated SIM (iSIM) installed therein for access to cellular wireless services of a cellular wireless network, where the cellular wireless access credentials, e.g., SIMs/eSIMs/iSIMs, in the wireless devices are associated with a common cellular wireless service subscription. Each wireless device in the set of mobile wireless devices can be associated with a common user account managed by a cloud-based service, e.g., using an iCloud® account that is network accessible to the wireless devices via cloud-based network servers. A software service, referred to as a cellular services switching (CSS) service, is provided on each wireless device in the set of wireless devices and can be used to switch the common cellular wireless service subscription between different wireless devices in the set of wireless devices. The number of wireless devices that can configured with an active status to allow access to cellular wireless services associated with the cellular wireless service subscription simultaneously can be limited, e.g., at most one wireless device in the set of associated wireless devices can be configured with an active status for the cellular wireless service subscription at a given time. Other wireless devices in the set of associated wireless devices can store cellular wireless service subscription information and be configured with an inactive status for the cellular wireless service subscription. The active/inactive status can be maintained by one or more network-based servers of a mobile network operator (MNO) associated with the cellular wireless service subscription. Switching the cellular wireless service subscription from an originating wireless device to a destination wireless device can include changing the status between active and inactive at an MNO server and at the wireless devices. The CSS software service on the wireless devices can provide an indication of which wireless devices are associated with a common cellular wireless service subscription, and which of the wireless devices (if any) are active at a given time. The CSS software service can also allow for user-initiated switching of the cellular wireless service subscription among different wireless devices. The CSS software service can further allow for user-configured and/or default configurations for autonomously switching the cellular wireless service subscription among different wireless devices in the set of wireless devices.

Based one or more criteria, the cellular wireless service subscription can be switched from an originating wireless device to a destination wireless device in the set of wireless devices. In some cases, a user triggers switching the cellular wireless service subscription, e.g., via selection through an interface to the CSS software service at the originating wireless device or at the destination wireless device. In some cases, the cellular wireless service subscription switches autonomously between different wireless devices based on a set of one or more criteria being satisfied. Exemplary criteria for autonomous switching of the cellular wireless service subscription from an originating wireless device to a destination wireless device can include for one or more both wireless devices: i) on/off status, ii) battery level, iii) thermal condition, iv) power consumption level, v) maximum battery capability, vi) active/inactive use status, vii) worn/not worn status, viii) user interaction, ix) proximity to other wireless devices, within/out of communication range of other wireless devices, x) at certain locations, and/or xi) within a certain time period of a day. Autonomous switching of the cellular wireless service subscription can provide automatic access tailored to a user's preferences and/or habits.

Cellular wireless service subscription information can be preloaded on multiple wireless devices to facilitate switching the cellular wireless service subscription among the multiple wireless devices. There may be no limitation on the number of times that a cellular wireless service subscription is switched between different wireless devices in the set of wireless devices. In some cases, there may be substantially no limitation on the number of wireless devices in the set of wireless devices among which the cellular wireless service subscription may be switched. A mobile network operator (MNO) managed network server, e.g., a home subscriber server (HSS), can maintain a list of wireless devices associated with the cellular wireless service subscription and a status indication for each wireless device as i) active and allowed to access cellular wireless services of the cellular wireless service subscription or ii) inactive and disallowed to access cellular wireless services of the cellular wireless service subscription.

Wireless devices can be added and removed from the list of wireless devices by a wireless device in the set of wireless devices by communicating with the MNO managed network server, e.g., the HSS, through an MNO authentication and entitlement server that authenticates the wireless device and determines authority of the wireless device to manage inclusion or exclusion of one or more wireless devices in the set of wireless devices to access cellular wireless services of the common cellular wireless service subscription. In some embodiments, multiple cellular wireless service subscriptions are shared among multiple associated wireless devices. For example, a user can maintain two different cellular wireless service subscriptions and associate a first set of wireless devices to access a first cellular wireless service subscription and a second set of wireless device to access a second cellular wireless service subscription. The first and second sets of wireless devices can be the same, overlapping, or distinct.

In some embodiments, CSS management of one or more cellular wireless service subscriptions for one or more wireless devices can occur at a user device, e.g., via a laptop computer, interacting with one or more MNO managed network servers. CSS management can include causing cellular wireless service for a cellular wireless service subscription to switch from a first (originating) wireless device to a second (destination) wireless device. In some cases, CSS management is performed to switch which wireless device is active for the cellular wireless service subscription. CSS management can be realized through a device associated with a common user account, where the device need not have cellular wireless capability, e.g., such as a laptop computer. CSS management can also occur via one of the wireless devices in the set of one or more wireless devices that are associated with a common user account, e.g., a cloud service account and/or an MNO cellular wireless service subscription account. A CSS software service can provide for controlling cellular services switching for one or more cellular wireless service subscriptions. In some embodiments, a user can dedicate a cellular wireless service subscription to a particular wireless device, e.g., a mobile phone, and an additional cellular wireless service subscription to be shared among one or more additional wireless devices, e.g., among a set of wearable wireless devices. Cellular service subscription information may be loaded and maintained in at least one wireless device of a set of associated wireless devices to provide CSS management, independent of whether the cellular wireless service subscription will be activated on the at least one wireless device providing the CSS management. For example, a first wireless device can be loaded with cellular wireless service subscription information for multiple cellular wireless service subscriptions, and the loaded cellular wireless service subscription information can be maintained at least in part by the first wireless device for cellular service switching purposes among other wireless devices in a set of wireless devices. In some embodiments, cellular wireless service subscription information and/or activation status for cellular wireless service subscriptions of a set of wireless devices can be maintained on a cloud service server that is accessible via external networks, e.g., the Internet, for a user to access and initiate cellular wireless service switching between different cellular capable wireless devices. In some cases, one or more of multiple cellular wireless service subscriptions may not be active on any of the set of wireless devices, and a user may later select via the CSS software service on which device (or devices) to activate a particular cellular wireless service subscription. In some embodiments, the CSS software service can be used to deactivate a cellular wireless service subscription on all wireless devices in a set of wireless devices associated with a common user account, such as when the user wants to stop use (or suspend use) of the cellular wireless service subscription on all the associated wireless devices. A cellular wireless service subscription referred to herein includes any cellular wireless network identity module and/or MNO cellular wireless subscription plan that can be used to provide to a user access to cellular wireless network services, independent of whether the access is hardware-based, software-based, and/or virtual-based.

Autonomous switching of cellular wireless service among wireless devices provides for flexible use of a common cellular wireless service subscription across different wireless devices under different conditions. For example, a cellular wireless service subscription on a mobile cellular wireless device, such as an iPhone, can be switched to a cellular-capable wearable wireless device, such as an Apple Watch, when the wearable wireless device is being actively used, e.g., during an exercise routine, outside a range of a non-cellular wireless connection to the mobile cellular wireless device. The cellular wireless service subscription can be switched back to the mobile cellular wireless device when the wearable wireless device returns to within range of a non-cellular wireless connection of the mobile cellular wireless device. In another example, a cellular wireless service subscription can be switched from a mobile cellular wireless device to a cellular modem in a vehicle, when the mobile cellular wireless device is within a predetermined proximity of the vehicle and use of the vehicle is initiated (e.g., switched on). Similarly, the cellular wireless service subscription can be switched back from the vehicle to the mobile cellular wireless device when use of the vehicle is terminated (e.g., switched off) or the mobile cellular wireless device moves outside of the predetermined proximity of the vehicle. In some cases, a default wireless device in the set of wireless devices can be configured as a wireless device to which to switch the cellular wireless service subscription when certain criteria are satisfied, such as low battery on an originating wireless device. In some cases, one or more wireless devices in the set of wireless devices that are reachable by the originating wireless device, e.g., within proximity for a local non-cellular wireless connection can be presented as candidate destination wireless devices for switching the cellular wireless service subscription when certain criteria are satisfied.

These and other embodiments are discussed below with reference to FIGS. 1-11; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a mobile wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The wireless device 102 can represent a cellular-capable computing device (e.g., an iPhone® or an iPad® by Apple®) or a cellular-capable wearable device (e.g., an Apple Watch), the base stations 112-1 to 112-*n* can represent cellular wireless network entities, including evolved NodeBs (eNodeBs or eNBs) for fourth generation (4G) long term evolution (LTE) wireless networks and/or next generation NodeBs (gNodeBs or gNB) for fifth generation (5G) wireless networks (or comparable nodes for future generation wireless networks), where the cellular wireless network entities are configured to communicate with the wireless device 102, and the MNOs 114 can represent different wireless service providers that provide specific cellular wireless services (e.g., voice and data) to which the wireless device 102 can subscribe, such as via a cellular wireless service subscription account for a user of the wireless device 102.

As shown in FIG. 1, the wireless device 102 can include processing circuitry, which can include one or more processor(s) 104 and a memory 106, and baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the wireless device 102 includes an embedded universal integrated circuit card (eUICC) 108 for storing one or more electronic SIMs (eSIMs). In some embodiments, the wireless device 102 includes one or more integrated SIMs (iSIMs) stored securely in hardware of the wireless device 102, e.g., in a processor (104), in memory (106), or in a system on a chip (SoC) component. In some embodiments, the wireless device 102 includes one or more physical UICCs 118, also referred to as Subscriber Identity Module (SIM) cards, in addition to or substituting for one or more eSIMs on the eUICC 108 or one or more iSIMs stored in hardware of the wireless device 102. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through a base station 112 (or via multiple base stations 112), such as one or more of the base stations 112-1 to 112-N illustrated. For example, the eUICC 108 can be configured to store and manage one or more eSIMs for one or more MNOs 114 for different cellular wireless service subscriptions to which the mobile wireless device 102 is subscribed. To be able to access cellular wireless services provided by an MNO 114, can be eSIM reserved for download and installation to the eUICC 108. The eUICC 108 can store one or more eSIMs obtained from one or more associated MNO provisioning servers 116. An MNO provisioning server 116 can be maintained by a manufacturer of the wireless device 102, by an MNO 114, by a third party entity, or the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel. Similarly, one or more iSIMs can be stored securely in hardware of the wireless device 102 to enable access to cellular wireless services. Switching a cellular wireless service subscription between different wireless devices 102 as described herein can be accomplished using any combination of SIMs, eSIMs, or iSIMs on a set of wireless devices 102.

Figure 2:
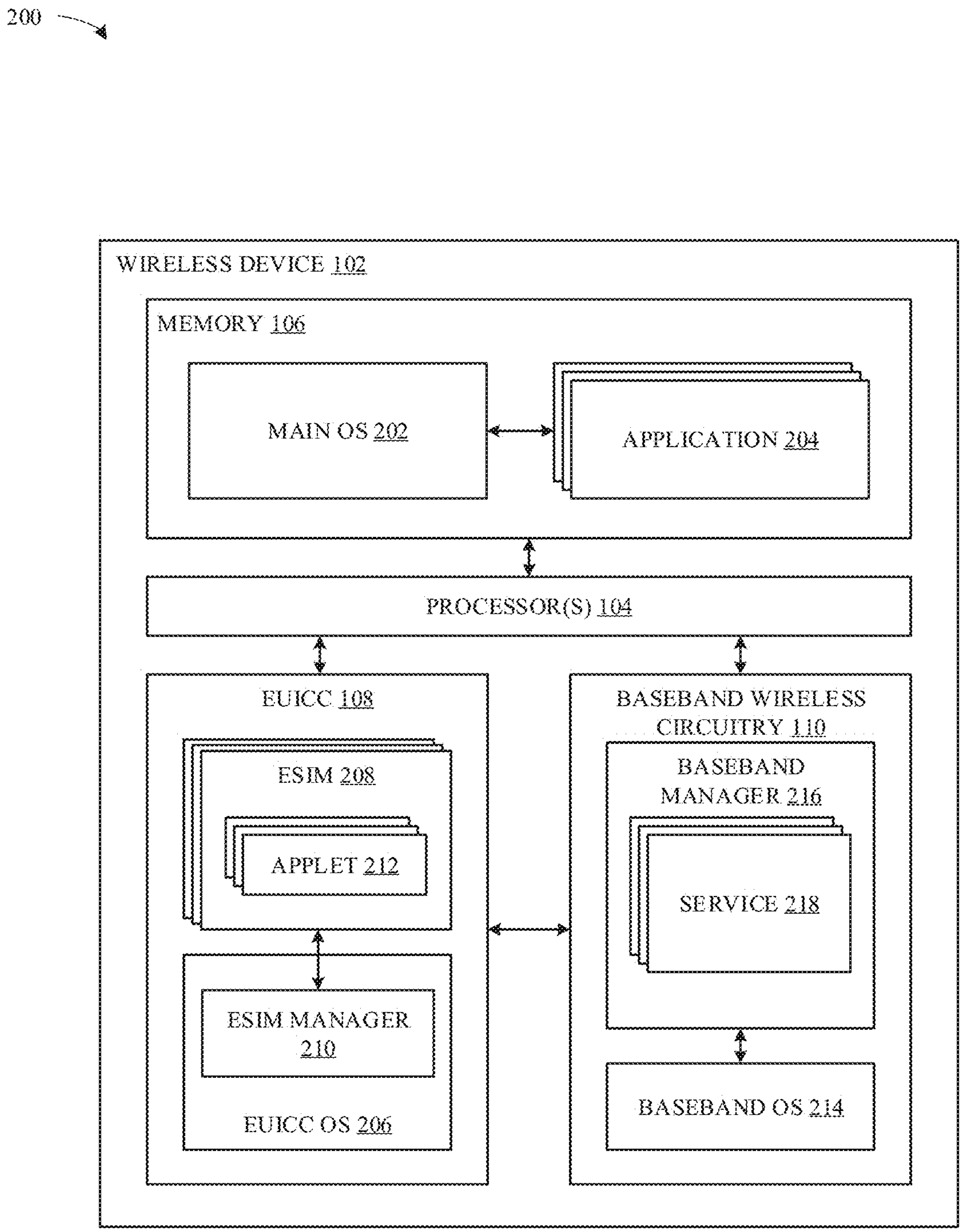
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to cellular wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM/iSIM data) from the MNO provisioning server 116 for purposes of managing eSIMs 208 and/or iSIMs. The baseband manager 216 can be configured to implement services 218, which represents a collection of software modules that are instantiated by way of the various applets 212 of enabled eSIMs 208 that are included in the eUICC 108 and/or iSIMs in the wireless device 102. For example, services 218 can be configured to manage different connections between the wireless device 102 and MNOs 114 according to the different eSIMs 208 that are enabled within the eUICC 108 (and/or different iSIMs enabled in hardware of the wireless device 102). A cellular services switching (CSS) application can reside as an application 204 in the main memory 106 of the wireless device 102 and/or as a service 218 in the baseband wireless circuitry 110. The CSS application can provide for storing cellular wireless access credential, e.g., SIM/eSIM/iSIM, information for access to cellular wireless services and for enabling access to cellular wireless service of an MNO 114, by changing a status of a cellular wireless access credential, e.g., SIM/eSIM/iSIM, to an active state, and for disabling access to cellular wireless service of an MNO 114, e.g., by changing the status of the cellular wireless access credential, e.g., SIM/eSIM/iSIM, to an inactive state. The CSS application can also assist with obtaining and installing a cellular wireless access credential, e.g., an eSIM 208 or iSIM, to gain access to services of an MNO 114. The CSS application can further assist with managing the status of a cellular wireless access credential, e.g., a SIM, an cSIM 208 or an iSIM, which is associated with a common cellular wireless service subscription that may also be used by other wireless devices 102. The CSS application can provide for switching access to cellular wireless services for a cellular wireless service subscription between different wireless devices in a set of wireless devices that are associated with a common cellular wireless service subscription. For one or more iSIMs embedded directly in hardware of the wireless device 102, e.g., in a processor 104, memory 106, or an SoC (not shown), the one or more iSIMs can contain modules that provide similar functionality as those illustrated for cSIMs 208, and supporting eSIM software/firmware, such as the eSIM manager 210 and eUICC OS 206, can be provided by similar software/firmware elements in the hardware of the wireless device 102 in which the one or more iSIMs are stored.

Figure 3A:
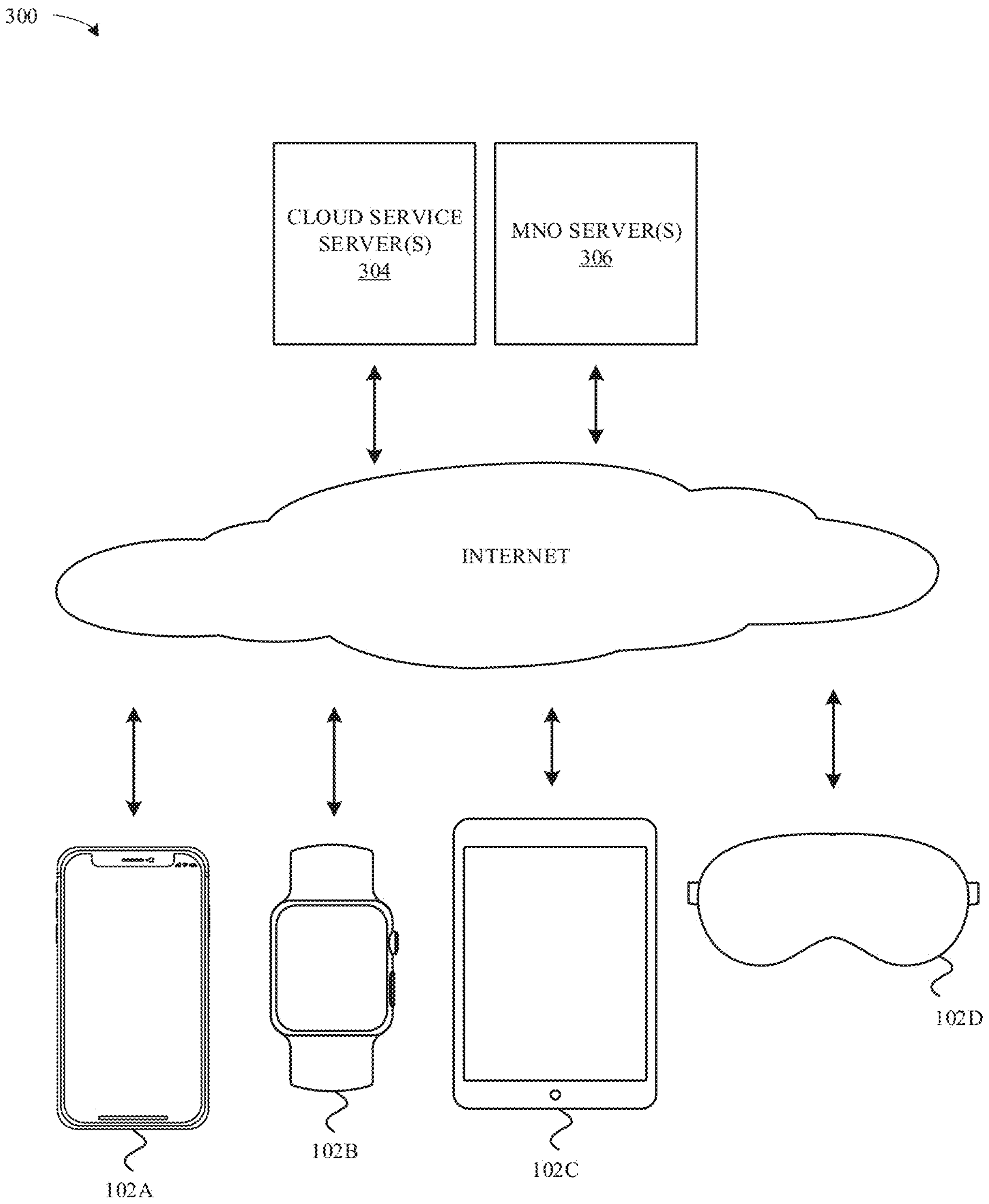
FIG. 3A illustrates a block diagram of an exemplary system for managing switching of a cellular wireless service subscription for a set of wireless devices, according to some embodiments.

FIG. 3A illustrate a diagram 300 of an exemplary system for switching a cellular wireless service subscription among a set of wireless devices 102 that can include any combination of different types of wireless devices 102 that can support cellular wireless connectivity. For example, the set of wireless devices 102 can include a mobile phone 102A, a cellular-capable wearable wireless device 102B, a cellular-capable tablet computer 102C, and/or a cellular-capable wearable computer display 102D. Cellular capability for the wireless devices 102A-102D can be based on SIM cards (UICCs 118) and/or on eSIMs 208 included on eUICCs 108. The wireless devices 102A, 102B, 102C, 102D can each be associated with a common user account, e.g., a cloud-based service account, such as an iCloud® account that is network accessible to the wireless devices 102 via Internet data connections to one or more cloud-based network servers 304. Each wireless device 102 can sign into a common user account and upload to or download information from a cloud-based network server 304. In some embodiments, the information includes cellular wireless service profile information for a cellular wireless service subscription. An MNO 114 can provide cellular wireless services to the set of wireless devices 102 and can manage access to cellular wireless networks to access the cellular wireless services offered by the MNO 114 for a particular cellular wireless service subscription (or for a set of cellular wireless service subscriptions) via one or more MNO servers 306. The MNO servers 306 can include one or more provisioning servers 116 for providing eSIMs 208 (and/or iSIMs) to wireless devices 102 and can include one or more home subscriber servers (HSSs) to manage cellular wireless service subscriptions for the wireless devices 102.

Figure 3B:
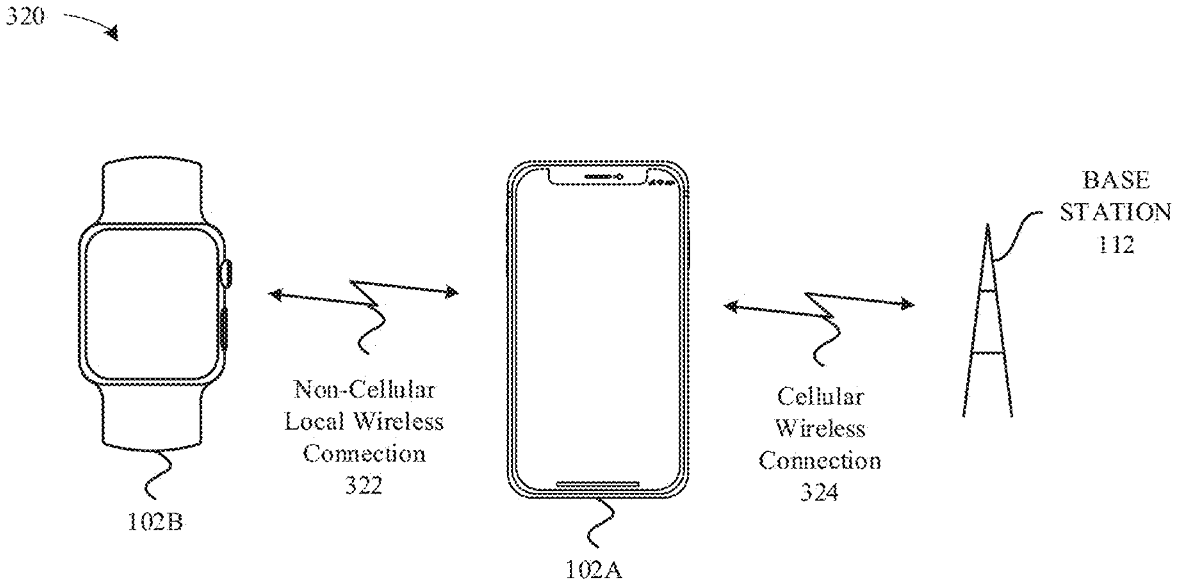
FIG. 3B illustrates a block diagram of examples of cellular wireless service access for a wireless device, according to some embodiments.
Figure 3B:
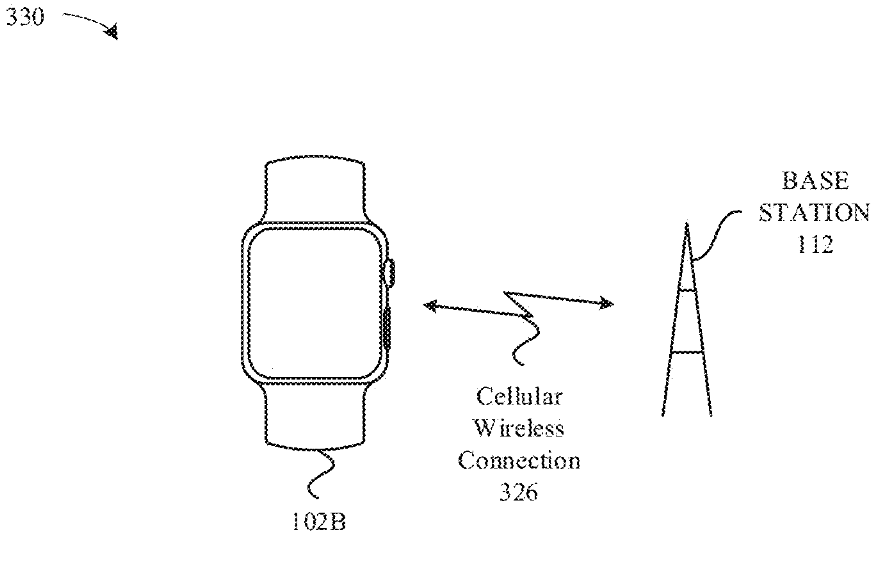

FIG. 3B illustrates diagrams 320, 330 of examples of access to cellular wireless services of an MNO 114 via different types of connections. A first wireless device 102, e.g., a cellular-capable wearable wireless device 102B, can include limited battery capacity and therefore preferably connects to cellular wireless services indirectly through a second wireless device 102, e.g., via a mobile phone 102A. The cellular-capable wearable wireless device 102B can establish a non-cellular local wireless connection 322 to the mobile phone 102A, e.g., using a wireless personal area network (WPAN) connection such as a Bluetooth connection, or using a wireless local area network (WLAN) connection such as a Wi-Fi connection or a peer-to-peer ad hoc WLAN connection. The mobile phone 102A, which can include a larger battery capacity than the cellular-capable wearable wireless device 102B, can establish a cellular wireless connection 324 to a base station 112 of a cellular wireless network to access cellular wireless services of an MNO 114. The indirect access to cellular wireless services provides for an efficient use of limited battery power of the cellular-capable wearable wireless device 102B when the mobile phone 102A is within WPAN/WLAN reach of the cellular-capable wearable wireless device 102B; however, in some circumstances, the cellular-capable wearable wireless device 102B can be used separately from the mobile phone 102A, e.g., out of WPAN/WLAN range of the mobile phone 102A, and a direct cellular wireless connection 326 to the base station 112 to access cellular wireless services of the MNO 114. Presently, a supplemental or separate cellular wireless service subscription can be required for the cellular-capable wearable wireless device 102B to establish the direct cellular wireless connection 326. This additional cellular wireless service subscription can incur additional expense for the user and also can require the wireless device 102 that includes the additional cellular wireless service subscription to be registered (or otherwise connected to) an associated cellular wireless network in order to access cellular wireless services, which can increase power consumption for the wireless device 102. As described further herein, rather than require separate cellular wireless service subscriptions for multiple cellular-capable wireless devices 102, a single cellular wireless service subscription can be switched among different wireless devices 102 based on switching criteria being met. For example, the cellular-capable wearable wireless device 102B and the mobile phone 102A can be configured to use indirect cellular service access via the non-cellular local wireless connection 322 to the mobile phone 102A, which connects to the base station 112 via the cellular wireless connection 324, under select conditions, such as when the cellular-capable wearable wireless device 102B and the mobile phone 102A are within proximity to each other to be able to establish the non-cellular local wireless connection 322, where the cellular wireless service subscription is active on the mobile phone 102A but inactive on the cellular-capable wearable wireless device 102B. The cellular-capable wearable wireless device 102B can be configured to use a direct cellular wireless connection 326 to a base station 112 when the cellular-capable wearable wireless device 102B and the mobile phone 102A are not within proximity to use the non-cellular local wireless connection 322, where the cellular wireless service subscription switched from the mobile phone 102A to the cellular-capable wearable wireless device 102B based on a first set of switching criteria being satisfied. The cellular wireless service subscription can be switched back from the cellular-capable wearable wireless device 102B to the mobile phone 102A based on a second set of switching criteria being satisfied.

Figure 3C:
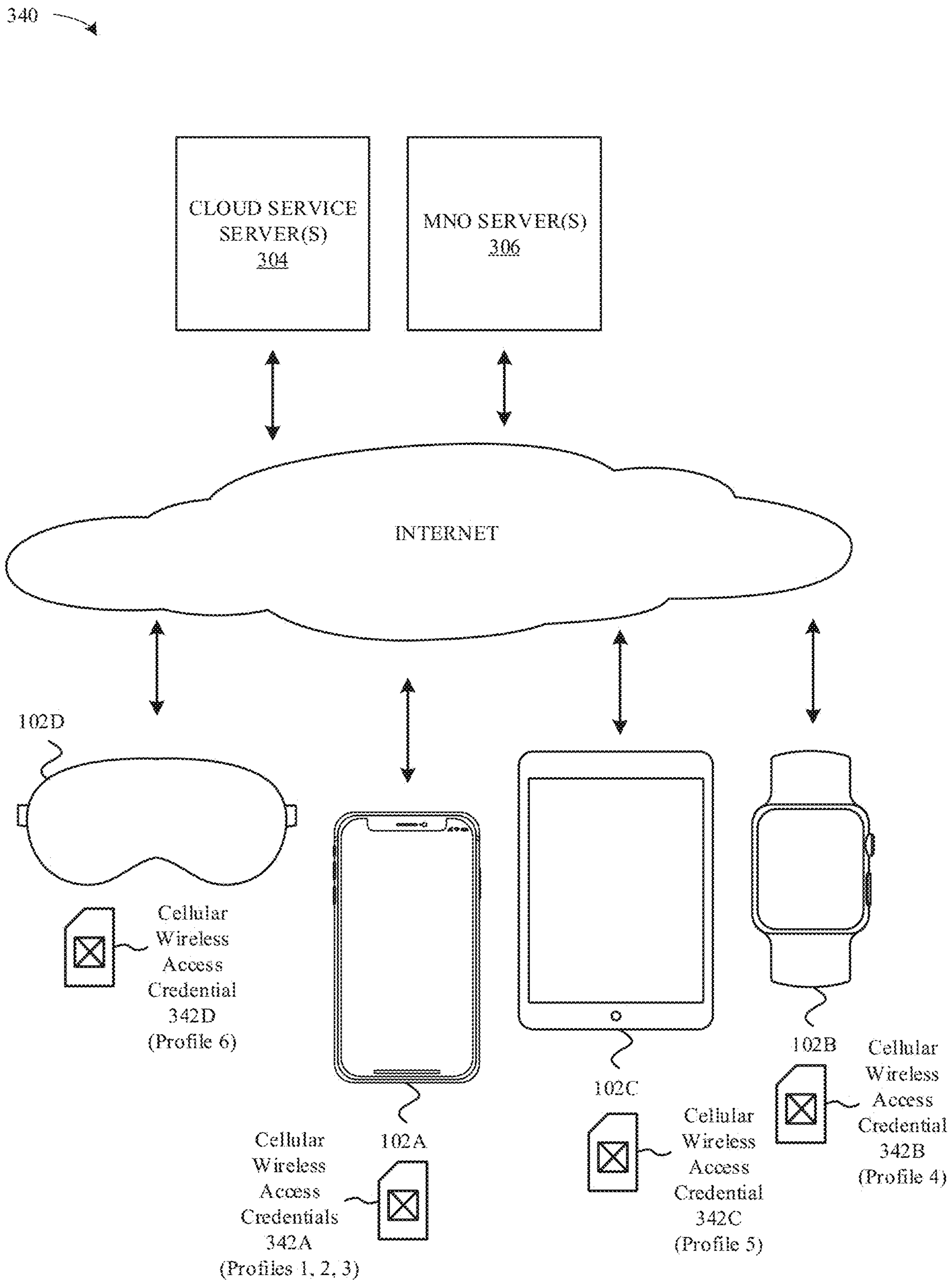
FIG. 3C illustrates an additional block diagram of an exemplary system for managing switching of a cellular wireless service subscription for a set of wireless devices, according to some embodiments.

FIG. 3C illustrates a block diagram 340 of the exemplary system of FIG. 3A with the addition of cellular wireless access credentials, e.g., SIM/eSIM/iSIM profiles, for each of the wireless devices 102A, 102B, 102C, 102D. The mobile phone 102A can include hardware for storing cellular wireless access credentials 342A (profiles 1, 2, 3), such as an eUICC 108 on which are stored one or more eSIMs, one or more physical SIM cards, e.g., one or more UICCs 118A storing SIMs, and/or iSIMs stored in hardware of the wireless device 102A. One of the cellular wireless access credentials 342A on the mobile phone 102A can be associated with a common cellular wireless service subscription that is also shared with (and allows for switching to) other wireless devices 102 in a set of wireless devices 102. The cellular-capable wearable wireless device 102B can include its own cellular wireless access credential 342B (profile 4), e.g., a SIM/eSIM/iSIM, which can be also associated with the common cellular wireless service subscription. Similarly, the cellular-capable tablet computer 102C can include a cellular wireless access credential 342C (profile 5), e.g., a SIM/eSIM/eSIM, which can also be associated with the common cellular wireless service subscription. The cellular-capable wearable computer display 102D can further include a cellular wireless access credentials 342D (profile 6), e.g., a SIM/eSIM/iSIM, with which to access cellular wireless services of the common cellular wireless service subscription. In some cases, one or more of the wireless devices 102 can include a cellular wireless access credential, e.g., SIM/eSIM/iSIM, which is not associated with the common cellular wireless service subscription, e.g., having their own dedicated cellular wireless service subscription or associated with a separate common cellular wireless service subscription shared between another set of wireless devices 102. In some cases, one or more of the wireless devices 102 can have multiple cellular wireless access credentials, SIMs/eSIMs/iSIMs, which each are for different cellular wireless service subscriptions, some of which can be shared with other wireless devices 102. All of the wireless devices 102 can be associated with a common user account managed at one or more cloud service servers 304. Each of the wireless devices 102 can be known to one or more MNO servers 306 that maintain associations of the wireless devices 102 with cellular wireless service subscriptions, including a status for each wireless device associated with a common cellular wireless service subscription, the status indicating whether the wireless device is in an active state (e.g., able to use the common cellular wireless service subscription) or in an inactive state (e.g., preloaded with subscription information but not configured to use the common cellular wireless service subscription). As discussed herein, a common cellular wireless service subscription can allow for one or more wireless devices 102 to use the common cellular wireless service subscription and switch the active state (or active states when multiple wireless devices 102 are allowed to be active simultaneously) among different wireless devices that are each associated with the common cellular wireless service subscription.

Figure 3D:
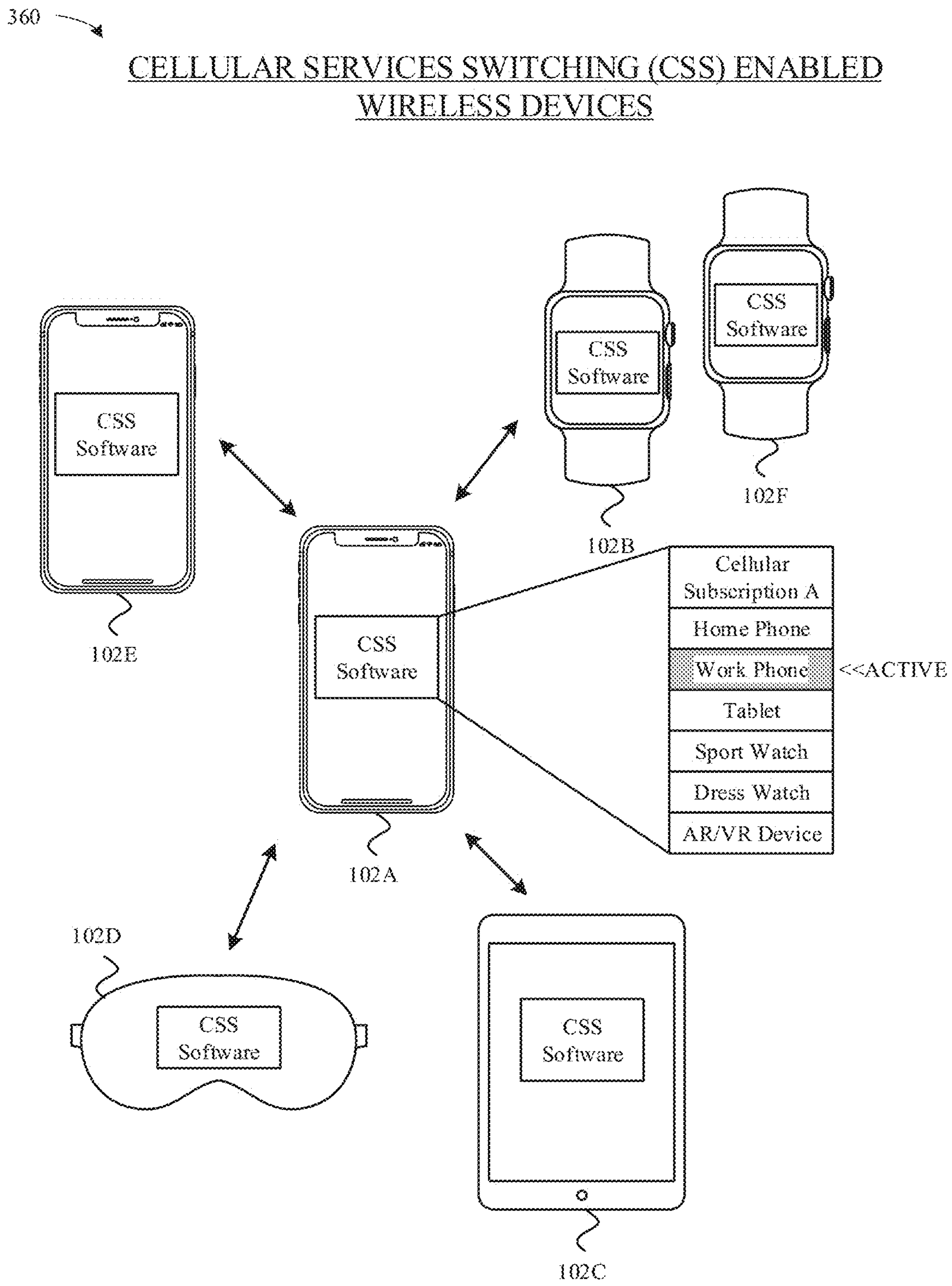
FIG. 3D illustrates an exemplary set of associated wireless devices with cellular services switching (CSS) capability, according to some embodiments.

FIG. 3D illustrates a diagram 360 of an exemplary set of associated wireless devices 102A to 102F with a cellular services switching (CSS) capability enabled thereon. Each wireless device 102 includes CSS software that provides for managing switching of one or more cellular wireless service subscriptions between different wireless devices 102 in the set of associated wireless devices 102A to 102F. A list (or other indication) of wireless devices 102 that are associated with a particular cellular wireless service subscription, e.g., cellular subscription A, can be accessed via respective displays of the wireless devices 102, and the list can include an indication of which (if any) wireless devices have an active status, which indicates that the wireless device 102 with the active status can access cellular wireless services of the cellular wireless service subscription. Other wireless devices 102 in the list can have an inactive status and therefore unable to access cellular wireless services of the cellular wireless service subscription until their status changes to an active status. In some embodiments, multiple wireless devices 102 can have an active status at the same time (not shown). The cellular wireless service subscription can be switched among different wireless devices 102 in the set of wireless devices 102A to 102F, e.g., via selection of a wireless device 102 at an originating wireless device 102A with an active status and/or via selection at a destination wireless device of the other wireless devices 102B to 102F in the set that have an inactive status. In some embodiments, the cellular wireless service subscription can switch between different wireless devices 102 in the set of wireless devices 102A to 102F autonomously when one or more switching criteria are satisfied. Switching the cellular wireless service subscription between different wireless devices 102 changes a status, e.g., from active to inactive for the originating wireless device 102 or from inactive to active for the destination wireless device 102; however, information for the cellular wireless service subscription can remain installed on each of the wireless devices 102A to 102F. Switching the cellular wireless service subscription can include local communication between different wireless devices 102 and between one or more of the wireless devices 102 and one or more MNO servers of a cellular wireless network associated with the cellular wireless service subscription.

Figure 4A:
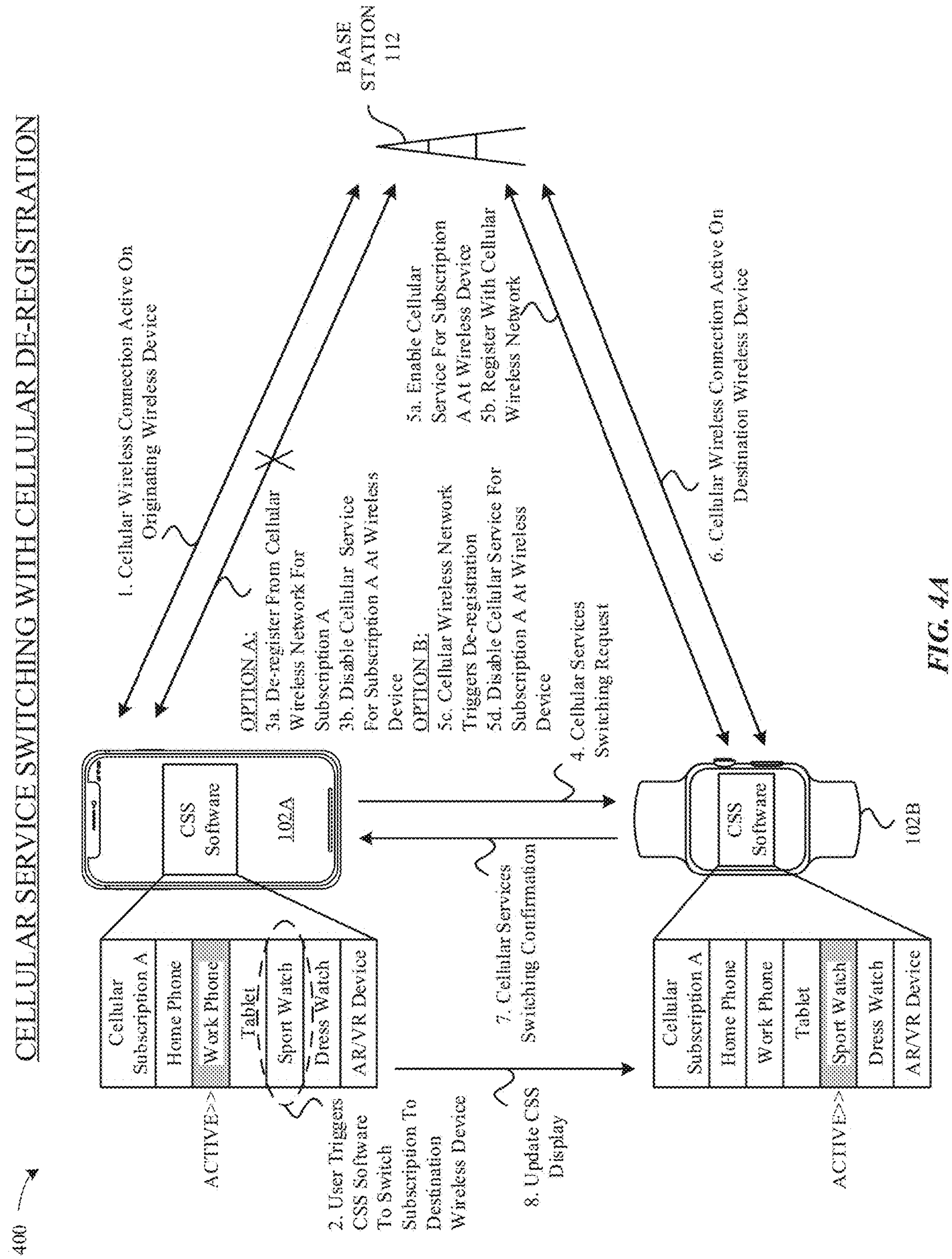
FIG. 4A illustrates a flowchart of an example of switching a cellular wireless service subscription between wireless devices with cellular de-registration, according to some embodiments.

FIG. 4A illustrates a flowchart 400 of an example of switching a cellular wireless service subscription between an originating wireless device 102A and a destination wireless device 102B with cellular de-registration. Initially, the originating wireless device 102A has an active status for cellular subscription A, as indicated via a display of the originating wireless device 102A (designated as a "work phone" by a user of the originating wireless device 102A). A cellular wireless connection to a base station 112 of a cellular wireless network associated with cellular subscription A is also active. A user of the originating wireless device 102A can trigger CSS software on the originating wireless device 102A, e.g. based on selection of a destination wireless device 102B (designated as a "sport watch" by the user of the originating wireless device 102A) from the wireless devices 102 available and indicated via a display of wireless devices 102 that are associated with the cellular subscription A, to switch the cellular wireless service subscription from the originating wireless device 102A to the destination wireless device 102B. De-registration of the originating wireless device 102A from access to the cellular wireless service subscription can occur before the destination wireless device 102B has access (i.e., changed to an active state and registered with the cellular wireless network for access to the cellular wireless services of the cellular wireless service subscription), e.g., via the option A actions, or after the destination wireless device 102B has access, e.g., via the option B actions. Following the option A path, the originating wireless device 102A de-registers from access to the cellular wireless services of the cellular wireless network via the cellular subscription A. In some cases, the originating wireless device 102A can have one or more other active cellular wireless service subscriptions, with the same cellular wireless network and/or with other cellular wireless networks. After de-registration, the originating wireless device 102A can disable cellular wireless service for cellular subscription A at the originating wireless device 102A, e.g., placing the cellular wireless access credential, e.g., SIM/eSIM/iSIM, associated with subscription A in an inactive or disabled state. Access to cellular wireless services for cellular subscription A can then be unavailable at the originating wireless device 102A. Subsequently, the originating wireless device 102A sends to the destination wireless device 102B, via a local non-cellular wireless connection, such as a wireless personal area network (WPAN) connection, e.g., a Bluetooth connection, or a wireless local area network (WLAN) connection, e.g., a Wi-Fi connection or a peer-to-peer ad hoc WLAN connection, a cellular services switching request message. The local non-cellular wireless connection between the originating wireless device 102A and the destination wireless device 102B can be a secure connection, and the originating wireless device 102A, in some cases, can transfer information to the destination wireless device 102B to assist with activation of cellular wireless service for cellular subscription A with the associated cellular wireless network. The information can be included with or provided separately from the cellular services switching request message. In some embodiments, information transferred from the originating wireless device 102A to the destination wireless device 102B can include cellular access information to speed establishment of a cellular wireless connection, such as a last active radio access technology (RAT), parameters of a service cell, e.g., radio frequency (RF) band, carrier frequency, cell identifier (ID) value, which are useful for camping on a base station 112 of the cellular wireless network. Additional information can include available cell measurements, such as RF bands, radio frequencies, identified cells for one or more cellular wireless networks observed by the originating wireless device 102A. In some embodiments, cellular wireless service subscription information for cellular subscription A is pre-loaded on the destination wireless device 102B. In some embodiments, cellular wireless service subscription information for cellular subscription A can be provided by the originating wireless device 102A to the destination wireless device 102B, e.g., an international mobile subscriber identity (IMSI) value used by the originating wireless device 102A, an integrated circuit card identifier (ICCID) value of the cellular wireless access credential, e.g., SIM/eSIM/iSIM, used by the originating wireless device 102A, a local area identity (LAI) value of a public land mobile network (PLMN) associated with cellular subscription A, an emergency number, and/or cellular subscription security related information. After receiving the cellular services switching request message, the destination wireless device 102B enables a cellular service capability for the cellular wireless service subscription, e.g., cellular subscription A, at the destination wireless device 102B, such as by enabling, activating, or placing into an active state a cellular wireless access credential, e.g., SIM/eSIM/iSIM, associated with cellular subscription A. The destination wireless device B can then register for access to cellular wireless services of the cellular wireless network associated with the cellular wireless service subscription. The destination wireless device 102B can use the information pre-stored and/or provided by the originating wireless device 102A to register with the cellular wireless network. In the case (Option A) where cellular de-registration from the cellular wireless network by the originating wireless device 102A occurred before the cellular services switching request was sent, the destination wireless device 102B continues after registration to establish a cellular wireless connection via the base station of the cellular wireless network. In the case (Option B) where cellular deregistration by the originating wireless device 102A did not occur before the destination wireless device 102B registers with the cellular wireless network for access to cellular wireless services of the cellular wireless network, the cellular wireless network can trigger de-registration of the originating wireless device 102A in concert with registering the destination wireless device 102B. In some embodiments, up to a threshold number of wireless devices 102 can be registered for access to cellular wireless services of the cellular wireless service subscription at a given time. In this specific example, only one wireless device 102 is permitted to be actively registered for access to cellular wireless services associated with cellular subscription A at a time, and therefore when registering the destination wireless device 102B for access, the cellular wireless network can also de-register the originating wireless device 102A from access. After being de-registered, the originating wireless device 102A can locally disable cellular wireless service for subscription A at the originating wireless device 102A, e.g., placing the cellular wireless access credential, e.g., SIM/eSIM/iSIM, associated with subscription A in an inactive or disabled state. After having established the active cellular wireless connection with the base station 112 of the cellular wireless network, the destination wireless device 102B can send a cellular services switching confirmation message to the originating wireless device 102A. The CSS software on the destination wireless device 102B and the CSS software on the originating wireless device 102A can update the indications of which wireless device 102 is active from the set of associated wireless devices 102 that are able to use the cellular wireless service subscription.

Figure 4B:
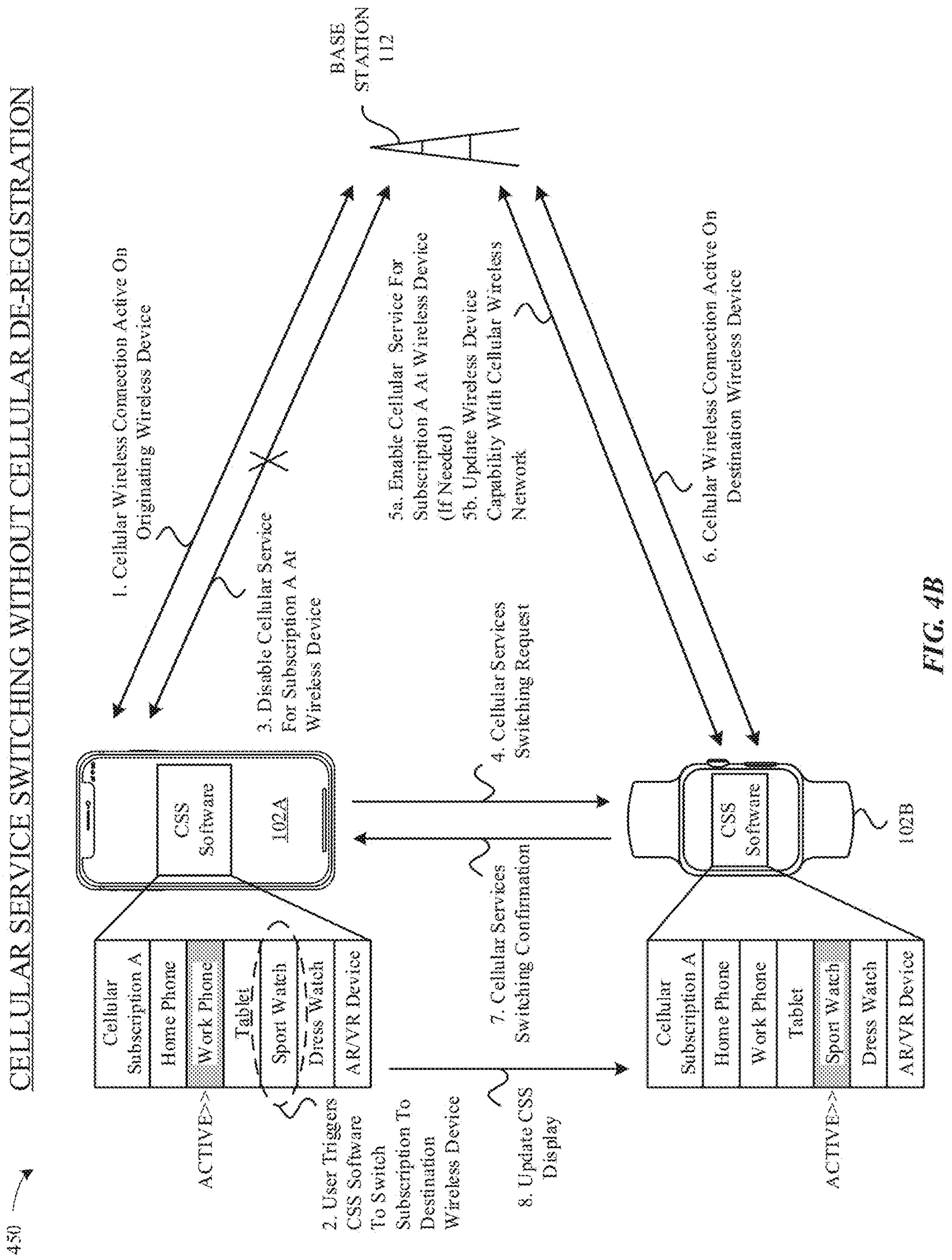
FIG. 4B illustrates a flowchart of an example of switching a cellular wireless service subscription between wireless devices without cellular de-registration, according to some embodiments.

FIG. 4B illustrates a flowchart 450 of an example of switching a cellular wireless service subscription between wireless devices 102 without cellular de-registration. Initially, the originating wireless device 102A has an active status for cellular subscription A, as indicated via a display of the originating wireless device 102A (designated as a "work phone" by a user of the originating wireless device 102A). A cellular wireless connection to a base station 112 of a cellular wireless network associated with cellular subscription A is also active. A user of the originating wireless device 102A can trigger CSS software on the originating wireless device 102A, e.g. based on selection of a destination wireless device 102B (designated as a "sport watch" by the user of the originating wireless device 102A) available and indicated via a display of wireless devices 102 that are associated with the cellular subscription A, to switch the cellular wireless service subscription from the originating wireless device 102A to the destination wireless device 102B. The originating wireless device 102A can then disable cellular wireless service for cellular subscription A at the originating wireless device 102A without performing a de-registration procedure with the cellular wireless network, thereby severing the active cellular wireless connection with the cellular wireless network e.g., placing the cellular wireless access credential, e.g., SIM/eSIM/iSIM, associated with subscription A in an inactive or disabled state. Access to cellular wireless services for cellular subscription A can then be unavailable at the originating wireless device 102A. In some cases, the originating wireless device 102A can have one or more other active cellular wireless service subscriptions, with the same cellular wireless network and/or with other cellular wireless networks. Subsequently, the originating wireless device 102A sends to the destination wireless device 102B, via a local non-cellular wireless connection, such as a wireless personal area network (WPAN) connection, e.g., a Bluetooth connection, or a wireless local area network (WLAN) connection, e.g., a Wi-Fi connection or a peer-to-peer ad hoc WLAN connection, a cellular services switching request message. The local non-cellular wireless connection between the originating wireless device 102A and the destination wireless device 102B can be a secure connection, and the originating wireless device 102A, in some cases, can transfer information to the destination wireless device 102B to assist with activation of cellular wireless service for cellular subscription A with the associated cellular wireless network. The information can be included with or provided separately from the cellular services switching request message. In some embodiments, information transferred from the originating wireless device 102A to the destination wireless device 102B can include cellular access information to speed establishment of a cellular wireless connection, such as a last active radio access technology (RAT), parameters of a service cell, e.g., radio frequency (RF) band, carrier frequency, cell identifier (ID) value, which are useful for camping on a base station 112 of the cellular wireless network. Additional information can include available cell measurements, such as RF bands, radio frequencies, identified cells for one or more cellular wireless networks observed by the originating wireless device 102A. In some embodiments, cellular wireless service subscription information for cellular subscription A is pre-loaded on the destination wireless device 102B. In some embodiments, cellular wireless service subscription information for cellular subscription A can be provided by the originating wireless device 102A to the destination wireless device 102B, e.g., an international mobile subscriber identity (IMSI) value used by the originating wireless device 102A, an integrated circuit card identifier (ICCID) value of the cellular wireless access credential, SIM/eSIM/iSIM, used by the originating wireless device 102A, a local area identity (LAI) value of a public land mobile network (PLMN) associated with cellular subscription A, an emergency number, and/or cellular subscription security related information. In some embodiments, the originating wireless device 102A provides cellular context information to the destination wireless device 102B to allow the destination wireless device 102B to resume the cellular wireless connection previously severed by the originating wireless device 102A. Cellular context information can include: i) non-access stratum (NAS) layer related information, ii) NAS layer security context information, e.g., keys, algorithms, NAS count values, iii) established data sessions, such as 5G protocol data unit (PDU) sessions and corresponding quality of service (QOS) flow(s) configuration and state variables, iv) a tracking area identifier value, a list of registered PLMNs, v) access stratum (AS) layer information, such as a last active RAT and service cell, RF band, carrier RF value, used for camping on the cellular wireless network, available measurements, such as RF bands, radio frequencies, cell identifiers. After receiving the cellular services switching request message, the destination wireless device 102B enables a cellular service capability for the cellular wireless service subscription, e.g., cellular subscription A, if needed, at the destination wireless device 102B, such as by enabling, activating, or placing into an active state a cellular wireless access credential, e.g., a SIM/eSIM/iSIM, associated with cellular subscription A. The destination wireless device B can then register for access to cellular wireless services of the cellular wireless network associated with the cellular wireless service subscription. The destination wireless device 102B can use the information pre-stored and/or provided by the originating wireless device 102A to register with the cellular wireless network. In some cases, the destination wireless device 102B provides updated wireless device capability information with the cellular wireless network, e.g., when the destination wireless device 102B resumes a cellular wireless connection with the cellular wireless network based on information received from the originating wireless device 102A. The destination wireless device 102B can update cellular device capabilities, if different from the originating wireless device 102A, using a mobility and periodic registration update while in a 5G mobility managed (MM) registered state with the cellular wireless network. In some embodiments, the destination wireless device 102B resumes a previously suspended cellular wireless connection that was dropped without de-registration by the originating wireless device 102A.

Figure 5A:
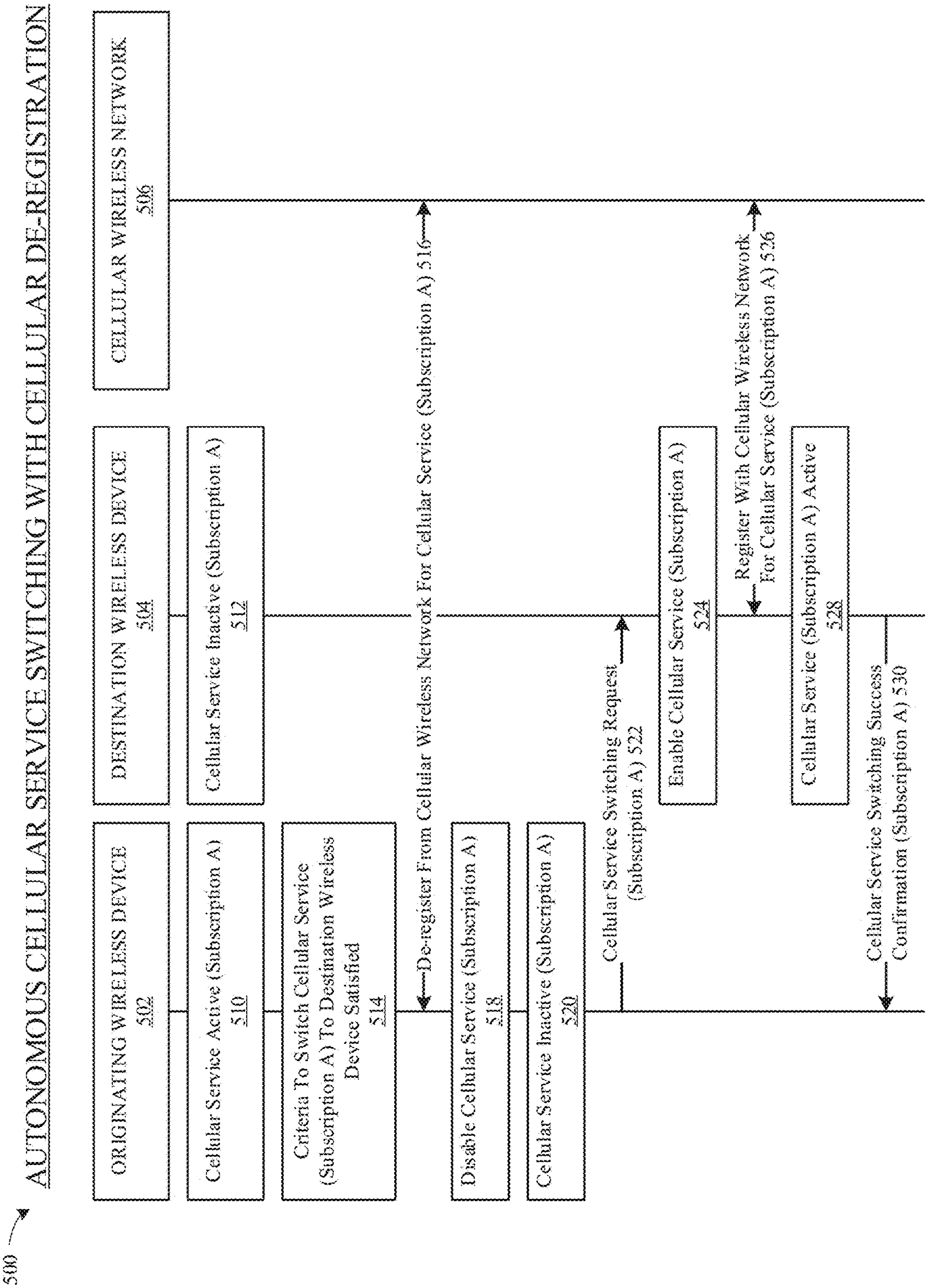
FIG. 5A illustrates a flowchart of an example of autonomous switching of a cellular wireless service subscription between wireless devices with cellular de-registration, according to some embodiments.

FIG. 5A illustrates a flowchart 500 of an example of autonomous switching of a cellular wireless service subscription between wireless devices 102 with cellular de-registration. A user of a set of wireless devices 102, including an originating wireless device 502 and a destination wireless device 504, can configure CSS software to allow switching a cellular wireless service subscription, e.g., cellular subscription A, between wireless devices 102 when certain conditions, e.g., specified by a set of switching criteria, are satisfied. For example, the originating wireless device 502 can be a mobile phone and the destination wireless device 504 can be a cellular-capable vehicle, where both the mobile phone and the cellular-capable vehicle are associated with a common cellular wireless service subscription, e.g., cellular subscription A. The cellular-capable vehicle need not have a separate cellular wireless service subscription. A user can establish switching criteria for when the cellular wireless service subscription can switch between the mobile phone and the cellular-capable vehicle. For example, when i) a cellular wireless service subscription is active on the mobile phone, ii) the cellular-capable vehicle is switched on (or already running), and iii) the mobile phone is within a proximity threshold distance of the cellular-capable vehicle (e.g., within one meter), the cellular wireless service subscription can switch from the mobile phone to the cellular-capable vehicle. In some cases, the mobile phone can establish a non-cellular wireless connection with the cellular-capable vehicle, which can provide a cellular wireless connection for access to cellular wireless services for the mobile phone when the cellular wireless service subscription is active on the cellular-capable vehicle. Similarly, when i) a cellular wireless service subscription is active on the cellular-capable vehicle, and ii) the cellular-capable vehicle is switched off (or stops running) or the mobile phone is not within a proximity threshold distance of the cellular-capable vehicle (e.g., not within one meter), the cellular wireless service subscription can switch from the cellular-capable vehicle to the mobile phone.

As shown in FIG. 5A, initially, a cellular wireless service subscription, e.g., cellular subscription A, is active, at 510, on the originating wireless device 502 and is inactive, at 512, on the destination wireless device 504. At 514, switching criteria for switching the cellular wireless service subscription from the originating wireless device 502 to the destination wireless device 504 are satisfied. At 516, the originating wireless device 502 de-registers with the cellular wireless network 506 for access to cellular wireless services of the cellular wireless service subscription, cellular subscription A, being switched. At 518, the originating wireless device 502 disables access to cellular wireless service for the cellular wireless service subscription, cellular subscription A, being switched. At 520, the cellular wireless service subscription on the originating wireless device 502 is in an inactive state, e.g., the cellular wireless access credential, e.g., SIM/eSIM/iSIM, for cellular subscription A is disabled or placed in an inactive state. At 522, the originating wireless device 502 sends, e.g., via a local non-cellular wireless connection, such as a WPAN or WLAN connection, a cellular service switching request message for cellular subscription A to the destination wireless device 504. In some embodiments, information for activating cellular wireless service for the cellular wireless service subscription, cellular subscription A, is pre-loaded on the destination wireless device 504. In some embodiments, information for assisting the destination wireless device 504 in establishing a cellular wireless connection with the cellular wireless network 506 is provided with the cellular service switching request message. In some embodiments, information for resuming a suspended cellular wireless connection to the cellular wireless network 506 for the cellular wireless service subscription, cellular subscription A, is provided by the originating wireless device 502 to the destination wireless device 504. At 524, access to cellular wireless service for the cellular wireless service subscription, cellular subscription A, is enabled at the destination wireless device 504, e.g., by enabling, activating, or placing in an active state a cellular wireless access credential, e.g., SIM/eSIM/iSIM, associated with the cellular wireless service subscription. At 526, the destination wireless device 504 registers with the cellular wireless network 506 for access to cellular wireless services associated with the cellular wireless service subscription, cellular subscription A. At 528, the cellular wireless service subscription, cellular subscription A, is now active on the destination wireless device 504. At 530, the destination wireless device 504 provides, e.g., via a local non-cellular wireless connection, a cellular service switching confirmation message to the originating wireless device 502 indicating that the cellular wireless service subscription, cellular subscription A, has successfully switched to the destination wireless device 504.

Autonomous switching of a cellular wireless service subscription between different wireless devices 102 in a set of associated wireless devices 102, each wireless device 102 being associated with the cellular wireless service subscription, can be based on one or more criteria being satisfied, which in some cases can be configured by a user of the wireless devices 102 or pre-programmed as default switching criteria available for use by the user of the wireless devices 102. Exemplary switching criteria can include one or more of: i) an originating wireless device 502 being switched off, ii) an originating wireless device 502 battery level satisfying a low battery threshold level, iii) an originating wireless device 502 operating temperature satisfying a critical temperature threshold level (e.g., due to high battery consumption levels), iv) an originating wireless device 502 detecting whether the originating wireless device 502 is in use or in contact with a user thereof, e.g., a cellular-capable wearable wireless device 102B being worn or not worn, a screen display being locked, and no ongoing activities by a user of the originating wireless device 502, v) a destination wireless device 504 detecting whether in use or in contact with a user thereof, vi) a destination wireless device 504 being within a proximity threshold distance of an originating wireless device 502, vii) a destination wireless device 504 having a power level above a threshold difference level of a corresponding power level of an originating wireless device 502, viii) a destination wireless device 504 having a particular set of capabilities compared with an originating wireless device 502, e.g., larger battery capacity, superior (or different) cellular wireless capabilities, such as RF capabilities or support for certain RATs, ix) initiation of a particular application on a destination wireless device 504, x) location of a user of the wireless devices 102 (e.g., home vs. work), or xi) during particular time periods (e.g., early morning, evening, night, weekday vs. weekend).

Figure 5B:
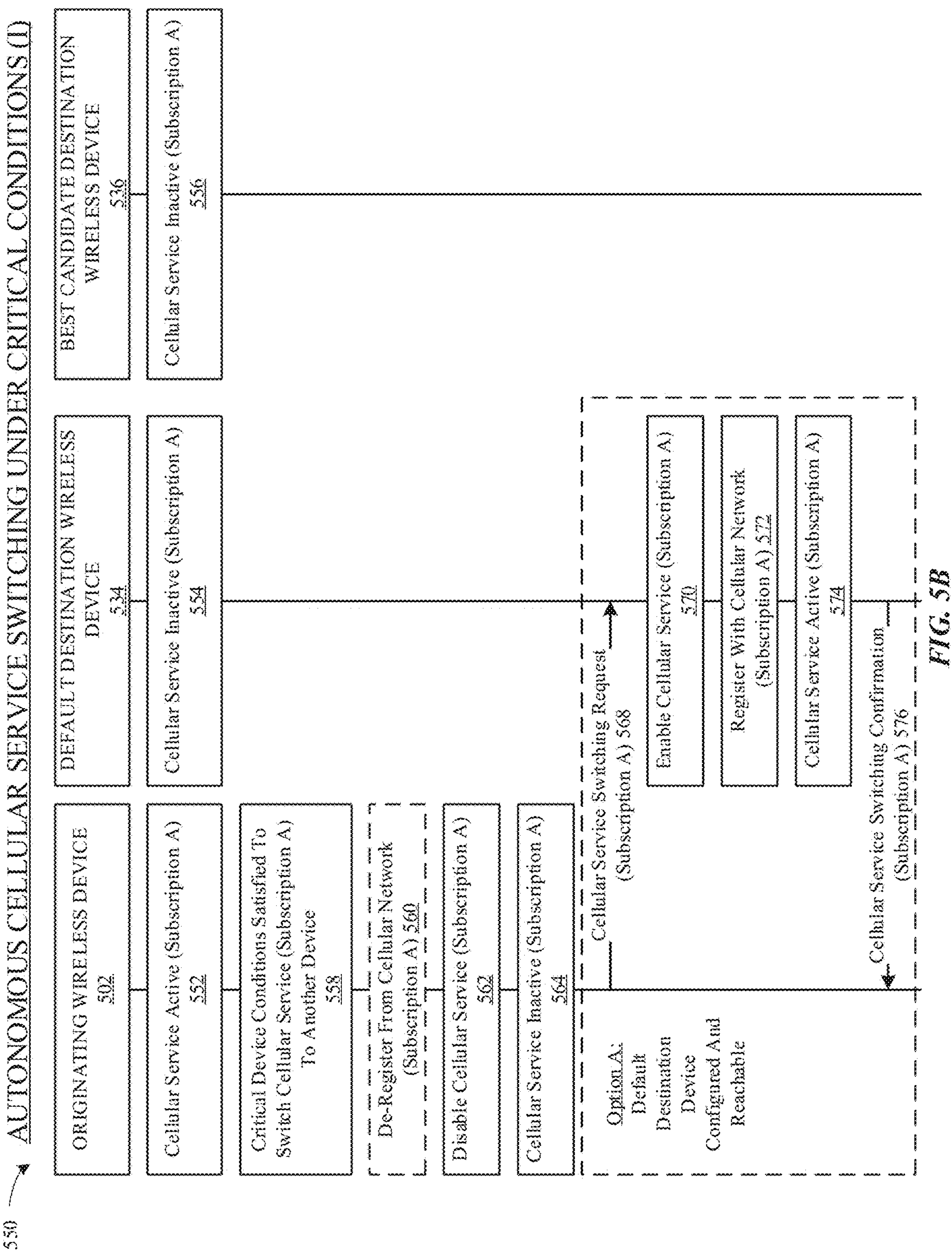
FIGS. 5B and 5C illustrate flowcharts of an example autonomous switching of a cellular wireless service subscription between wireless devices under critical conditions, according to some embodiments.
Figure 5C:
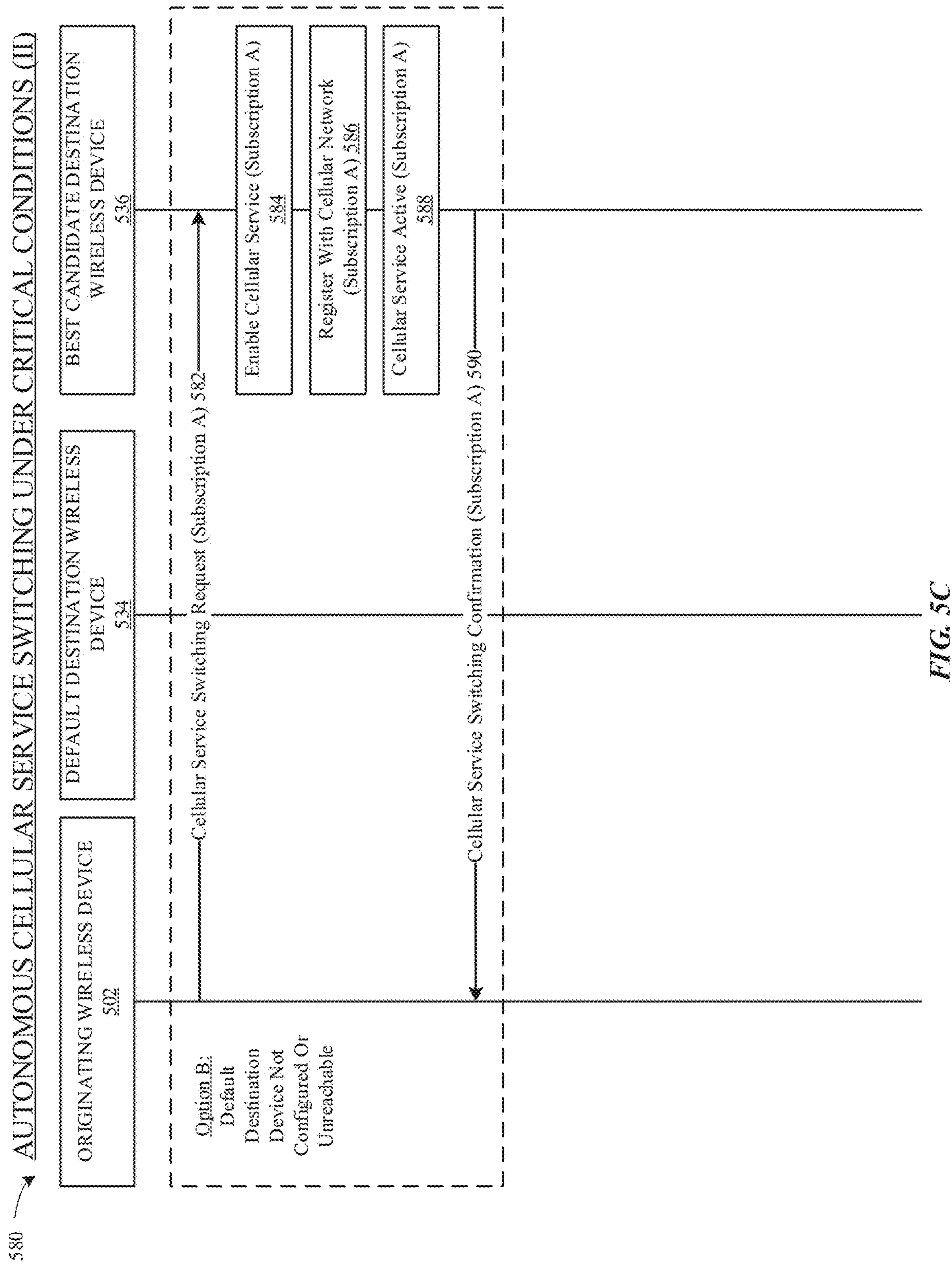

FIGS. 5B and 5C illustrates flowcharts 550, 580 of an example of autonomous switching of a cellular wireless service subscription between wireless devices 102 under critical operating conditions. In some embodiments, a user of a set of wireless devices 102 associated with a cellular wireless service subscription can designate a particular wireless device 102 as a default destination wireless device 534, where when critical operating conditions are satisfied, the cellular wireless service subscription switches to the default destination wireless device 534 from an originating wireless device 502. For example, the user can configure the CSS software to switch the cellular wireless service subscription to a default destination wireless device 534 when a battery level of an originating wireless device 502 satisfies a low battery threshold level. In some embodiments, when a default destination wireless device 534 is not specified or is otherwise not available, another wireless device 102 of the set of associated wireless devices 102 can be selected by the CSS software to which the cellular wireless service subscription can be switched, e.g., to a best candidate destination wireless device 536 having a best battery power level.

Initially, a cellular wireless service subscription, e.g., cellular subscription A, is active, at 552, on an originating wireless device 502, is inactive, at 554, on a default destination wireless device 534, and is inactive, at 556, on a best candidate destination wireless device 536. At 558, critical device conditions for switching the cellular wireless service subscription from the originating wireless device 502 to another wireless device 102, e.g., to default destination wireless device 534 or to the best candidate destination wireless device 536, are satisfied. At 560, in some embodiments, the originating wireless device 502 de-registers from a cellular wireless network for access to cellular wireless services of the cellular wireless service subscription, cellular subscription A. At 562, the originating wireless device 502 disables access to cellular wireless service for the cellular wireless service subscription, cellular subscription A. At 564, the cellular wireless service subscription on the originating wireless device 502 is in an inactive state, e.g., the cellular wireless access credential, e.g., SIM/eSIM/iSIM, for cellular subscription A is disabled or placed in an inactive state.

When the default destination wireless device 534 is configured for cellular wireless service switching of the cellular wireless service subscription, subscription A, and reachable by the originating wireless device 502, following the actions of option A, at 568, the originating wireless device 502 sends, e.g., via a local non-cellular wireless connection, such as a WPAN or WLAN connection, a cellular service switching request message for cellular subscription A to the default destination wireless device 534. In some embodiments, information for activating cellular wireless service for the cellular wireless service subscription, cellular subscription A, is pre-loaded on the default destination wireless device 534. In some embodiments, information for assisting the default destination wireless device 534 in establishing a cellular wireless connection with a cellular wireless network is provided with the cellular service switching request message. In some embodiments, information for resuming a suspended cellular wireless connection to a cellular wireless network for the cellular wireless service subscription, cellular subscription A, is provided by the originating wireless device 502 to the default destination wireless device 534. At 570, access to cellular wireless service for the cellular wireless service subscription, cellular subscription A, is enabled at the default destination wireless device 534, e.g., by enabling, activating, or placing in an active state a cellular wireless access credential, e.g., SIM/eSIM/iSIM, associated with the cellular wireless service subscription. At 572, the default destination wireless device 534 registers with a cellular wireless network for access to cellular wireless services associated with the cellular wireless service subscription, cellular subscription A. At 574, the cellular wireless service subscription, cellular subscription A, is now active on the default destination wireless device 534. At 580, the default destination wireless device 534 provides, e.g., via a local non-cellular wireless connection, a cellular service switching confirmation message to the originating wireless device 502 indicating that the cellular wireless service subscription, cellular subscription A, has successfully switched to the default destination wireless device 534.

When the default destination wireless device 534 is not configured for cellular wireless service switching of the cellular wireless service subscription, subscription A, or is not reachable by the originating wireless device 502, the originating wireless device 502 can determine a best candidate destination wireless device 536, such as one having a best battery level, among reachable wireless devices 102 configured for cellular wireless service switching of the cellular wireless service subscription, subscription A. At 582, the originating wireless device 502 sends, e.g., via a local non-cellular wireless connection, such as a WPAN or WLAN connection, a cellular service switching request message for cellular subscription A to the best candidate destination wireless device 536. In some embodiments, information for activating cellular wireless service for the cellular wireless service subscription, cellular subscription A, is pre-loaded on the best candidate destination wireless device 536. In some embodiments, information for assisting the best candidate destination wireless device 536 in establishing a cellular wireless connection with a cellular wireless network is provided with the cellular service switching request message. In some embodiments, information for resuming a suspended cellular wireless connection to a cellular wireless network for the cellular wireless service subscription, cellular subscription A, is provided by the originating wireless device 502 to the best candidate destination wireless device 536. At 584, access to cellular wireless service for the cellular wireless service subscription, cellular subscription A, is enabled at the best candidate destination wireless device 536, e.g., by enabling, activating, or placing in an active state a cellular wireless access credential, e.g., SIM/eSIM/iSIM, associated with the cellular wireless service subscription. At 586, the best candidate destination wireless device 536 registers with a cellular wireless network for access to cellular wireless services associated with the cellular wireless service subscription, cellular subscription A. At 588, the cellular wireless service subscription, cellular subscription A, is now active on the best candidate destination wireless device 536. At 590, the best candidate destination wireless device 536 provides, e.g., via a local non-cellular wireless connection, a cellular service switching confirmation message to the originating wireless device 502 indicating that the cellular wireless service subscription, cellular subscription A, has successfully switched to the best candidate destination wireless device 536.

Figure 6:
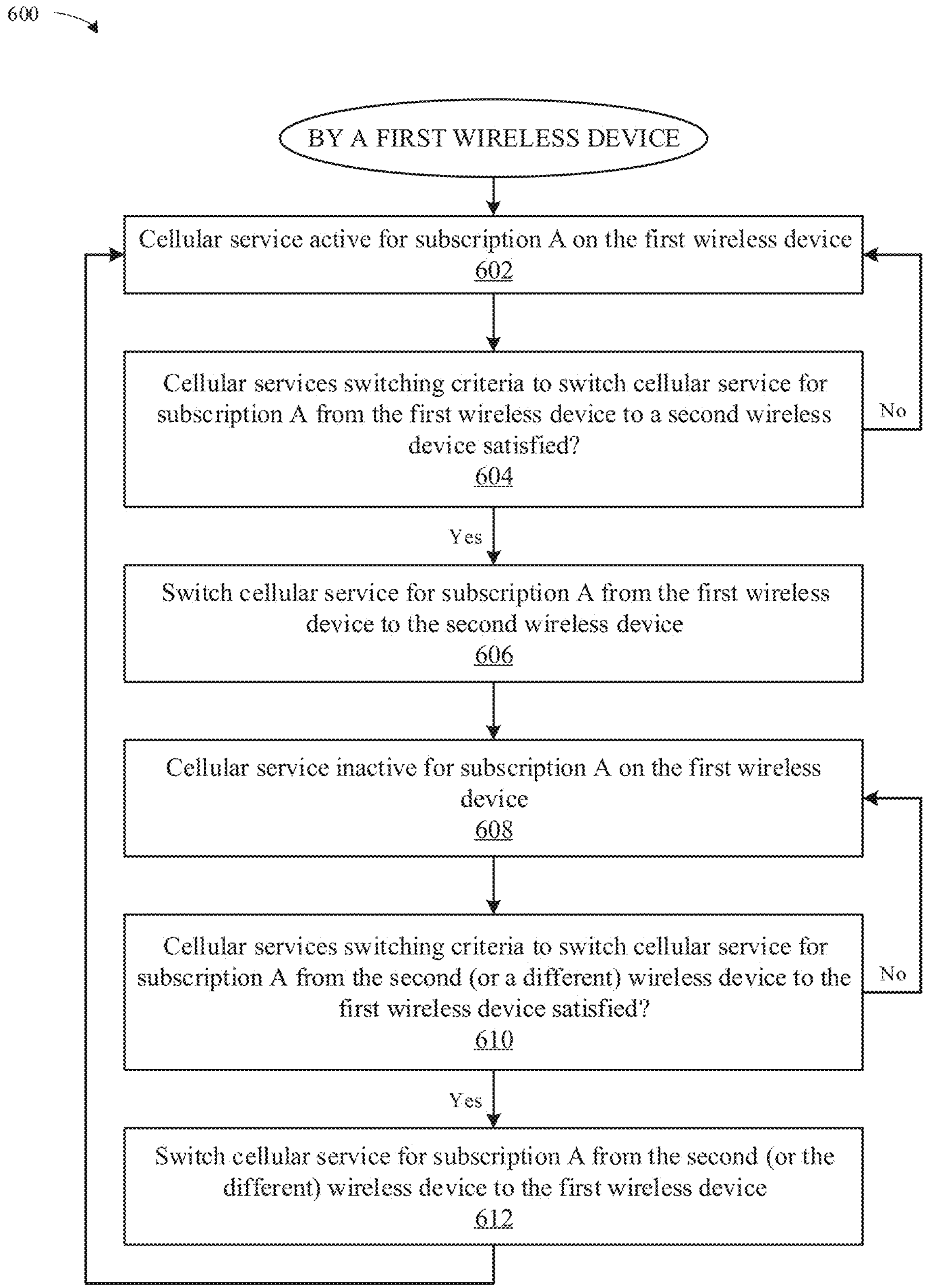
FIG. 6 illustrates a flowchart of an exemplary method for cellular wireless service subscription switching by a wireless device, according to some embodiments.

FIG. 6 illustrates a flowchart 600 of an exemplary method for switching a cellular wireless service subscription by a first wireless device 102. At 602, a cellular wireless service subscription, cellular subscription A, is active on the first wireless device 102. At 604, the first wireless device 102 determines whether cellular services switching criteria to switch the cellular wireless service subscription, cellular subscription A, from the first wireless device 102 (as an originating wireless device) to a second wireless device 102 (as a destination wireless device), are satisfied. When the cellular services switching criteria are not satisfied, the first wireless device 102 returns to the block at 602. When the cellular services switching criteria are satisfied, the first wireless device 102, at 606, initiates switching of the cellular wireless service subscription, cellular subscription A, from the first wireless device 102 to the second wireless device 102. As a result of the cellular wireless service switching, at 608, the cellular wireless service subscription, cellular subscription A, is inactive at the first wireless device 102. At 610, the first wireless device 102 determines whether cellular services switching criteria for switching the cellular wireless service subscription, cellular subscription A, from the second (or from a different) wireless device 102 (as an originating wireless device) to the first wireless device 102 (as a destination wireless device) are satisfied. When the cellular services switching criteria are not satisfied at 610, the first wireless device 102 remains at 608 with the cellular wireless service subscription, cellular subscription A, in an inactive state. When the cellular services switching criteria are satisfied at 610, the first wireless device 102, at 612, switches the cellular wireless service subscription, subscription A, from the second (or from a different) wireless device 102 to the first wireless device 102. Switching of the cellular wireless service subscription, cellular subscription A, can occur as a result of a user action, e.g., selecting to move cellular subscription A via selection in CSS software. Switching of the cellular wireless service subscription, cellular subscription A, can also occur autonomously based on autonomous cellular wireless service switching criteria being satisfied. In some cases, the originating wireless device initiates switching of the cellular wireless service subscription (e.g., a push implementation). In some cases, the destination wireless device initiates switching of the cellular wireless service subscription (e.g., a pull implementation).

Figure 7:
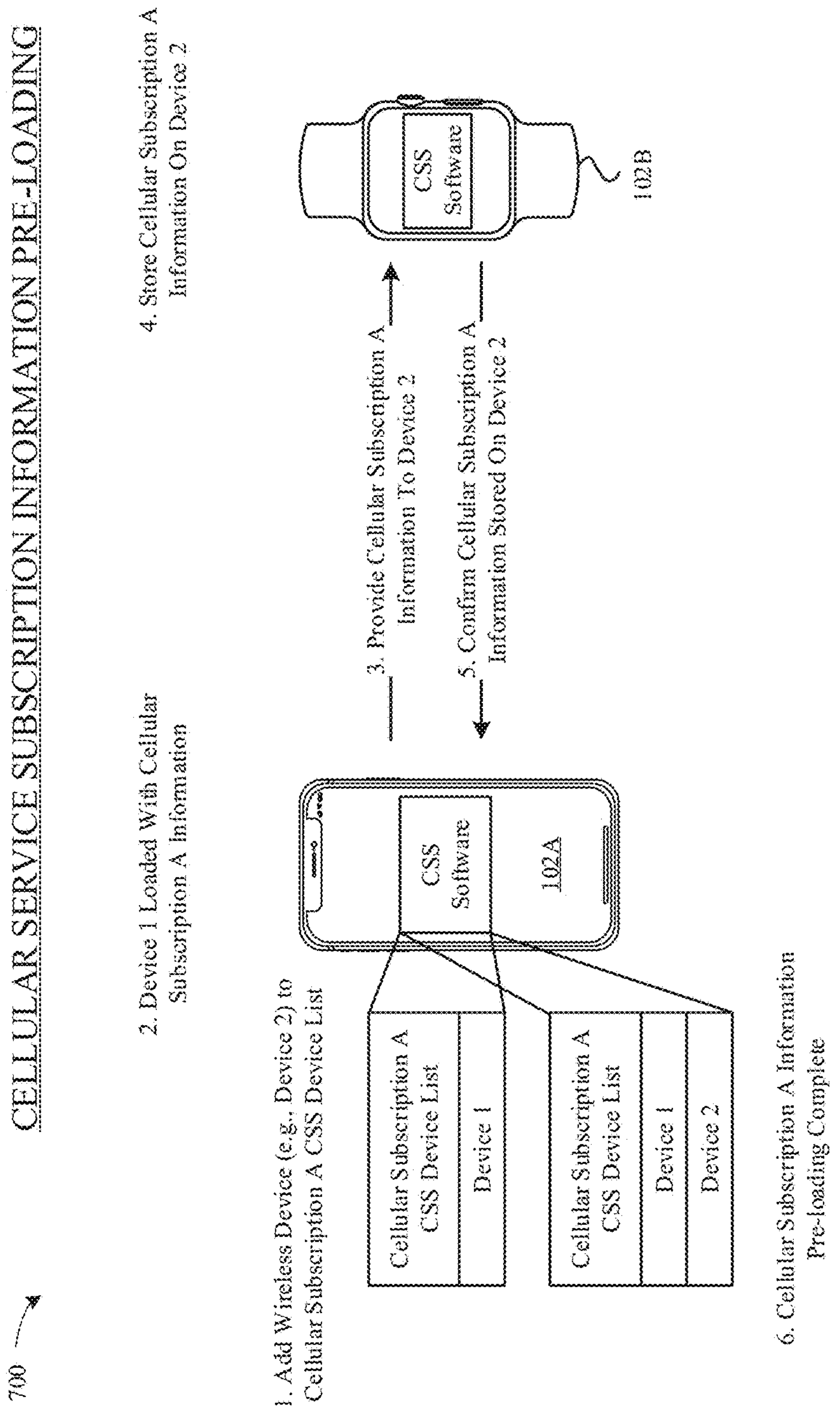
FIG. 7 illustrates a block diagram of an example of pre-loading cellular wireless service subscription information to a wireless device, according to some embodiments.

FIG. 7 illustrates a block diagram 700 of an example of pre-loading cellular wireless service subscription information to a wireless device 102. Cellular wireless service subscription information can be pre-loaded to multiple wireless devices 102 that are associated with a common cellular wireless service subscription, to accelerate switching the cellular wireless service subscription between wireless devices 102. A limited number of wireless devices 102 in a set of associated wireless devices 102 can be in an active state for the cellular wireless service subscription. In some embodiments, at most one wireless device 102 in the set of associated wireless devices can be in the active state for the cellular wireless service subscription. As shown in FIG. 7, a first wireless device 102A (also labeled device 1) has cellular wireless service subscription information (cellular subscription A) loaded thereon. A list of wireless devices 102 associated with the cellular wireless service subscription, cellular subscription A, presented via CSS software on the first wireless device 102A indicates that initially only the first wireless device 102A (device 1) is associated with the cellular wireless service subscription, cellular subscription A. A user of the first wireless device 102A can indicate to add a second wireless device 102B (also labeled device 2) to the set of wireless devices 102 associated with the cellular wireless service subscription, cellular subscription A. In some embodiments, the user can indicate adding the second wireless device 102B via CSS software on the first wireless device 102A. In some embodiments, the user can indicate adding the second wireless device 102B via CSS software on the second wireless device 102B. In some embodiments, cellular wireless service subscription information for the cellular wireless service subscription, cellular subscription A, can be provided to the second wireless device 102B by the first wireless device 102A, e.g., via a local non-cellular wireless connection, such as WPAN or WLAN connection. In some embodiments, the second wireless device 102B obtains cellular wireless service subscription information from one or more network-based servers, such as a cloud-based server with which the first wireless device 102A and the second wireless device 102B share a common account or from an MNO server associated with the cellular wireless service subscription, cellular subscription A. The cellular wireless service subscription information for the cellular wireless service subscription, cellular subscription A, can be stored locally on the second wireless device 102B. The second wireless device 102B can provide a confirmation message to the first wireless device 102A when the cellular wireless service subscription information for the cellular wireless service subscription, cellular subscription A, is stored on the second wireless device 102B. The CSS software on the first wireless device 102A (and on the second wireless device 102B) can be updated to indicate that the second wireless device 102B is now associated with the cellular wireless service subscription, cellular subscription A. When switching the cellular wireless service subscription to the second wireless device 102B, the stored cellular wireless service subscription information can be used (at least in part) to assist with activating (changing the status to an active state) the cellular wireless service subscription, cellular subscription A, at the second wireless device 102B. A user can also remove the second wireless device 102B from the set of wireless devices 102 associated with the cellular wireless service subscription, cellular subscription A, and the cellular wireless service subscription information for the cellular wireless service subscription, cellular subscription A, can be deleted from the second wireless device 102B.

Figure 8A:
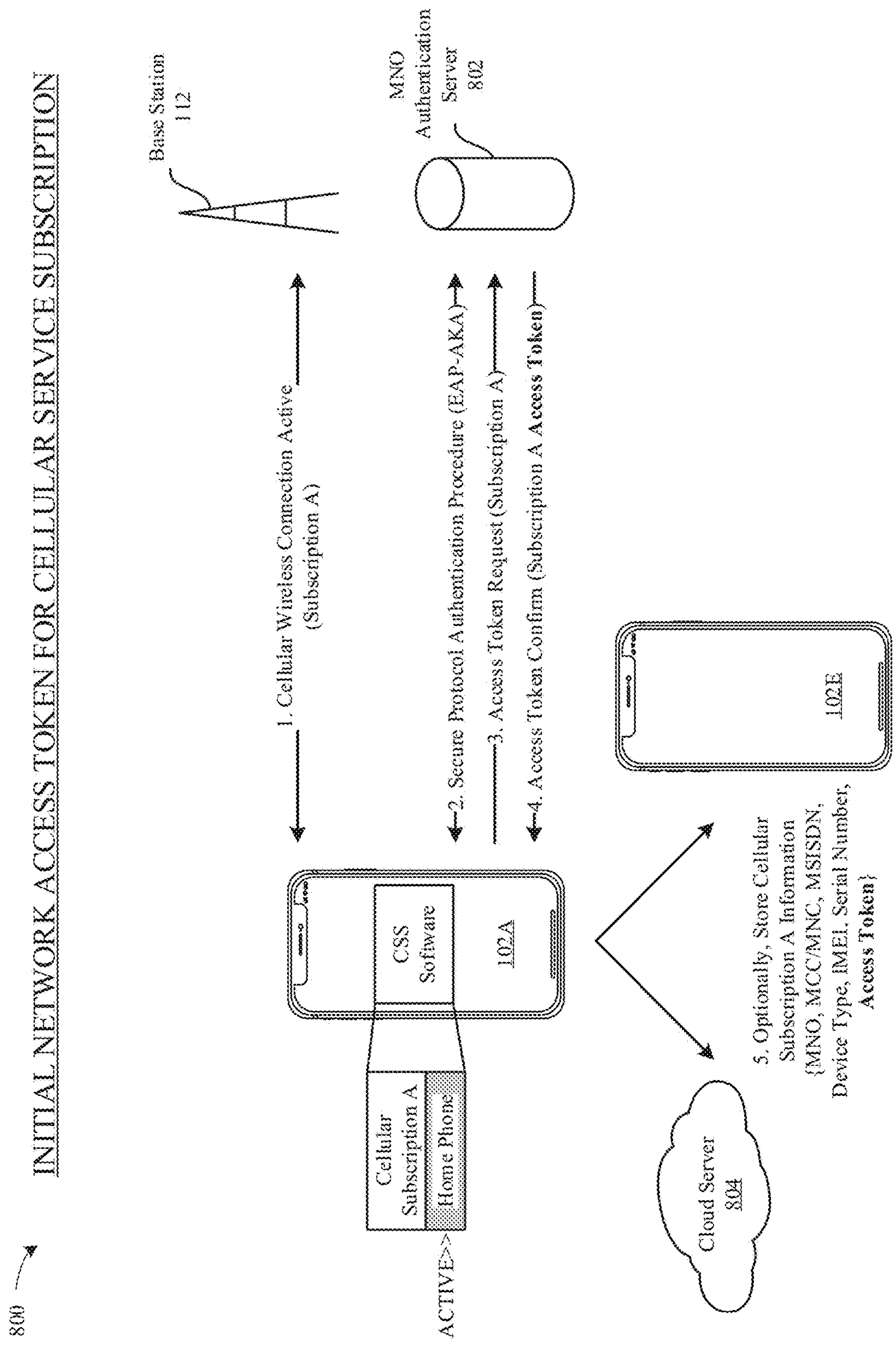
FIG. 8A illustrates a block diagram of an example of obtaining an initial network access token for cellular wireless service subscription by a wireless device, according to some embodiments.

FIG. 8A illustrates a block diagram 800 of an example of obtaining an initial network access token for a cellular wireless service subscription by a wireless device 102A. Initially, the wireless device 102A is connected to a base station 112 of a cellular wireless network with a cellular wireless service subscription, subscription A, being active on the wireless device 102A. The wireless device 102A can perform a secure protocol authentication procedure, e.g., an extensible authentication protocol-authentication and key agreement (EAP-AKA) procedure, with an MNO authentication server 802. After successful secure authentication, the wireless device 102A sends a request to the MNO authentication server 802 for an access token for the cellular wireless service subscription, cellular subscription A. The MNO authentication server 802 can return a confirmation message to the wireless device 102A, the confirmation message including an access token for the cellular wireless service subscription, cellular subscription A. The access token can be later used for a wireless device 102 to authenticate with the MNO authentication server 802 and prove authority to gain access to cellular wireless services associated with the cellular wireless service subscription, cellular subscription A. In some embodiments, the wireless device 102A stores the access token securely at a cloud-network based server 804. In some embodiments, the wireless device 102A stores the access token with additional cellular wireless service subscription information for the cellular wireless service subscription, cellular subscription A, such as an MNO identifier value, a network identifier value, such as a mobile country code (MCC) value and a mobile network code (MNC) value, a phone number, such as a mobile station integrated services digital network (MSISDN) value, a device type indicator, a hardware identifier, such as an international mobile equipment identifier (IMEI) value, and/or a serial number for the wireless device 102A. In some embodiments, the wireless device 102A securely stores the cellular wireless service subscription information for the cellular wireless service subscription, cellular subscription A, including the access token at an additional wireless device 102E, e.g., by sharing over a secure non-cellular wireless connection with the additional wireless device 102E.

Figure 8B:
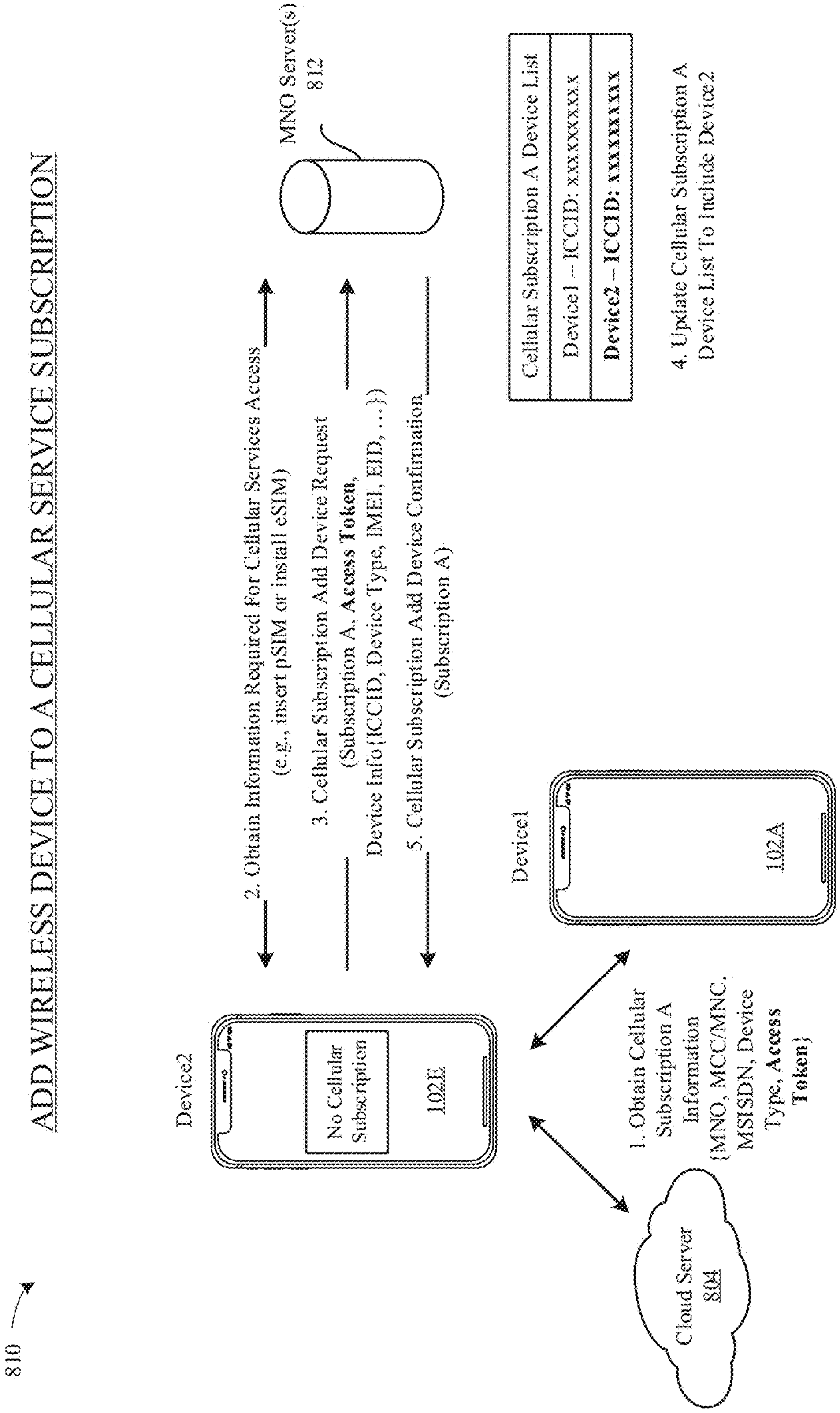
FIG. 8B illustrates a block diagram of an example of adding a wireless device to a cellular wireless service subscription, according to some embodiments.

FIG. 8B illustrates a block diagram 810 of an example of adding a new wireless device 102 to a cellular wireless service subscription. A new wireless device 102E (also labeled as device2) initially does not have a cellular wireless service subscription (e.g., when newly purchased without a cellular wireless service subscription) or does not have access to a particular cellular wireless service subscription, cellular subscription A. The new wireless device 102E obtains cellular wireless service subscription information for the cellular wireless service subscription, cellular subscription A, from a first wireless device 102A (also labeled as device1) or from a cloud-based network server 804. In some embodiments, the cellular wireless service subscription information can be communicated securely directly from the first wireless device 102A to the new wireless device 102E via a local non-cellular wireless connection. In some embodiments, the new wireless device 102E associates with (or is associated with) a common user account shared by the first wireless device 102A and obtains the cellular wireless service subscription information from a cloud-network based server 804 that provides a cloud service, such as iCloud, with the common user account. The cellular wireless service subscription information for cellular subscription A can include an access token, an MNO identifier value, a network identifier value, such as a mobile country code (MCC) value and a mobile network code (MNC) value, a phone number, such as a mobile station integrated services digital network (MSISDN) value, and/or a device type indicator, which can indicate a device type for which the cellular wireless service subscription information is applicable. The new wireless device 102E can also obtain from one or more MNO servers 812 information required for access to cellular wireless services, i.e., obtain a cellular wireless access credential, such as by inserting a physical SIM card (pSIM) or installing an eSIM 208 on an eUICC 108 of the new wireless device 102E or installing an iSIM in hardware of the new wireless device 102E. The new wireless device 102E establishes a connection an MNO server 812 and sends a request message to add the new wireless device 102E to the cellular wireless service subscription, cellular subscription A, indicated in the request message, which also includes the access token, which can be used for authentication with the MNO server 812 and/or for proving authority to have the new wireless device 102E added to the cellular wireless service subscription, cellular subscription A. The request message can further include information specific to the new wireless device 102E, such as an ICCID value for the cellular wireless access credential, e.g., pSIM/eSIM/iSIM, a device type identifier, one or more unique hardware identifiers, e.g., an IMEI value and/or an eUICC identifier (EID) value. The MNO server 812 can (upon authentication of the new wireless device 102E and based at least in part on the access token) add an identifier for the new wireless device 102, e.g., the ICCID value provided in the request message, to a list of wireless devices 102 associated with the cellular wireless service subscription, cellular subscription A. The MNO server 812 can respond to the new wireless device 102E with a confirmation message indicating that the new wireless device 102E has been successfully added to the cellular wireless service subscription, cellular subscription A.

Figure 8C:
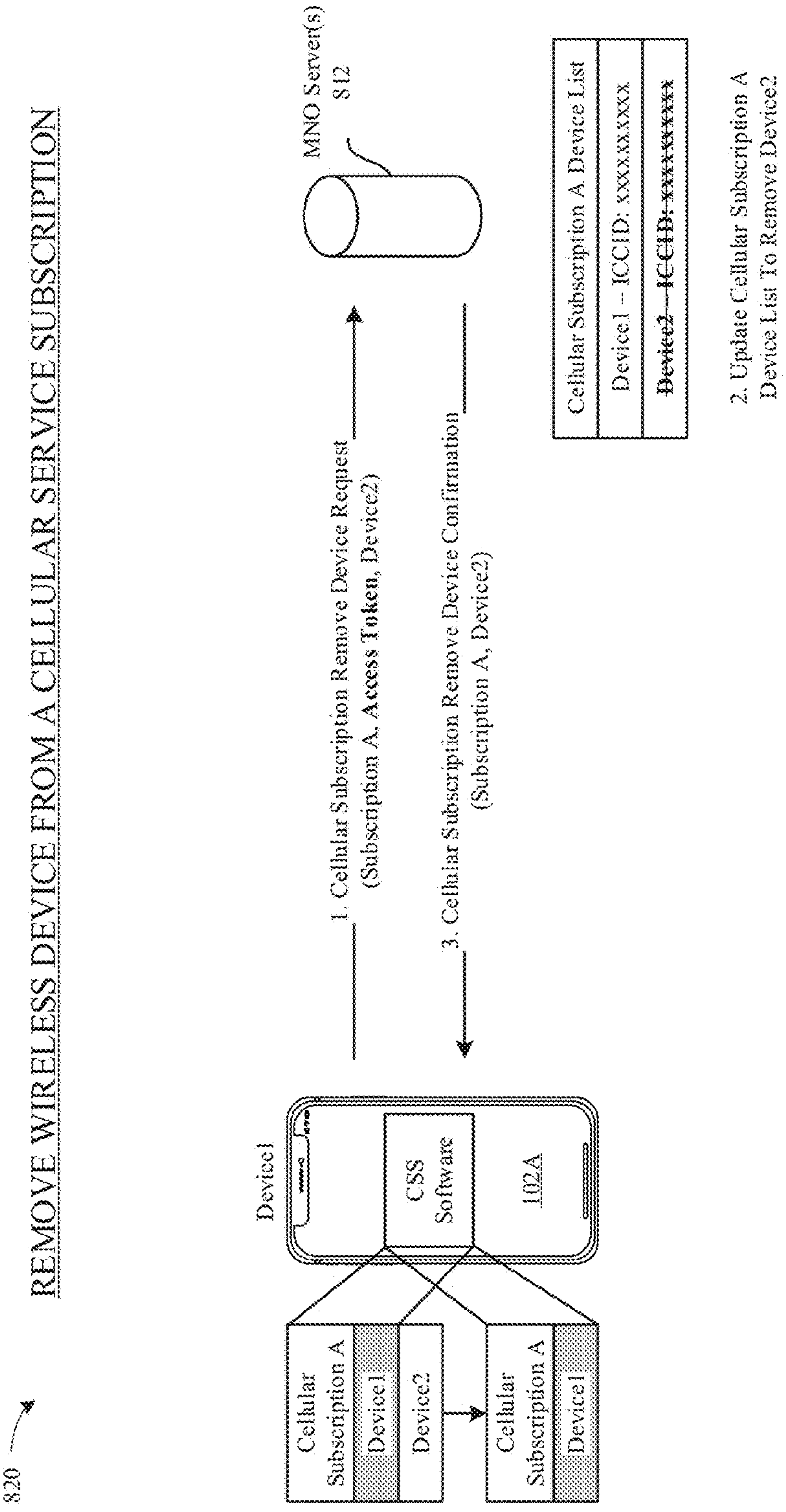
FIG. 8C illustrates a block diagram of an example of removing a wireless device from a cellular wireless service subscription, according to some embodiments.

FIG. 8C illustrates a block diagram 820 of an example of removing a wireless device 102 for a cellular wireless service subscription. Initially, as indicated by a list displayed by CSS software at a first wireless device 102A (also labeled as device1), two wireless devices 102 (labeled as device1 and device2) are associated with the cellular wireless service subscription, cellular subscription A. The first wireless device 102A can send a request message to one or more MNO servers 812 to remove a second wireless device 102 (device2) from the cellular wireless service subscription, cellular subscription A. The request message can include an indicator for the cellular subscription A, an access token for cellular subscription A, and an indicator to specify the second wireless device 102 (device2). The MNO server(s) 812 can determine authorization of the first wireless device 102A (device1) to request removal of the second wireless device 102 (device2) from the cellular wireless service subscription, cellular subscription A based at least in part on the access token included in the request message. The MNO server(s) 812 can update a list of wireless devices 102 associated with cellular subscription A to remove the second wireless device 102 (device2). The MNO server(s) 812 can send a confirmation message to the first wireless device 102A indicating that the second wireless device 102 (device2) has been removed from the set of wireless devices 102 associated with cellular subscription A. Accordingly, the CSS software at the first wireless device 102A can update the list of wireless devices 102 associated with cellular subscription A to reflect removal of the second wireless device 102 (device2).

Figure 8D:
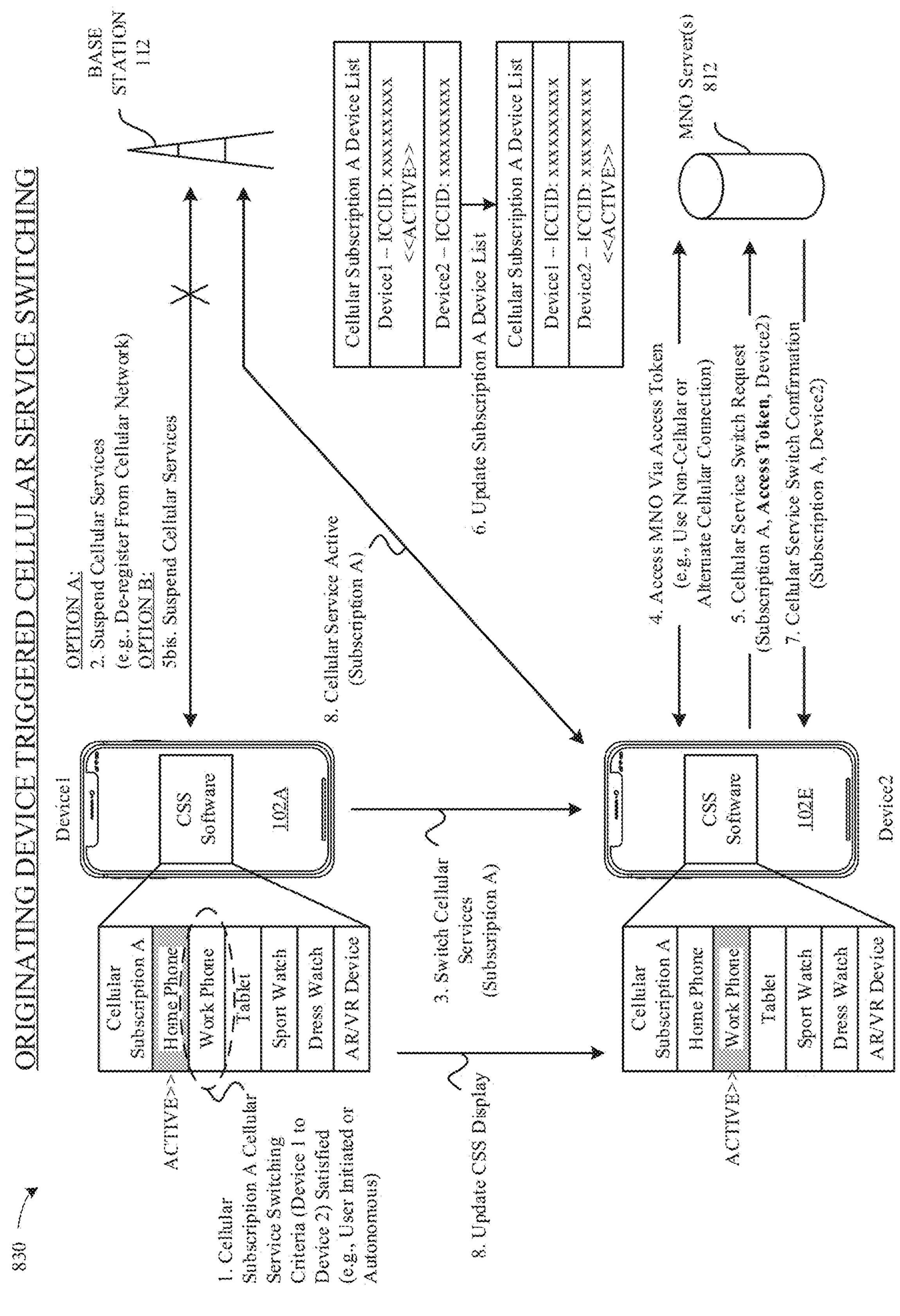
FIG. 8D illustrates a block diagram of an example of cellular service switching between wireless devices triggered by an originating wireless device, according to some embodiments.

FIG. 8D illustrates a block diagram 830 of an example of switching a cellular wireless service subscription between an originating wireless device 102A (also labeled as device 1) and a destination wireless device 102E (also labeled as device2), where the cellular service switching is triggered by the originating wireless device 102A. Initially, the originating wireless device 102A has an active status for cellular subscription A, as indicated via a display of the originating wireless device 102A (designated as a "home phone" by a user of the originating wireless device 102A). A user of the originating wireless device 102A can trigger CSS software on the originating wireless device 102A, e.g. based on selection of the destination wireless device 102E (designated as a "work phone" by the user of the originating wireless device 102A) from the wireless devices 102 available and indicated via a display of wireless devices 102 that are associated with the cellular subscription A, to switch the cellular wireless service subscription, cellular subscription A, from the originating wireless device 102A to the destination wireless device 102E. In some embodiments, switching of the cellular wireless service subscription from the originating wireless device 102A to the destination wireless device 102E can occur autonomously based on a set of cellular service switching criteria being satisfied. In a first option (option A), the originating wireless device 102A suspends cellular wireless service with a base station 112 of a cellular wireless network associated with the cellular wireless service subscription. Suspension of the cellular wireless service can occur before the destination wireless device 102E has access (i.e., changed to an active state and registered with the cellular wireless network for access to the cellular wireless services of the cellular wireless service subscription), e.g., via option A, or after the destination wireless device 102E has access, e.g., via option B. In some embodiments, the originating wireless device 102A deregisters from the cellular wireless network. In some cases, the originating wireless device 102A can have one or more other active cellular wireless service subscriptions, with the same cellular wireless network and/or with other cellular wireless networks.

The originating wireless device 102A can send to the destination wireless device 102E, via a local non-cellular wireless connection, such as a wireless personal area network (WPAN) connection, e.g., a Bluetooth connection, or a wireless local area network (WLAN) connection, e.g., a Wi-Fi connection or a peer-to-peer ad hoc WLAN connection, a cellular services switching request message. The local non-cellular wireless connection between the originating wireless device 102A and the destination wireless device 102E can be a secure connection, and the originating wireless device 102A, in some cases, can transfer information to the destination wireless device 102E to assist with activation of cellular wireless service for cellular subscription A with the associated cellular wireless network. The information can be included with or provided separately from the cellular services switching request message. In some embodiments, information transferred from the originating wireless device 102A to the destination wireless device 102E can include cellular access information to speed establishment of a cellular wireless connection with the base station 112 of the cellular wireless network associated with the cellular wireless service subscription being switched to the destination wireless device 102E. The destination wireless device 102E can use an access token (obtained from the originating wireless device 102A or from a cloud-network based server 804 or already pre-loaded on the destination wireless device 102E) to access one or more MNO servers 812. In some embodiments, the destination wireless device 102E uses a non-cellular wireless connection or an alternate cellular wireless connection to access the MNO server(s) 812. The destination wireless device 102E sends a request message to the MNO server(s) 812 to switch the cellular wireless service subscription, cellular subscription A, to the destination wireless device 102E, where the request message includes an identifier of the cellular wireless service subscription to be switched, an access token associated with the cellular wireless service subscription, and an identifier of the destination wireless device 102E. The MNO server(s) 812 can authenticate the destination wireless device 102E and confirm authority to switch the cellular wireless service subscription, cellular subscription A, to the destination wireless device 102E based at least in part on the access token. In some embodiments, the MNO server(s) 812 can suspend cellular services with the originating wireless device 102A (option B) in association with switching the cellular wireless service subscription, cellular subscription A, to the destination wireless device 102E if not already suspended previously. The MNO server(s) 812 can update the list of wireless devices 102 associated with the cellular wireless service subscription, cellular subscription A, to reflect that the destination wireless device 102E (device2) is in an active state, while the originating wireless device 102A (device2) is in an inactive state. The MNO server(s) 812 can send a confirmation message to the destination wireless device 102E indicating that the cellular wireless service subscription, cellular subscription A, has successfully switched to the destination wireless device 102E. The CSS software on the destination wireless device 102E (and on the originating wireless device 102A) can be updated to indicate that the cellular wireless service subscription, cellular subscription A, is active on the destination wireless device 102E (work phone) and is not active on the originating wireless device 102A (home phone).

Figure 8E:
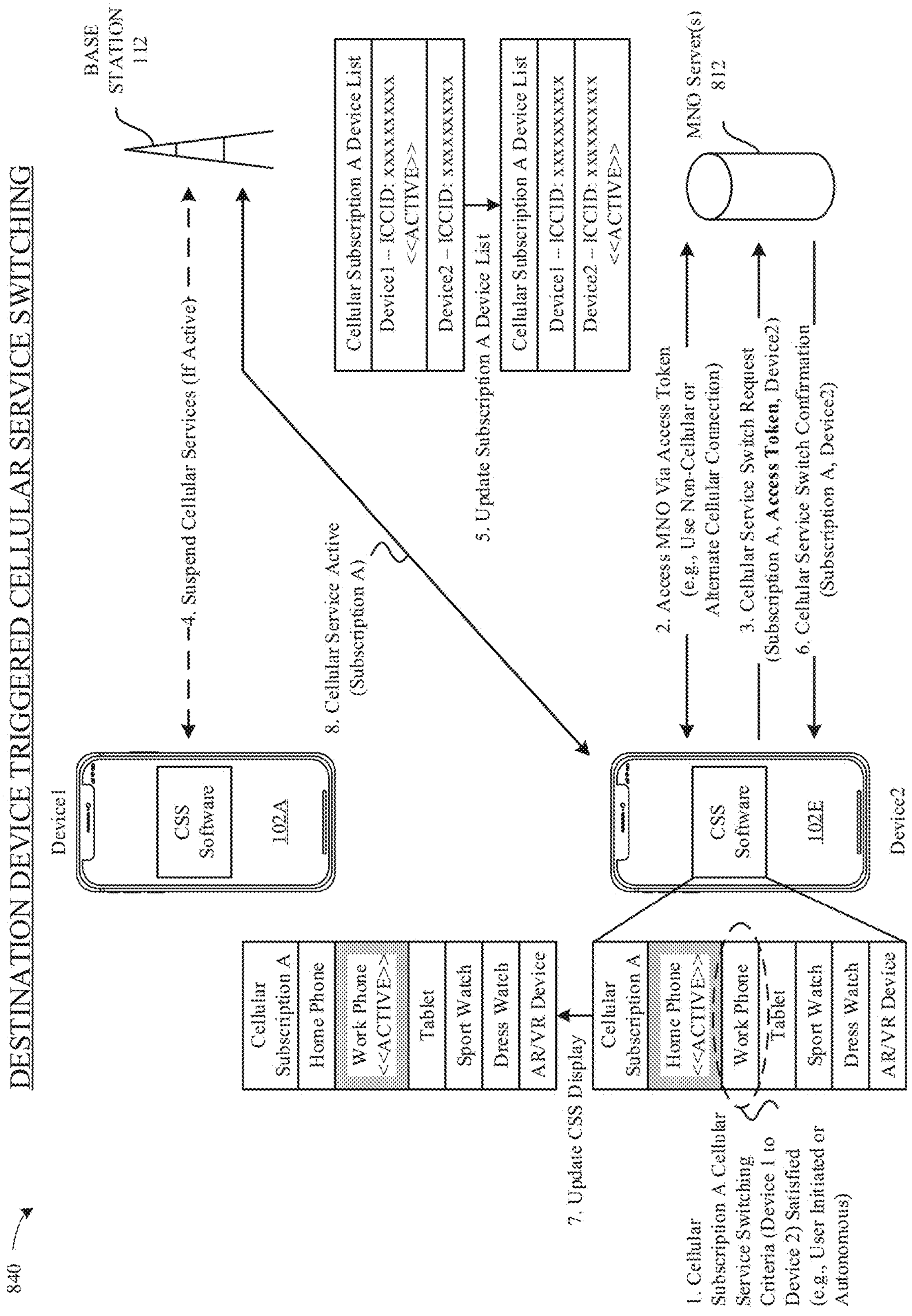
FIG. 8E illustrates a block diagram of an example of cellular service switching between wireless devices triggered by a destination wireless device, according to some embodiments.

FIG. 8E illustrates a block diagram 840 of an example of cellular service switching between wireless devices 102 triggered by a destination wireless device 102E. Initially, the originating wireless device 102A (designated as a "home phone" by a user of the destination wireless device 102E) has an active status for cellular subscription A, as indicated via a display of the destination wireless device 102E (designated as a "work phone" by a user of the destination wireless device 102E). A user of the destination wireless device 102E can trigger CSS software on the destination wireless device 102E, e.g. based on selection of the destination wireless device 102E from available wireless devices 102 associated with the cellular subscription A and indicated via the display of the destination wireless device 102B. In some embodiments, switching of the cellular wireless service subscription from the originating wireless device 102A to the destination wireless device 102E can occur autonomously based on a set of cellular service switching criteria being satisfied. The destination wireless device 102E can use an access token (obtained from the originating wireless device 102A or from a cloud-network based server 804 or already pre-loaded on the destination wireless device 102E) to access one or more MNO servers 812. In some embodiments, the destination wireless device 102E uses a non-cellular wireless connection or an alternate cellular wireless connection to access the MNO server(s) 812. The destination wireless device 102E sends a request message to the MNO server(s) 812 to switch the cellular wireless service subscription, cellular subscription A, to the destination wireless device 102E, where the request message includes an identifier of the cellular wireless service subscription to be switched, an access token associated with the cellular wireless service subscription, and an identifier of the destination wireless device 102E. The MNO server(s) 812 can authenticate the destination wireless device 102E and confirm authority to switch the cellular wireless service subscription, cellular subscription A, to the destination wireless device 102E based at least in part on the access token. In some embodiments, the MNO server(s) 812 can suspend cellular services with the originating wireless device 102A in association with switching the cellular wireless service subscription, cellular subscription A, to the destination wireless device 102E if still active and not already suspended. The MNO server(s) 812 can update the list of wireless devices 102 associated with the cellular wireless service subscription, cellular subscription A, to reflect that the destination wireless device 102E (device2) is in an active state, while the originating wireless device 102A (device2) is in an inactive state. The MNO server(s) 812 can send a confirmation message to the destination wireless device 102E indicating that the cellular wireless service subscription, cellular subscription A, has successfully switched to the destination wireless device 102E. The CSS software on the destination wireless device 102E (and on the originating wireless device 102A) can be updated to indicate that the cellular wireless service subscription, cellular subscription A, is active on the destination wireless device 102E (work phone) and is not active on the originating wireless device 102A (home phone). The destination wireless device 102E, after the cellular wireless service subscription has switched successfully can establish a cellular wireless service connection with the base station 112 via the credentials of cellular subscription A.

Figure 8F:
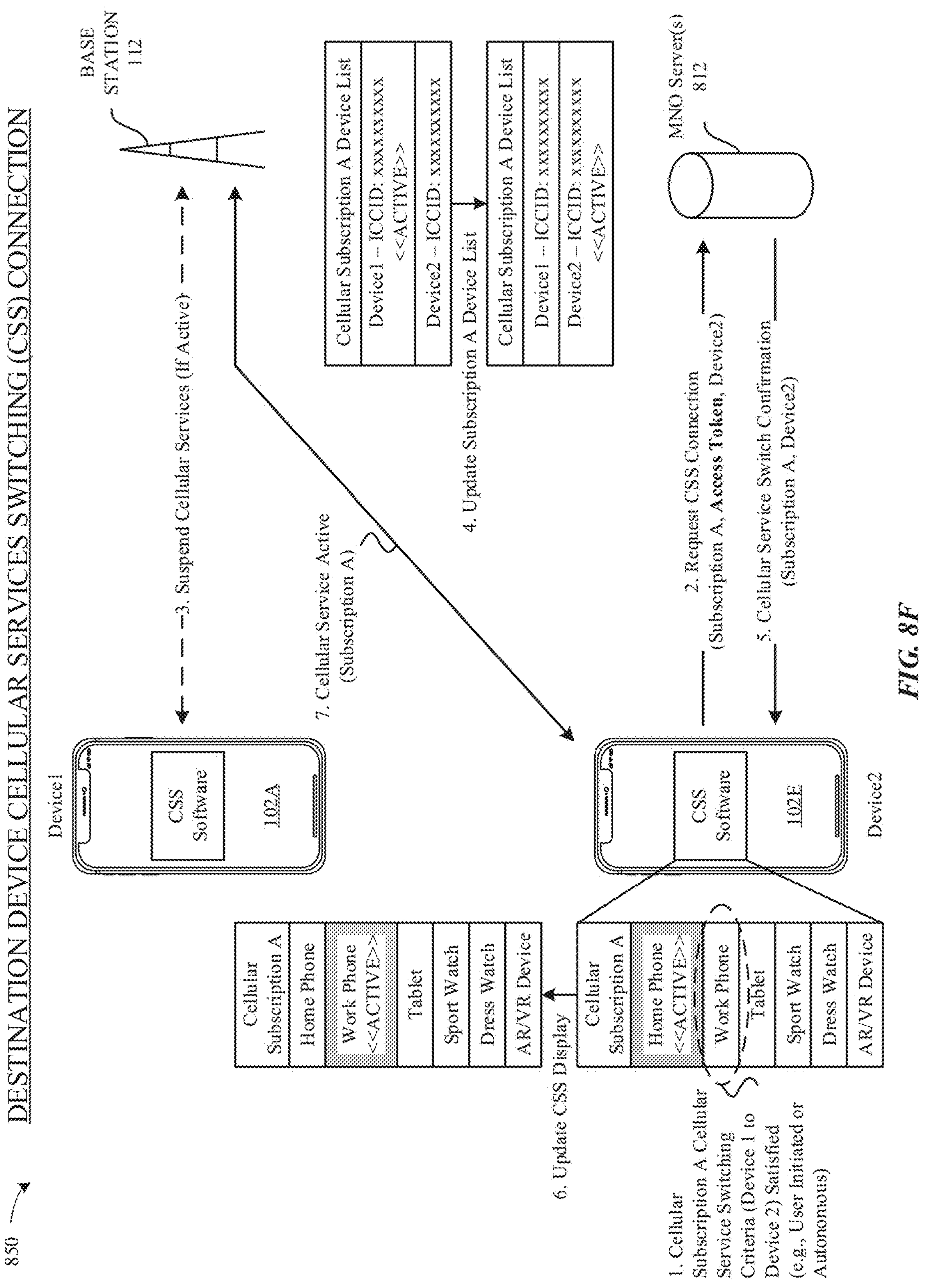
FIG. 8F illustrates a block diagram of an example of a destination wireless device requesting cellular service switching via a cellular services connection, according to some embodiments.

FIG. 8F illustrates a block diagram 850 of an example of cellular service switching between wireless devices 102 initiated by a destination wireless device 102E that requests a cellular services switching (CSS) connection. Initially, the originating wireless device 102A (designated as a "home phone" by a user of the destination wireless device 102E) has an active status for cellular subscription A, as indicated via a display of the destination wireless device 102E (designated as a "work phone" by a user of the destination wireless device 102E). A user of the destination wireless device 102E can trigger CSS software on the destination wireless device 102E, e.g. based on selection of the destination wireless device 102E from available wireless devices 102 associated with the cellular subscription A and indicated via the display of the destination wireless device 102B. In some embodiments, switching of the cellular wireless service subscription from the originating wireless device 102A to the destination wireless device 102E can occur autonomously based on a set of cellular service switching criteria being satisfied. The destination wireless device 102E can send a CSS connection request message to one or more MNO servers 812 to cause a cellular wireless service subscription to switch to the destination wireless device 102E. The CSS connection request message can include an identifier of the cellular wireless service subscription to be switched, an access token associated with the cellular wireless service subscription, and an identifier of the destination wireless device 102E. In some embodiments, the destination wireless device 102E obtains the access token from the originating wireless device 102A or from a cloud-network based server 804. In some embodiments, the access token is already pre-loaded on the destination wireless device 102E. The destination wireless device 102E can send the CSS connection request message via a non-access stratum (NAS) registration air message, or in a data session, e.g., 5G protocol data unit (PDU) session, establishment request message, or in a radio resource control (RRC) connection request message. Communication between the destination wireless device 102E and the MNO servers 812 can be via the base station 112 (not explicitly indicated). Data exchanged between the destination wireless device 102E and the MNO servers 812 can be via NAS dedicated signaling or via RRC dedicated signaling with the base station 112. The MNO server(s) 812 can authenticate the destination wireless device 102E and confirm authority to switch the cellular wireless service subscription, cellular subscription A, to the destination wireless device 102E based at least in part on the access token included in the CSS connection request message. In some embodiments, the MNO server(s) 812 can suspend cellular services with the originating wireless device 102A in association with switching the cellular wireless service subscription, cellular subscription A, to the destination wireless device 102E if still active and not already suspended. The MNO server(s) 812 can update the list of wireless devices 102 associated with the cellular wireless service subscription, cellular subscription A, to reflect that the destination wireless device 102E (device2) is in an active state, while the originating wireless device 102A (device2) is in an inactive state. The MNO server(s) 812 can send a confirmation message to the destination wireless device 102E indicating that the cellular wireless service subscription, cellular subscription A, has successfully switched to the destination wireless device 102E. In some embodiments, the cellular service switch confirmation message can be communicated to the destination wireless device 102E via the base station 112 using NAS dedicated signaling and/or RRC dedicated signaling. The CSS software on the destination wireless device 102E (and on the originating wireless device 102A) can be updated to indicate that the cellular wireless service subscription, cellular subscription A, is active on the destination wireless device 102E (work phone) and is not active on the originating wireless device 102A (home phone). The destination wireless device 102E, after the cellular wireless service subscription has switched successfully can establish a cellular wireless service connection with the base station 112 via the credentials of cellular subscription A.

Figure 9A:
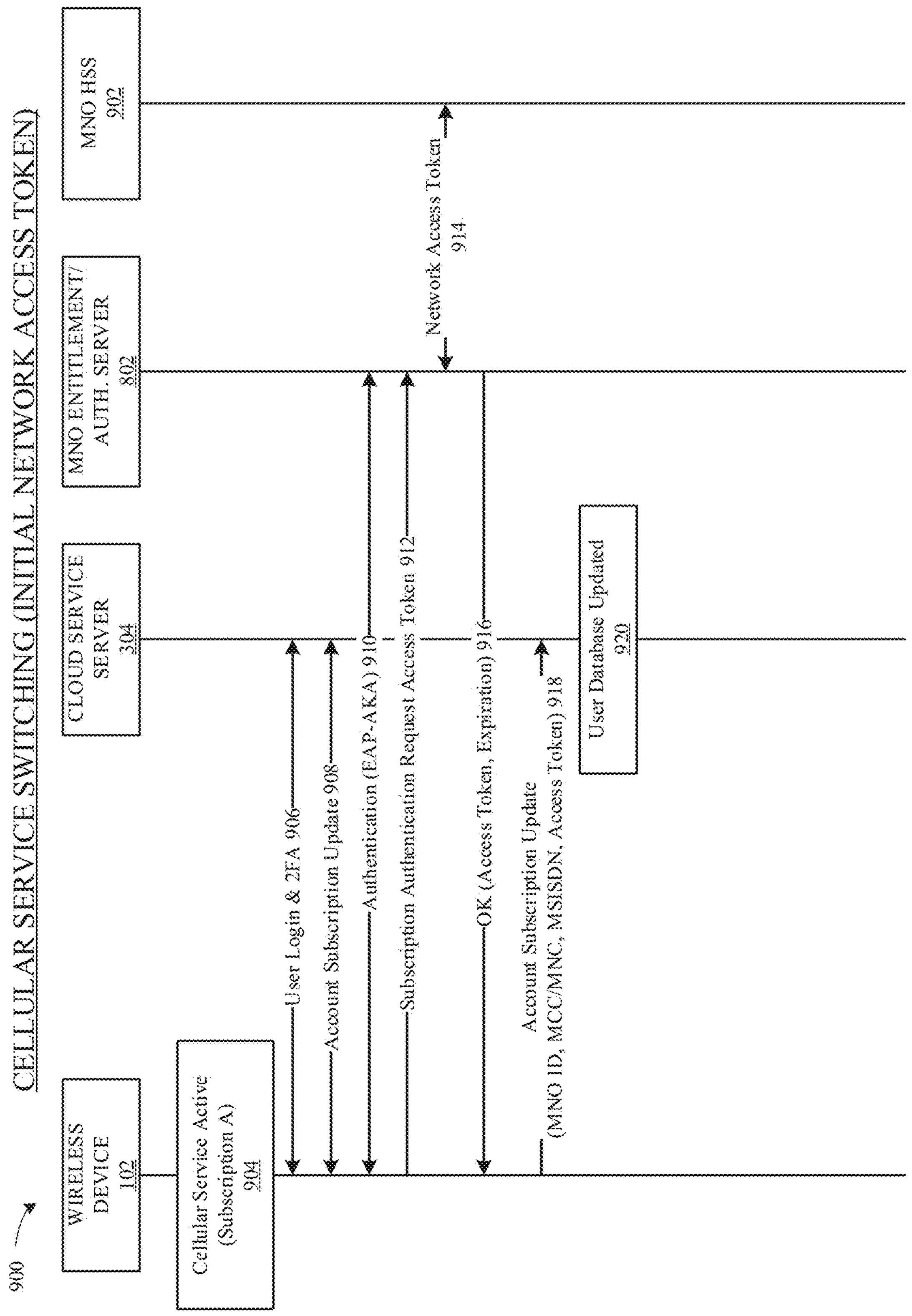
FIG. 9A illustrates a block diagram of an example of obtaining an initial network access token for cellular service switching, according to some embodiments.

FIG. 9A illustrates a block diagram 900 of an example of obtaining an initial network access token for cellular service switching by a wireless device 102. At 904, a cellular wireless service subscription, cellular subscription A, is active on the wireless device 102. At 906, the wireless device 102 establishes a secure connection to a cloud service server 304, e.g., based on a user login and two-factor authentication (2FA). At 908, the wireless device 102 performs an account subscription update with the cloud service server 304. At 910, the wireless device 102 authenticates with an MNO entitlement and authentication server 802, e.g., using an EAP-AKA procedure. At 912, the wireless device 102 sends a request message to the MNO entitlement and authentication server 802 to obtain an access token for the cellular wireless service subscription, cellular subscription A. At 914, the MNO entitlement and authentication server 802 in communication with an MNO home subscriber server (HSS) obtains a network access token for the cellular wireless service subscription, cellular subscription A. At 916, the MNO entitlement and authentication server 802 provides the access token to the wireless device 102. In some embodiments, validity of the access token is limited in time e.g., indicated by an expiration value provided with the access token to the wireless device 102. At 918, the wireless device 102 communicates an account subscription update message to the cloud service server 304, where the update message can include cellular wireless service subscription information, e.g., an MNO ID value, MCC/MNC values, an MSISDN value, and the access token for the cellular wireless service subscription obtained from the MNO entitlement and authentication server 802. At 902, the cloud service server 304 updates a user database using the account subscription update provided by the wireless device 102. In some embodiments, the cellular wireless service subscription information for cellular subscription A can be stored securely at the cloud service server 304 and subsequently obtained by another wireless device 102, e.g., when adding a new wireless device 102 to the cellular wireless service subscription.

Figure 9B:
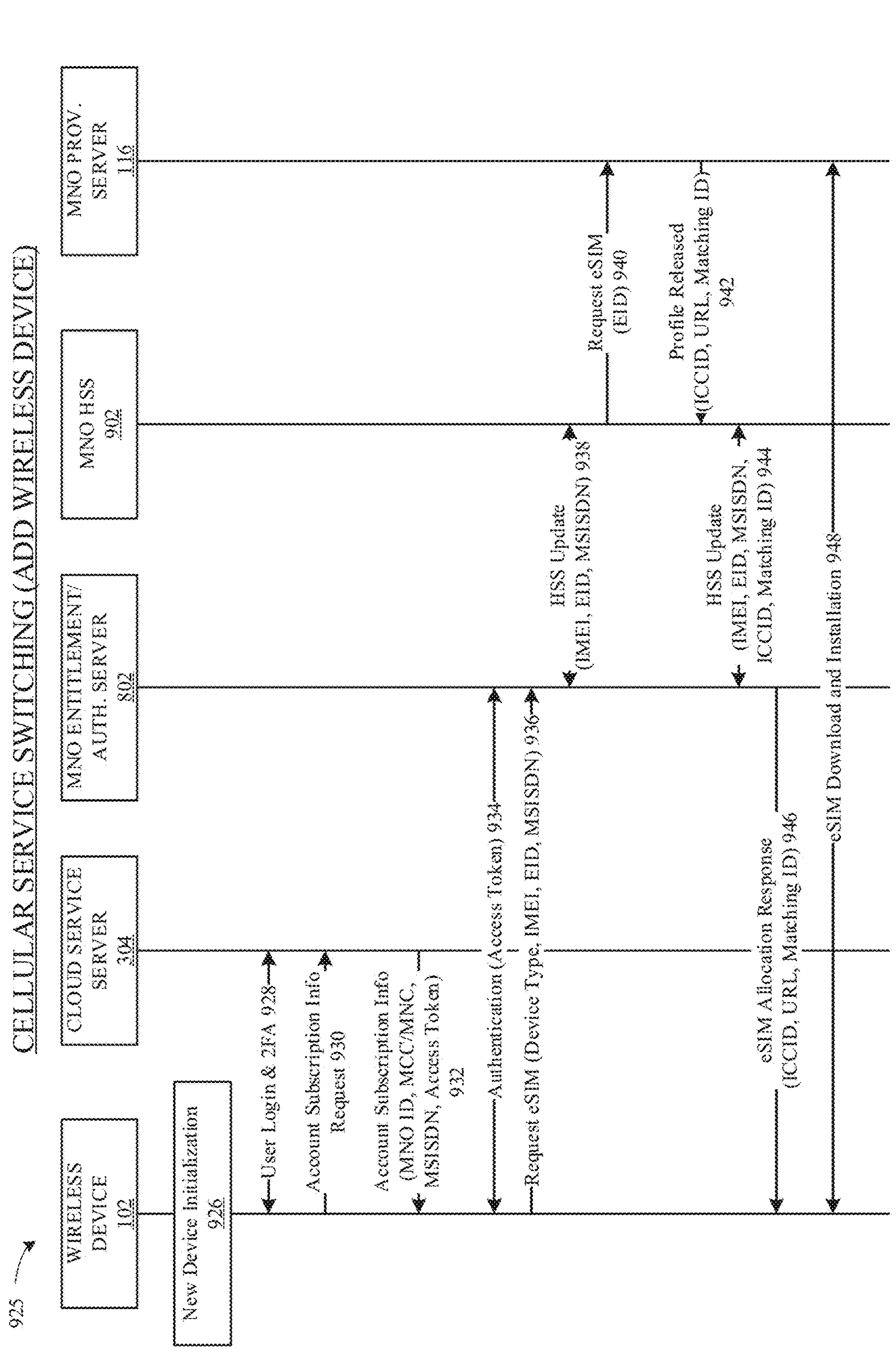
FIG. 9B illustrates another block diagram of an example of adding a wireless device to a cellular wireless service subscription, according to some embodiments.

FIG. 9B illustrates a block diagram 925 of an example of adding a wireless device 102 to a cellular wireless service subscription. At 926, the wireless device 102 performs an initialization procedure, e.g., in association with unboxing and unbricking the wireless device 102. At 928, the wireless device 102 establishes a secure connection to a cloud service server 304, e.g., based on a user login and two-factor authentication (2FA). At 930, the wireless device 102 requests an account subscription information for a cellular wireless service subscription from the cloud service server 304. At 932, the cloud service server 304 provides to the wireless device 102 the requested account subscription information for the cellular wireless service subscription, which can include an MNO ID value, MCC/MNC values, an MSISDN value, and an access token for the cellular wireless service subscription. At 934, the wireless device 102 authenticates, based at least in part using the access token, with an MNO entitlement and authentication server 802. At 936, the wireless device 102 sends a request message to the MNO entitlement and authentication server 802 for an eSIM 208, the request message including a device type indicator, unique hardware identifiers for the wireless device 102, e.g., an international mobile equipment identifier (IMEI) value and an eUICC identifier (EID) value, and the MSISDN value associated with the cellular wireless service subscription. At 938, the MNO entitlement and authentication server communicates an first update message with the MNO HSS 902, the first update message including the IMEI and EID values of the wireless device 102, and the MSISDN value associated with the cellular wireless service subscription. The MNO HSS 902, at 940, sends a request message an cSIM 208 for the wireless device 102 from an MNO provisioning server 116, where the request message includes the EID value for the eUICC 108 of the wireless device 102 on which to the cSIM 208 will be installed. The MNO provisioning server 116, at 942, release the eSIM 208 (profile) and includes an ICCID value of the eSIM 208 along with a network server address, e.g., a universal record locator (URL) value for the wireless device 102 to use for accessing the MNO provisioning server 116 and optionally a matching ID value. The MNO HSS 902, at 944, communicates to the MNO entitlement and authentication server 802 a second HSS update message that includes the IMEI and EID values of the wireless device 102, the MSISDN value of the cellular wireless service subscription, the ICCID value of the cSIM 208, and optionally the matching ID value. The MNO entitlement and authentication server 802 responds to the eSIM request message from the wireless device 102, at 946, with an eSIM allocation response message that includes the ICCID value of the eSIM 208 reserved for the wireless device 102, the network address (URL) value, and optionally the matching ID value. At 948, the wireless device 102 uses the information received in the eSIM allocation response message to download from the MNO provisioning server 116 and install on the eUICC 108 of the wireless device 102 the eSIM 208 allocated to the wireless device 102. In some embodiments, the MNO HSS 902 and/or the MNO entitlement and authentication server 802 maintain a list of wireless devices 102 associated with the cellular wireless service subscription, e.g., ICCID values for the wireless devices 102, and the wireless device 102 is added to the list of wireless devices 102 associated with the cellular wireless service subscription having the MSISDN value. While FIG. 9B illustrates adding a wireless device 102 to a set of wireless devices 102 by obtaining an eSIM 208, similar steps can be performed to download and install an iSIM on hardware of the wireless device 102.

Figure 9C:
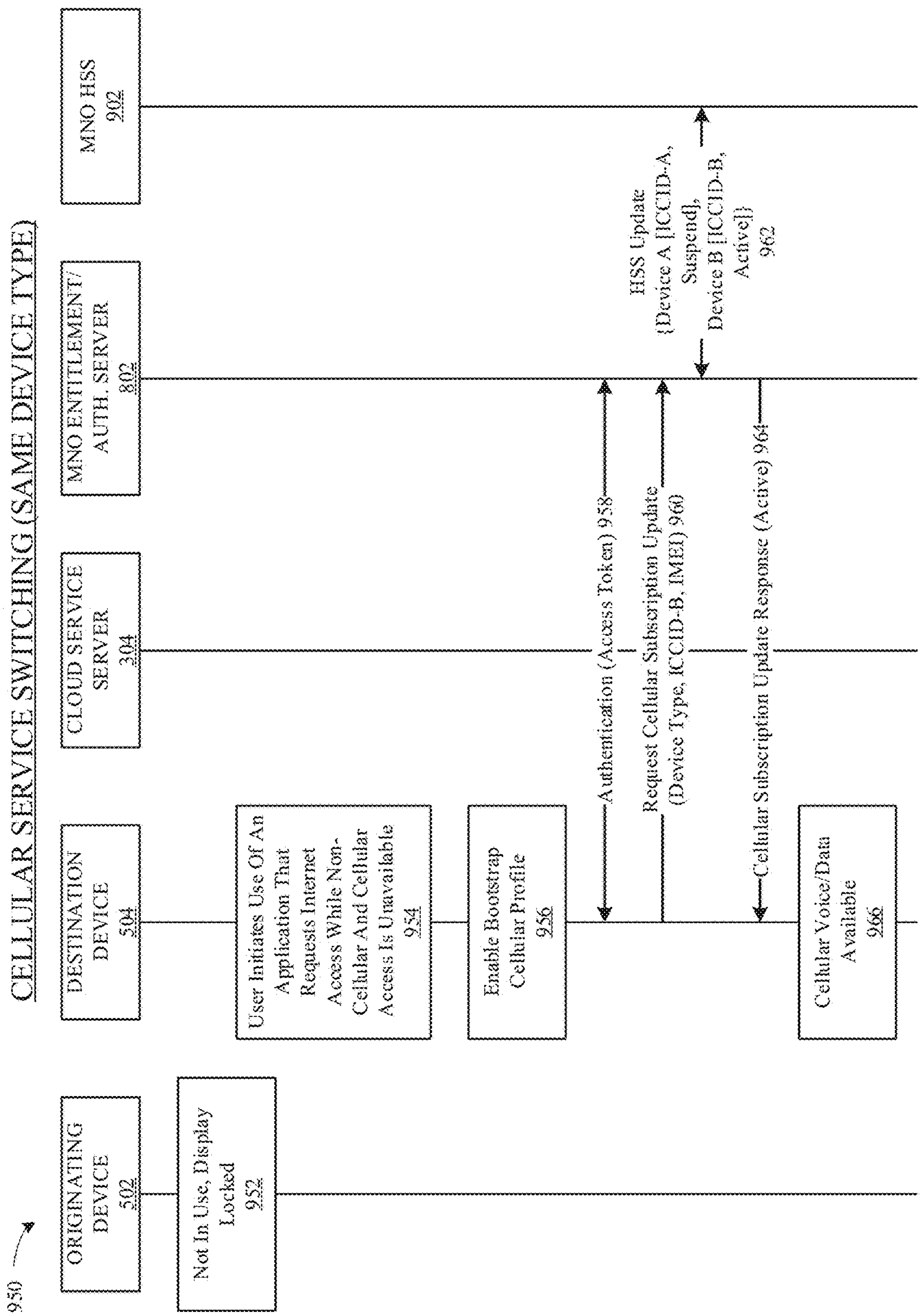
FIG. 9C illustrates a block diagram of an example of cellular service switching between wireless devices of the same device type, according to some embodiments.

FIG. 9C illustrates a block diagram 950 of an example of switching a cellular wireless service subscription between wireless devices 102 of the same device type and triggered by a destination wireless device 504. At 952, an originating wireless device 502 is not in use, with a display in a locked state. At 954, a user of the destination wireless device 504 initiates use of an application that requests internet access and neither a non-cellular wireless connection nor a cellular wireless connection is available to provide the requested internet access for the application. At 956, a limited functionality (bootstrap) cellular profile is enabled at the destination wireless device 504 (e.g., a bootstrap eSIM 208 on an eUICC 108 of the destination wireless device 504 or a bootstrap iSIM in hardware of the destination wireless device 504 or a bootstrap SIM installed in the destination wireless device 504). The destination wireless device 504 can also have pre-loaded information for a cellular wireless service subscription. At 958, the destination wireless device 504 establishes a limited cellular wireless connection using the bootstrap cellular profile and authenticates, based at least in part on an access token associated with the cellular wireless service subscription, with an MNO entitlement and authentication server 802. At 960, the destination wireless device 504 sends a message to the MNO entitlement and authentication server 802 to request an update to the cellular wireless service subscription, the message including a device type for the destination wireless device 504, an ICCID value (ICCID-B) of a cellular wireless access credential, e.g., a SIM/eSIM/iSIM, associated with the cellular wireless service subscription at the destination wireless device 504, and a IMEI value of the destination wireless device 504. The destination wireless device 504 sends the request message to update the cellular wireless service subscription in order to activate (or change from an inactive state to an active state) the cellular wireless service subscription for the destination wireless device 504. The MNO entitlement and authentication server 802, at 962, communicates with the MNO HSS 902 to update the status for the destination wireless device 504 (indicated as Device B) to an active state and to update the status of an originating wireless device 502 (indicated as Device A) to an inactive state. At 964, the MNO entitlement and authentication server 802 provides a response message, at 964, to the destination wireless device 504 to indicate that the cellular wireless service subscription is now active for the destination wireless device 504. At 966, access to cellular wireless voice and data services via the active cellular wireless service subscription is available to the destination wireless device 504.

Figure 9D:
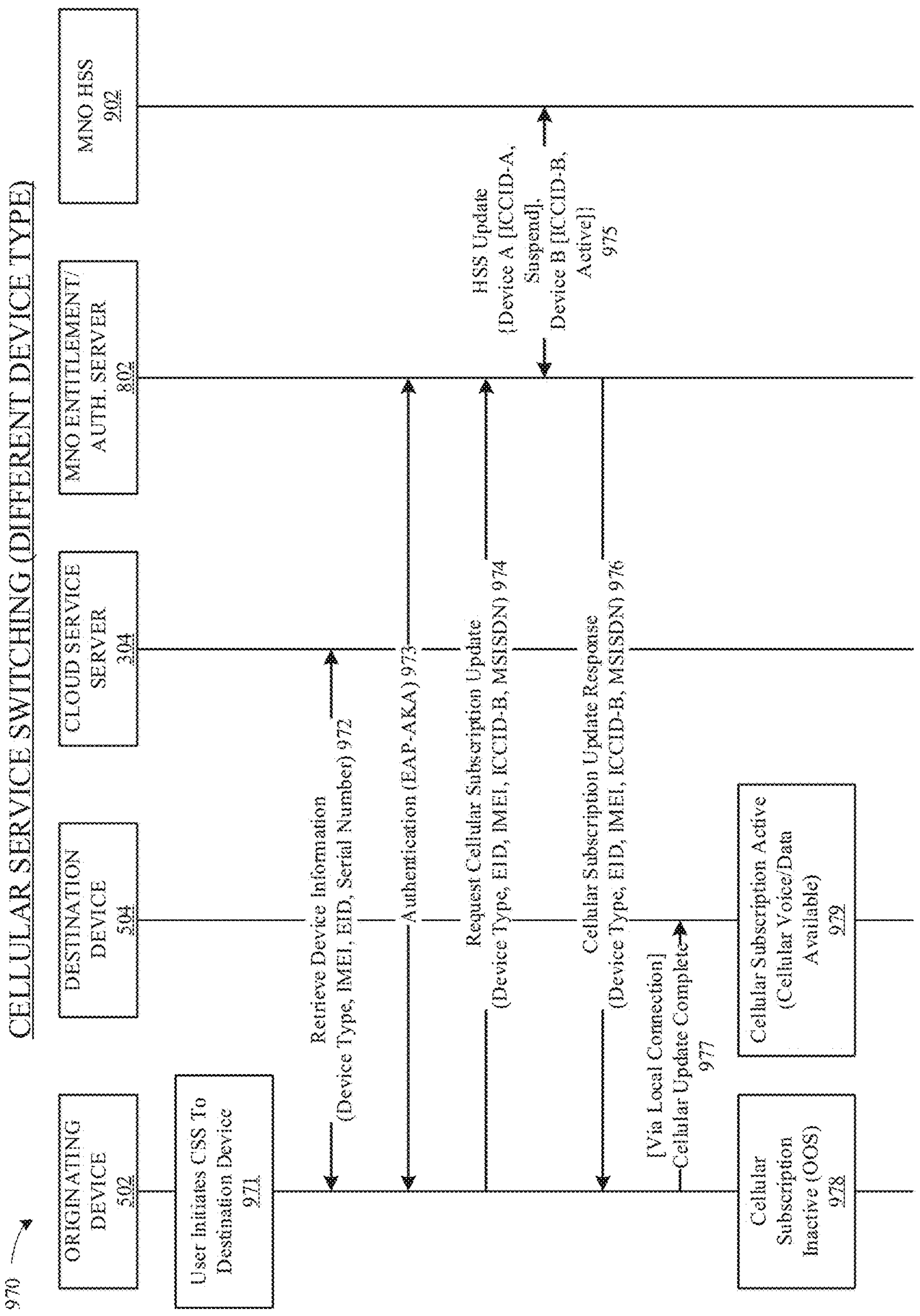
FIG. 9D illustrates a block diagram of an example of cellular service switching between wireless devices of different devices types, according to some embodiments.

FIG. 9D illustrates a block diagram 970 of an example of switching a cellular wireless service subscription between wireless devices 102 of different device types, from an originating wireless device 502 to a destination wireless device 504 and initiated by the originating wireless device 502. At 971, a user initiates cellular service switching of the cellular wireless service subscription, e.g., via CSS software, from the originating wireless device 502 to the destination wireless device 504. At 972, the originating wireless device 502 retrieves from a cloud service server 304 device information for the destination wireless device 504, where the device information can include a device type, an IMEI value, an EID value, and/or a serial number of the destination wireless device 504. At 973, the originating wireless device 502 authenticates with an MNO entitlement and authentication server 802, e.g., using an EAP-AKA procedure. At 974, the originating wireless device 502 sends a cellular subscription update request message to the MNO entitlement and authentication server 802 to switch a cellular wireless service subscription from the originating wireless device 502 to the destination wireless device 504. The cellular subscription update request message can include i) information for the destination wireless device 504, e.g., a device type, an EID value, and an IMEI value, and ii) information for the cellular wireless service subscription, e.g., an ICCID value (ICCID-B) for a cellular wireless service credential, e.g., a SIM/eSIM/iSIM, at the destination wireless device 504 and an MSISDN value. The MNO entitlement and authentication server 802, at 975, communicates with the MNO HSS 902 to update the status for the destination wireless device 504 (indicated as Device B) to an active state and to update the status of an originating wireless device 502 (indicated as Device A) to an inactive state. At 964, the MNO entitlement and authentication server 802 provides a response message, at 964, to the destination wireless device 504 to indicate that the cellular wireless service subscription is now active for the destination wireless device 504. The response message includes the information for the destination wireless device 504 (device type, EID value, IMEI value, ICCID-B value for the cellular wireless access credential, e.g., SIM/eSIM/iSIM, associated with the cellular wireless service subscription at the destination wireless device 504, and MSISDN value of the cellular wireless service subscription). At 977, the originating wireless device 502 provides, via a local non-cellular wireless connection, such as a WPAN or WLAN connection, to the destination wireless device 504 a message indicating that the cellular wireless service subscription has been successfully switched to the destination wireless device 504. At 978, the cellular wireless service subscription at the originating wireless device 502 is inactive, e.g., in an out-of-service (OSS) state, while at 979, the cellular wireless service subscription is active at the destination wireless device 504, which has access to cellular wireless voice and data services provided by the cellular wireless service subscription.

Figure 9E:
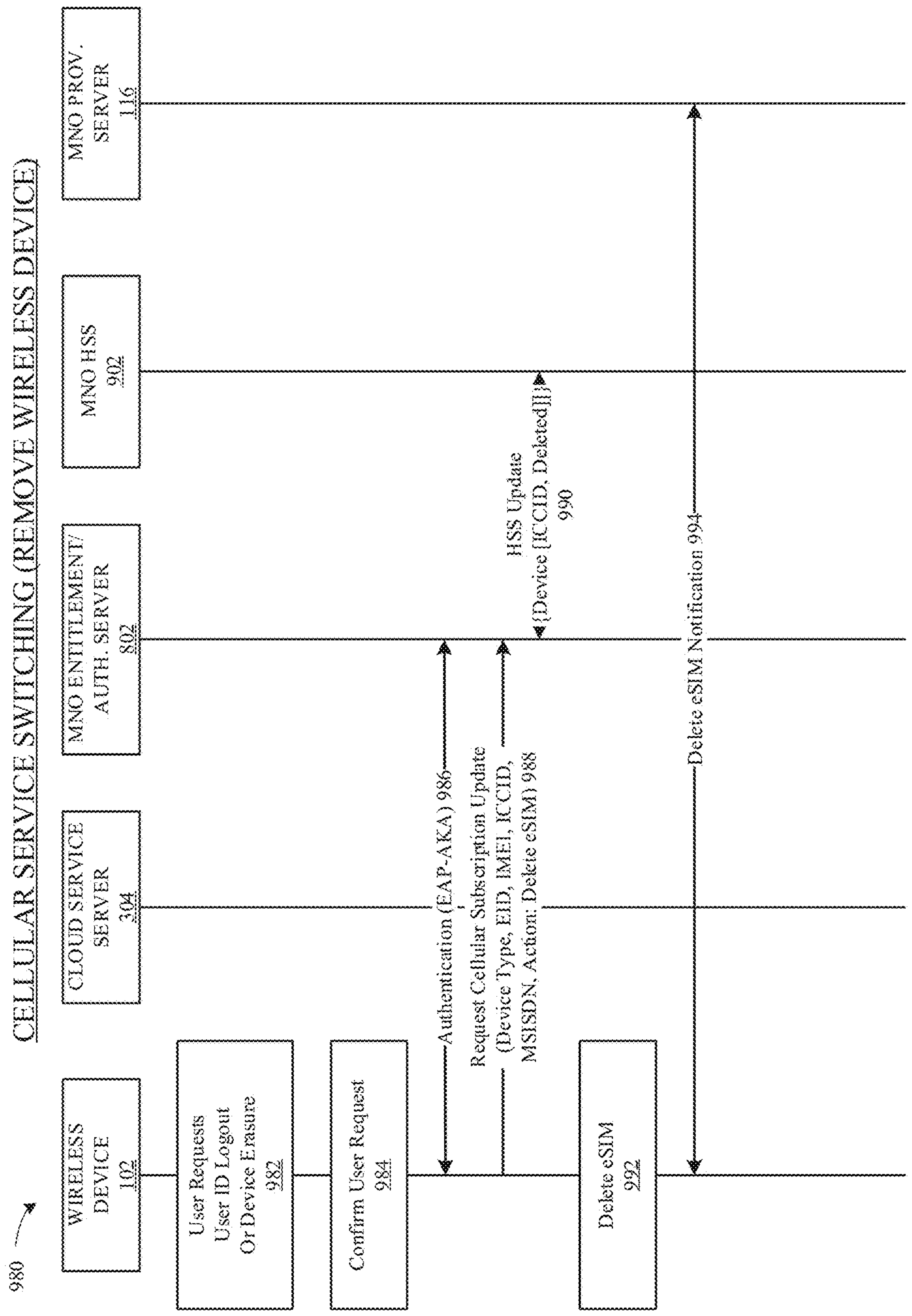
FIG. 9E illustrates another block diagram of an example of removing a wireless device from a cellular wireless service subscription, according to some embodiments.

FIG. 9E illustrates a block diagram 980 of an example of removing a wireless device 102 from a cellular wireless service subscription. At 982, a user can request a user ID logout or request erasure (e.g., factory reset) of the wireless device 102. In some embodiments, switching cellular wireless service and access to a cellular wireless service subscription can require that the wireless device 102 is logged into a common user account, such as a cloud service account maintained at a cloud service server 304. At 984, At 984, the user request to logout or to erase the wireless device 102 is confirmed. At 986, the wireless device 102 authenticates with an MNO entitlement and authentication server 802, e.g., using an EAP-AKA procedure. At 988, the wireless device 102 sends a message requesting an update of cellular wireless service subscription information for the wireless device 102, where the message includes a device type of the wireless device 102, hardware ID values of the wireless device 102, such as EID and IMEI values, an ICCID value for a cellular wireless service credential, e.g., an eSIM 208, associated with the cellular wireless service subscription being updated, an MSISDN value associated with the cellular wireless service subscription, and an action value indicating deletion of the eSIM 208. The MNO entitlement and authentication server 802, at 990, provides an update with the MNO HSS 902 to delete the wireless device 102 from the list of wireless devices 102 associated with the cellular wireless service subscription. The wireless device 102, at 992, deletes, from the eUICC 108 of the wireless device 102, the eSIM 208 associated with the cellular wireless service subscription. In some embodiments, at 994, the wireless device 102 provides to an MNO provisioning server a notification confirming deletion of the eSIM 208. While FIG. 9E illustrates deletion of an eSIM 208, similar actions can be performed when deleting an iSIM from hardware of the wireless device 102 to remove the wireless device 102 from the set of wireless devices 102 among which the cellular wireless service subscription can be switched.

Figure 10A:
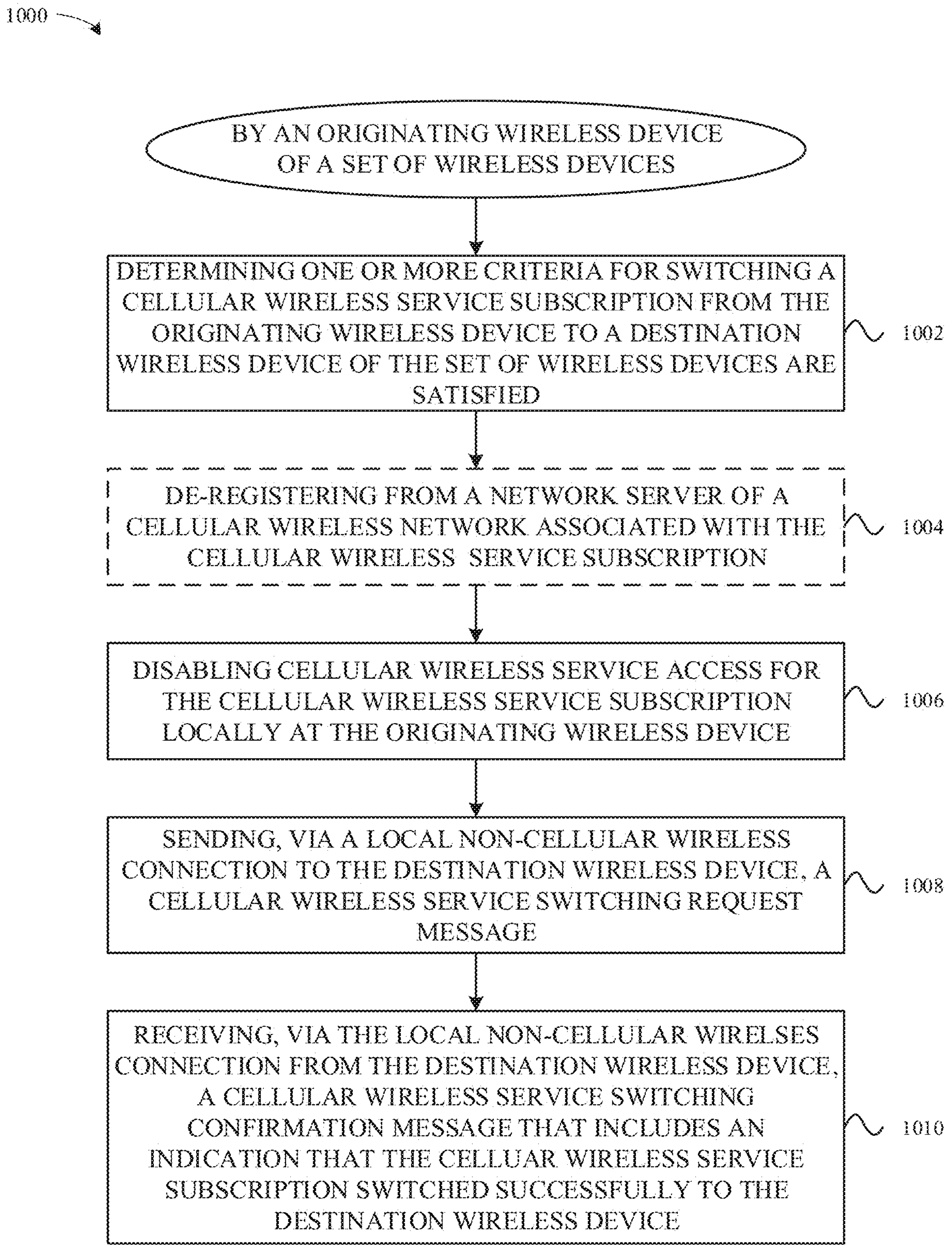
FIG. 10A illustrates a flowchart of an exemplary method performed by an originating wireless device to switch a cellular wireless service subscription to a destination wireless device, according to some embodiments.

FIG. 10A illustrates a flowchart 1000 of an exemplary method for managing a cellular wireless service subscription for access to cellular wireless services of a cellular wireless network for a set of wireless devices 102 associated with a common user account, the method performed by an originating wireless device 502 of the set of wireless devices 102. At 1002, the originating wireless device 502 determines one or more criteria for switching the cellular wireless service subscription from the originating wireless device 502 to a destination wireless device 504 of the set of wireless devices 102 are satisfied. In some embodiments, at 1004, the originating wireless device 502 optionally de-registers from a network server of a cellular wireless network associated with the cellular wireless service subscription. At 1006, the originating wireless device 502 disables cellular wireless service access for the cellular wireless service subscription locally at the originating wireless device 502. At 1008, the originating wireless device 502 sends, via a local non-cellular wireless connection to the destination wireless device 504, a cellular wireless service switching request message. At 1010, the originating wireless device 502 receives, via the local non-cellular wireless connection from the destination wireless device 504, a cellular wireless service switching confirmation message that includes an indication that the cellular wireless service subscription switched successfully to the destination wireless device 504.

In some embodiments, an MNO managed network server, such as an HSS 902, maintains a list of ICCID values of cellular wireless access credentials, e.g., SIMs, cSIMs 208, and/or iSIMs, associated with the cellular wireless service subscription, the list of ICCID values includes an ICCID value for a first cellular wireless access credential, e.g., first SIM/eSIM/iSIM, of the originating wireless device 502 and a second ICCID value for a second cellular wireless access credential, e.g., a second SIM/eSIM/iSIM, at the destination wireless device 504, the first cellular wireless access credential, e.g., the first SIM/eSIM/iSIM, of the originating wireless device 502 is designated as active and the second cellular wireless access credential, e.g., the second SIM/eSIM/iSIM, of the destination wireless device 504 is designated as inactive prior to switching the cellular wireless service subscription from the originating wireless device 502 to the destination wireless device 504, and the first cellular wireless access credential, e.g., the SIM/cSIM/iSIM, of the originating wireless device 502 is designated as inactive and the second cellular wireless access credential, e.g., the second SIM/eSIM/iSIM, of the destination wireless device 504 is designated as active after switching the cellular wireless service subscription from the originating wireless device 502 to the destination wireless device 504. In some embodiments, the originating wireless device 502 is allowed to access cellular wireless services of the cellular wireless network via the first cellular wireless access credential when the first cellular wireless access credential is active, and the originating wireless device is disallowed from accessing cellular wireless services of the cellular wireless network via the first cellular wireless access credential when the first cellular wireless access credential is inactive. In some embodiments, the method performed by the originating wireless device 502 further includes the originating wireless device 502 de-registering from a network server of the cellular wireless network associated with the cellular wireless service subscription before disabling the cellular service access locally at the originating wireless device 502. In some embodiments, disabling the cellular wireless service access for the cellular wireless service subscription locally at the originating wireless device 502 occurs before sending the cellular wireless service switching request message. In some embodiments, disabling the cellular wireless service access for the cellular wireless service subscription locally at the originating wireless device 502 occurs after sending the cellular wireless service switching request message. In some embodiments, the cellular wireless network triggers de-registration of the originating wireless device 502 from access to cellular wireless services via the cellular wireless access credential in conjunction with registration of the destination wireless device 504 to access cellular wireless services associated with the cellular wireless service subscription. In some embodiments, the method performed by the originating wireless device 502 further includes presenting, via a display of the originating wireless device 502 prior to switching the cellular wireless service subscription to the destination wireless device 504, a list of wireless devices 102 in the set of wireless devices 102 associated with the cellular wireless service subscription with an indication that the cellular wireless service subscription is active for the originating wireless device 502, where determination that the one or more criteria for switching the cellular wireless service subscription from the originating wireless device 502 to the destination wireless device 504 are satisfied includes receiving a selection of the destination wireless device 504, from the list of wireless devices 102, to which to switch the cellular wireless service subscription. In some embodiments, the method performed by the originating wireless device 502 further includes presenting, via the display of the originating wireless device 502 after receiving the cellular wireless service switching confirmation message, an updated list of the wireless devices 102 in the set of wireless devices 102 associated with the cellular wireless service subscription with an indication that the cellular wireless service subscription is active for the destination wireless device 504. In some embodiments, the method performed by the originating wireless device 102 further includes, prior to initiating transfer of the cellular wireless service subscription to the destination wireless device 504: i) obtaining from an MNO managed network server, e.g., an MNO HSS 902, of the cellular wireless network via an MNO entitlement and authentication server 802 of the cellular wireless network, an access token associated with the cellular wireless service subscription, and ii) providing the access token to the destination wireless device 504, where the destination wireless device 504 uses the access token to authenticate with the MNO entitlement and authentication server 802 prior to the cellular wireless service subscription switching successfully to the destination wireless device 504. In some embodiments, the originating wireless device 502 provides the access token to the destination wireless device 504 indirectly via a cloud-based service by storing the access token securely at a cloud-based service associated with the common user account prior to initiating transfer of the cellular wireless service subscription to the destination wireless device 504, where the destination wireless device 504 obtains the access token from the cloud-based service. In some embodiments, the originating wireless device 502 provides the access token to the destination wireless device 504 directly via a local non-cellular wireless connection. In some embodiments, determination that the set of the one or more criteria for switching the cellular wireless service subscription from the originating wireless device 502 to the destination wireless device 504 are satisfied includes: i) detecting a battery level of the originating wireless device 502 satisfies a battery threshold or the originating wireless device 502 is being powered off, and ii) the destination wireless device 504 is reachable by the originating wireless device 502, e.g., via the local non-cellular wireless connection or via a cloud service. In some embodiments, determination that the set of the one or more criteria for switching the cellular wireless service subscription from the originating wireless device 502 to the destination wireless device 504 are satisfied includes: i) detecting the originating wireless device 502 is not being worn or not actively used, and ii) the destination wireless device 504 is reachable by the originating wireless device 502, e.g., via the local non-cellular wireless connection or via a cloud service. In some embodiments, the set of one or more criteria for switching the cellular wireless service subscription from the originating wireless device to the destination wireless device are satisfied comprises one or more of: i) the originating wireless device satisfies a critical thermal condition; ii) the originating wireless device and the destination wireless device satisfy a proximity distance threshold; iii) the destination wireless device is being worn; iv) a particular application is initiated on the destination wireless device; v) a battery level of the destination wireless device satisfies a battery level difference threshold relative to a corresponding battery level of the originating wireless device; vi) a maximum battery capacity of the destination wireless device exceeds a corresponding maximum battery capacity of the originating wireless device by a battery capacity difference threshold; or vii) a cellular wireless connection capacity for the destination wireless device exceeds a corresponding cellular wireless connection capacity for the originating wireless device by a cellular capacity difference threshold. In some embodiments, the originating wireless device 502 disables cellular wireless service access for the cellular wireless service subscription locally at the originating wireless device 502 while a cellular wireless connection with the cellular wireless network via the cellular wireless service subscription is active and without performing a deregistration procedure with a network server of the cellular wireless network associated with the cellular wireless service subscription. In some embodiments, the cellular wireless service switching request message, sent to the destination wireless device 504 by the originating wireless device 502, includes cellular context information for the destination wireless device to use to resume the cellular wireless connection with the cellular wireless network. In some embodiments, the cellular context information includes one or more of: network access stratum (NAS) layer information, access stratum (AS) layer information, or cellular subscription information required for the destination wireless device 504 to resume the cellular wireless connection with the cellular wireless network.

Figure 10B:
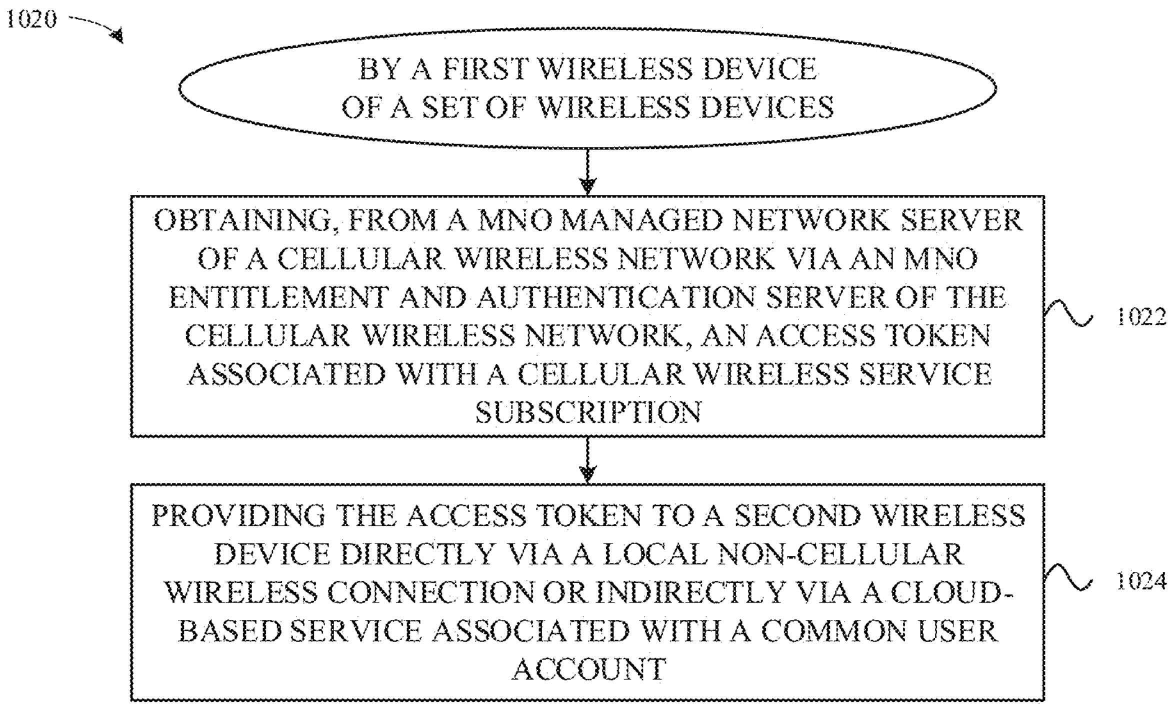
FIGS. 10B and 10C illustrate flowcharts of an exemplary method for adding a wireless device to a cellular wireless service subscription, according to some embodiments.
Figure 10C:
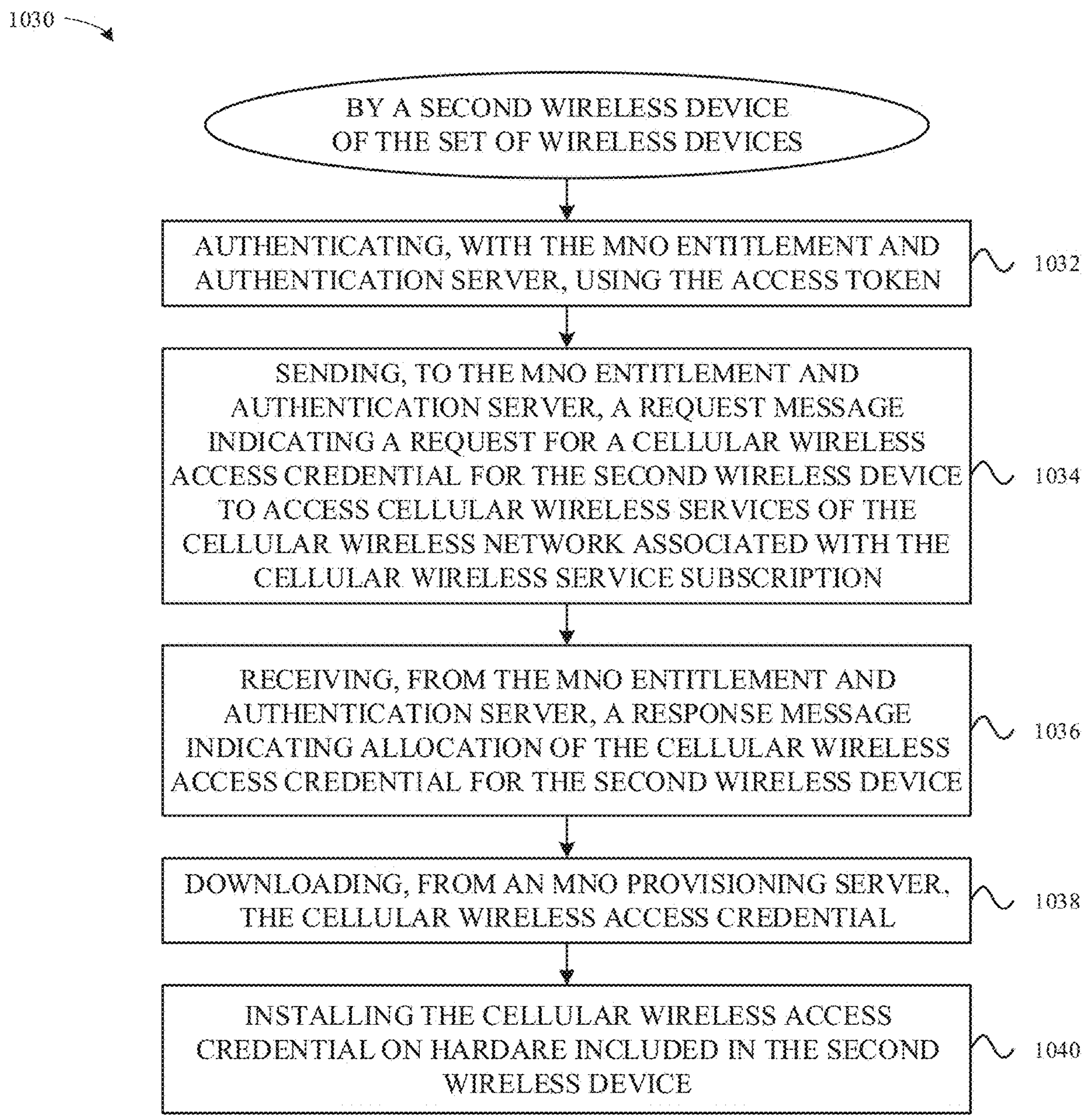

FIGS. 10B and 10C illustrate flowcharts 1020, 1030 illustrating an exemplary method for managing a cellular wireless service subscription for access to cellular wireless services of a cellular wireless network for a set of wireless devices 102 associated with a common user account, the method performed by a first wireless device 102A and a second wireless device 102B of the set of wireless devices 102. At 1022, the first wireless device 102A obtains, from an MNO managed network server, e.g., an HSS 902, of the cellular wireless network via an MNO entitlement and authentication server 802 of the cellular wireless network, an access token associated with the cellular wireless service subscription. At 1024, the first wireless device 102A provides the access token to the second wireless device 102B directly via a local non-cellular wireless connection or indirectly via a cloud-based service associated with the common user account. At 1032, the second wireless device 102B authenticates, with the MNO entitlement and authentication server 802, using the access token. At 1034, the second wireless device 102B sends, to the MNO entitlement and authentication server 802, a request message indicating a request for a cellular wireless access credential, e.g., an eSIM 208 or an iSIM, for the second wireless device 102B to access cellular wireless services of the cellular wireless network associated with the cellular wireless service subscription. At 1036, the second wireless device 102B receives, from the MNO entitlement and authentication server 802, a response message indicating allocation of the cellular wireless access credential, e.g., the eSIM 208 or iSIM, for the second wireless device 102B. At 1038, the second wireless device 102B downloads, from an MNO provisioning server 116, the cellular wireless access credential, e.g., the eSIM 208 or iSIM. At 1040, the second wireless device 102B installs the cellular wireless access credential in the second wireless device 102B, e.g., installs the eSIM 208 on an eUICC 108 included in the second wireless device 102B or installs the iSIM on hardware of the second wireless device 102B. A corresponding cellular wireless access credential of the first wireless device 102A, e.g., a corresponding SIM, eSIM 208, or iSIM, and the cellular wireless access credential of the second wireless device 102B, e.g., eSIM 208 or iSIM, are each associated with the cellular wireless service subscription, and the MNO managed network server, e.g., the HSS 902, allows switching an active status for access to cellular wireless services associated with the cellular wireless service subscription between the cellular wireless access credential, e.g., SIM/eSIM/iSIM, of the first wireless device 102A and the cellular wireless access credential, e.g., eSIM 208 or iSIM, of the second wireless device 102B. In some embodiments, the MNO managed network server, e.g., HSS 902, maintains a list of ICCID values of cellular wireless access credentials, e.g., SIMs/eSIMs/iSIMs, associated with the cellular wireless service subscription. In some embodiments, the MNO managed network server, e.g., HSS 902, adds an ICCID value for the cellular wireless access credential, e.g., eSIM 208 or iSIM, provided to the second wireless device 102B to the list of ICCID values associated with the cellular wireless service subscription. In some embodiments, the MNO managed network server, e.g., HSS 902, maintains an indication of which cellular wireless access credentials, e.g., SIMs/eSIMs/iSIMs, are enabled to allow access to the cellular wireless services of the cellular wireless network associated with the cellular wireless service subscription.

Figure 10D:
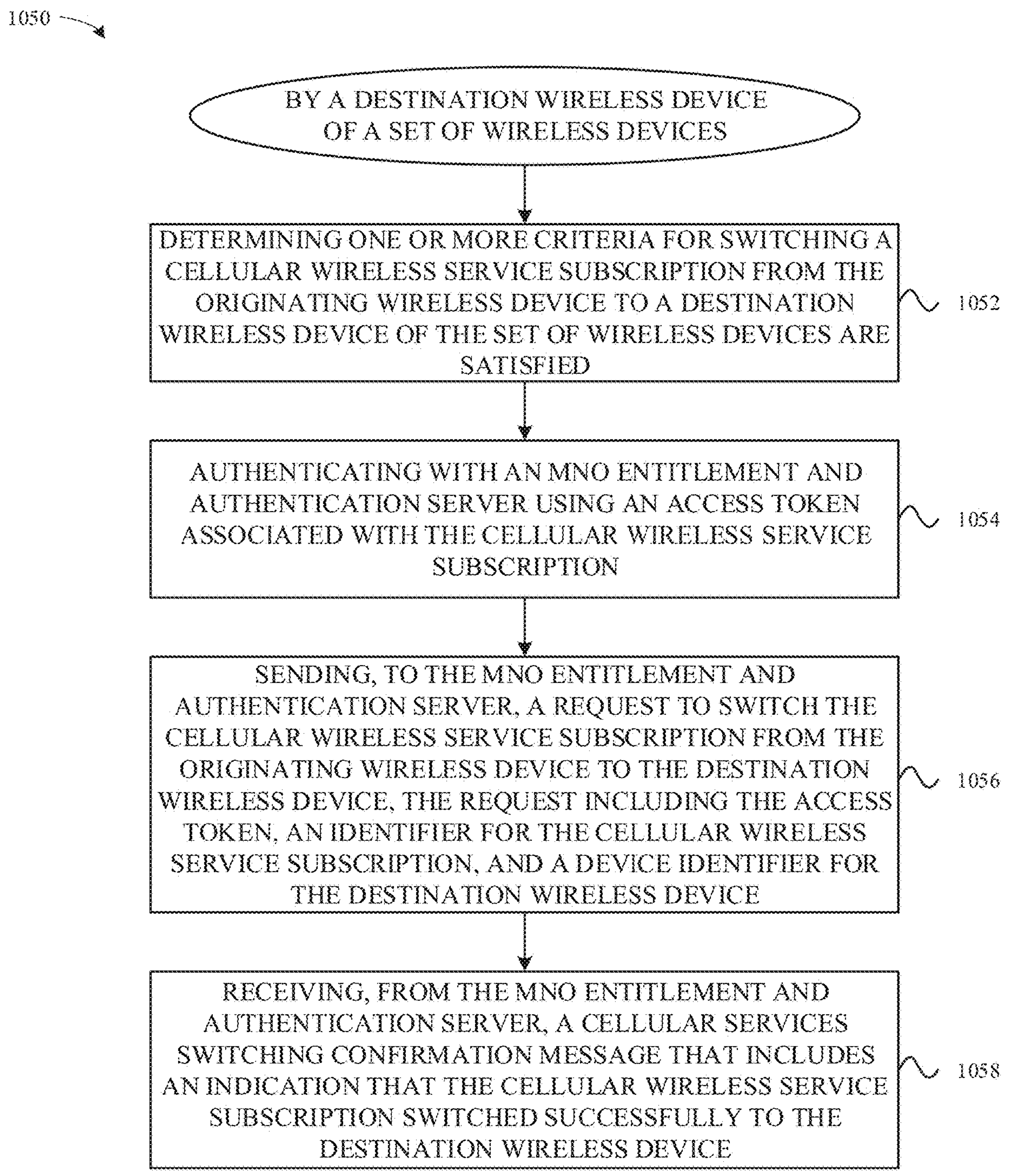
FIG. 10D illustrates a flowchart of an exemplary method performed by a destination wireless device to switch a cellular wireless service subscription from an originating wireless device to the destination wireless device, according to some embodiments.

FIG. 10D illustrates a flowchart 1050 of an exemplary method for managing a cellular wireless service subscription for access to cellular wireless services of a cellular wireless network for a set of wireless devices 102 associated with a common user account, the method performed by a destination wireless device 504 of the set of wireless devices 102. At 1052, the destination wireless device 504 determines one or more criteria for switching the cellular wireless service subscription from an originating wireless device 502 of the set of wireless devices to the destination wireless device 504 are satisfied. At 1054, the destination wireless device 504 authenticates with an MNO entitlement and authentication server 802 using an access token associated with the cellular wireless service subscription. At 1056, the destination wireless device 504 sends, to the MNO entitlement and authentication server 802, a request to switch the cellular wireless service subscription from the originating wireless device 502 to the destination wireless device 504, the request including the access token, an identifier for the cellular wireless service subscription, and a device identifier for the destination wireless device 504. At 1058, the destination wireless device 504, receives, from the MNO entitlement and authentication server 802, a cellular services switching confirmation message that includes an indication that the cellular wireless service subscription switched successfully to the destination wireless device 504.

In some embodiments: i) an MNO managed network server, e.g., an MNO HSS 902, maintains a list of ICCID values of cellular wireless access credentials, e.g., SIMs, eSIMs 208, and/or iSIMs, associated with the cellular wireless service subscription; ii) the list of ICCID values includes an ICCID value for a first cellular wireless access credential, e.g., SIM/eSIM/iSIM, of the originating wireless device 502 and a second ICCID value for a second cellular wireless access credential, e.g., SIM/eSIM/iSIM, at the destination wireless device 504, iii) the first cellular wireless access credential, e.g., SIM/eSIM/iSIM, of the originating wireless device 502 is designated as active and the second cellular wireless access credential, e.g., SIM/eSIM/iSIM, of the destination wireless device 504 is designated as inactive prior to switching the cellular wireless service subscription from the originating wireless device 502 to the destination wireless device 504; and iv) the first cellular wireless access credential, e.g., SIM/eSIM/iSIM, of the originating wireless device 502 is designated as inactive and the second cellular wireless access credential, e.g., SIM/eSIM/iSIM, of the destination wireless device 504 is designated as active after switching the cellular wireless service subscription from the originating wireless device 502 to the destination wireless device 504. When a cellular wireless access credential is designated as active, the wireless device 102 storing the active cellular wireless access credential is authorized to access cellular wireless services of the corresponding cellular wireless network via the active cellular wireless access credential. When a cellular wireless access credential is designated as inactive, the wireless device 102 storing the inactive cellular wireless access credential is not authorized to access cellular wireless services of the corresponding cellular wireless network via the inactive cellular wireless access credential. In some embodiments, the method performed by the destination wireless device 504 further includes presenting, via a display of the destination wireless device 504 prior to switching the cellular wireless service subscription to the destination wireless device 504, a list of wireless devices 102 in the set of wireless devices 102 associated with the cellular wireless service subscription with an indication that the cellular wireless service subscription is active for the originating wireless device 502, where determination that the one or more criteria for switching the cellular wireless service subscription from the originating wireless device 502 to the destination wireless device 504 are satisfied includes receiving a selection of the destination wireless device 504, from the list of wireless devices 102, to which to switch the cellular wireless service subscription. In some embodiments, the method performed by the destination wireless device 504 further includes presenting, via the display of the destination wireless device 504 after receiving the cellular services switching confirmation message, an updated list of the wireless devices 102 in the set of wireless devices 102 associated with the cellular wireless service subscription with an indication that the cellular wireless service subscription is active for the destination wireless device 504. In some embodiments, the method performed by the destination wireless device 504 further includes, prior to initiating transfer of the cellular wireless service subscription to the destination wireless device 504, obtaining, from the originating wireless device 502, the access token. In some embodiments, the destination wireless device 504 obtains the access token directly from the originating wireless device 502 via a local non-cellular wireless connection. In some embodiments, the destination wireless device 504 obtains the access token from a cloud-based service associated with the common user account. In some embodiments, determination that the set of the one or more criteria for switching the cellular wireless service subscription from the originating wireless device 502 to the destination wireless device 504 are satisfied includes: i) detecting the destination wireless device 504 is being worn or actively used; and ii) the destination wireless device 504 is not reachable by the originating wireless device 502, e.g., via the local non-cellular wireless connection or via a cloud service. In some embodiments, the destination wireless device 504 communicates with the MNO entitlement and authentication server 802 via one of: a non-cellular wireless connection, a cellular wireless connection using a cellular wireless access credential, e.g., SIM/eSIM/iSIM, unassociated with the cellular wireless service subscription, or a limited-functionality bootstrap cellular wireless access credential, e.g., SIM/eSIM/iSIM.

Figure 10E:
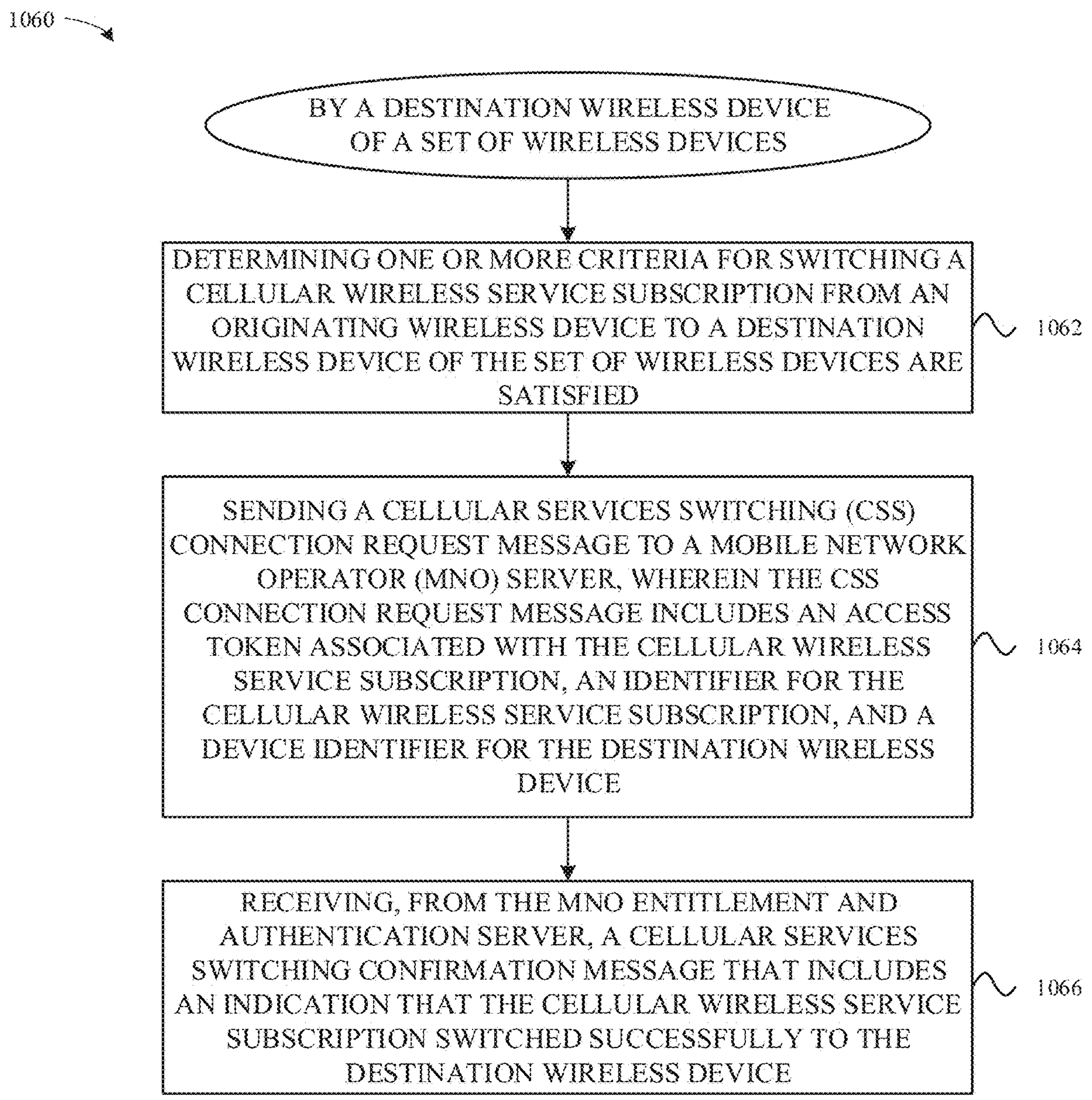
FIG. 10E illustrates a flowchart of an exemplary method performed by a destination wireless device to manage a cellular wireless service subscription for access to cellular wireless services of a cellular wireless network, according to some embodiments.

FIG. 10E illustrates a flowchart 1060 of another exemplary method for managing a cellular wireless service subscription for access to cellular wireless services of a cellular wireless network for a set of wireless devices associated with a common user account, the method performed by a destination wireless device 504 of the set of wireless devices. At 1062, the destination wireless device 504 determines that one or more criteria for switching the cellular wireless service subscription from an originating wireless device 502 of the set of wireless devices to the destination wireless device 504 are satisfied. At 1064, the destination wireless device 504 sends a cellular services switching (CSS) connection request message to a mobile network operator (MNO) server, wherein the CSS connection request message includes an access token associated with the cellular wireless service subscription, an identifier for the cellular wireless service subscription, and a device identifier for the destination wireless device 504. At 1066, the destination wireless device 504 receives, from the MNO server, a cellular services switching confirmation message that includes an indication that the cellular wireless service subscription switched successfully to the destination wireless device 504.

In some embodiments, the destination wireless device 504 sends the CSS connection request message via a non-access stratum (NAS) registration air message. In some embodiments, the destination wireless device 504 sends the CSS connection request message via a protocol data unit (PDU) session establishment request message. In some embodiments, the destination wireless device 504 sends the CSS connection request message via a radio resource control (RRC) connection request message. In some embodiments, the destination wireless device 504 communicates with the MNO server via an access network base station using NAS dedicated signaling or using RRC dedicated signaling.

Figure 10F:
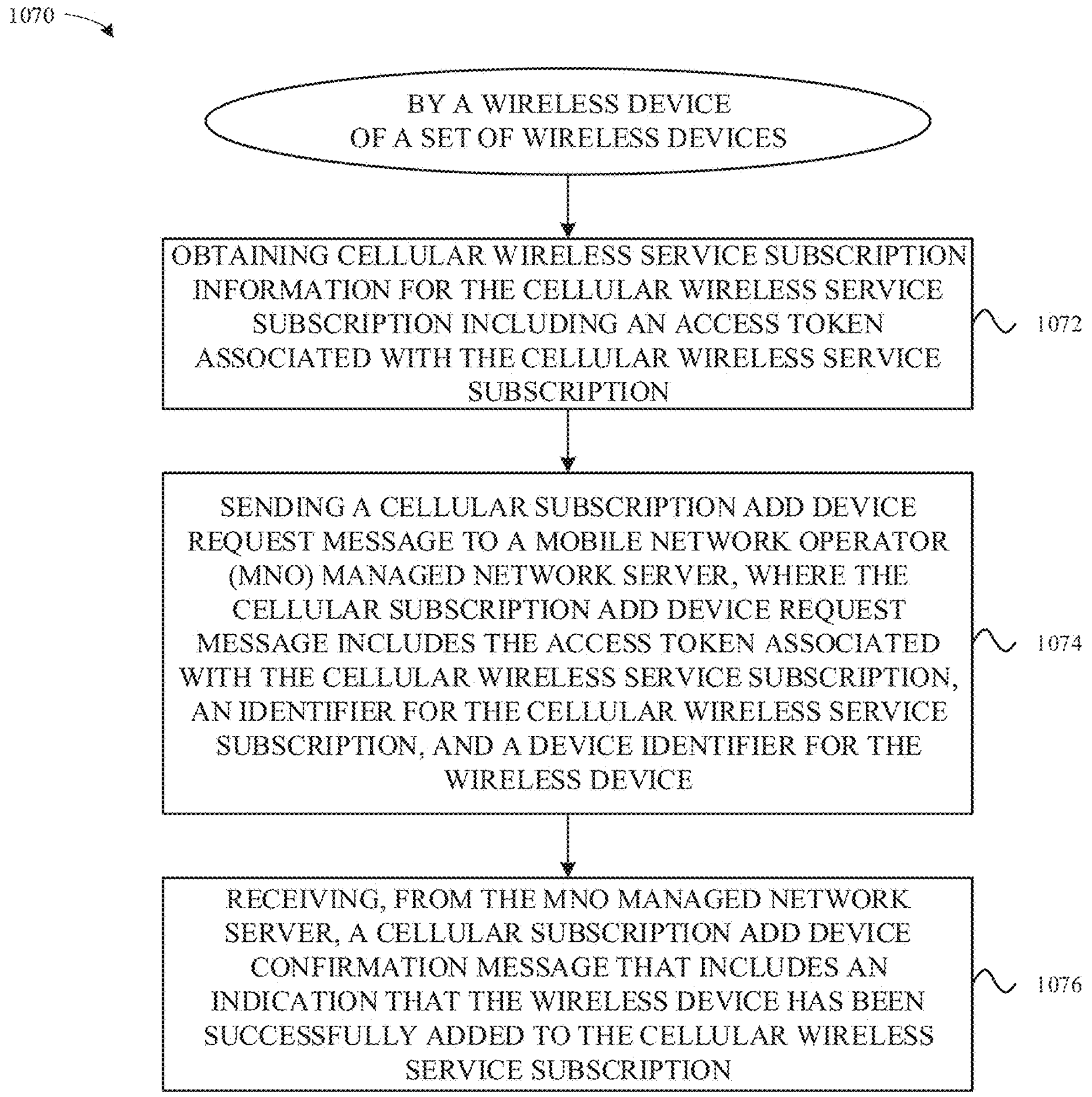
FIGS. 10F and 10G illustrate flowcharts of additional exemplary methods performed by a wireless device to manage a cellular wireless service subscription for access to cellular wireless services of a cellular wireless network, according to some embodiments.

FIG. 10F illustrates a flowchart 1070 of another exemplary method for managing a cellular wireless service subscription for access to cellular wireless services of a cellular wireless network for a wireless device 102E of a set of wireless devices associated with a common user account. At 1072, the wireless device 102E obtains cellular wireless service subscription information for the cellular wireless service subscription including an access token associated with the cellular wireless service subscription. At 1074, the wireless device 102E sends a cellular subscription add device request message to an MNO managed network server 812, where the cellular subscription add device request message includes the access token associated with the cellular wireless service subscription, an identifier for the cellular wireless service subscription, and a device identifier for the wireless device 102E. At 1076, the wireless device 102E receives, from the MNO managed network server 812, a cellular subscription add device confirmation message that includes an indication that the destination wireless device 102E has been successfully added to the cellular wireless service subscription.

In some embodiments, the wireless device 102E obtains the cellular wireless service subscription information from another wireless device 102A in the set of wireless devices associated with the common user account. In some embodiments, the wireless device 102E obtains the cellular wireless service subscription information from a cloud-based service associated with the common user account, e.g., via cloud server 804. In some embodiments, the MNO managed network server 812 includes an MNO HSS 902. In some embodiments, the MNO managed network server 812 maintains a list of ICCID values of cellular wireless access credentials associated with the cellular wireless service subscription. In some embodiments, the MNO managed network server 812 adds an ICCID value for the wireless device 102E to the list of ICCID values associated with the cellular wireless service subscription responsive to successful determination that the wireless device 102E has authority to manage the cellular wireless service subscription based on the access token included in the cellular subscription add device request message.

Figure 10G:
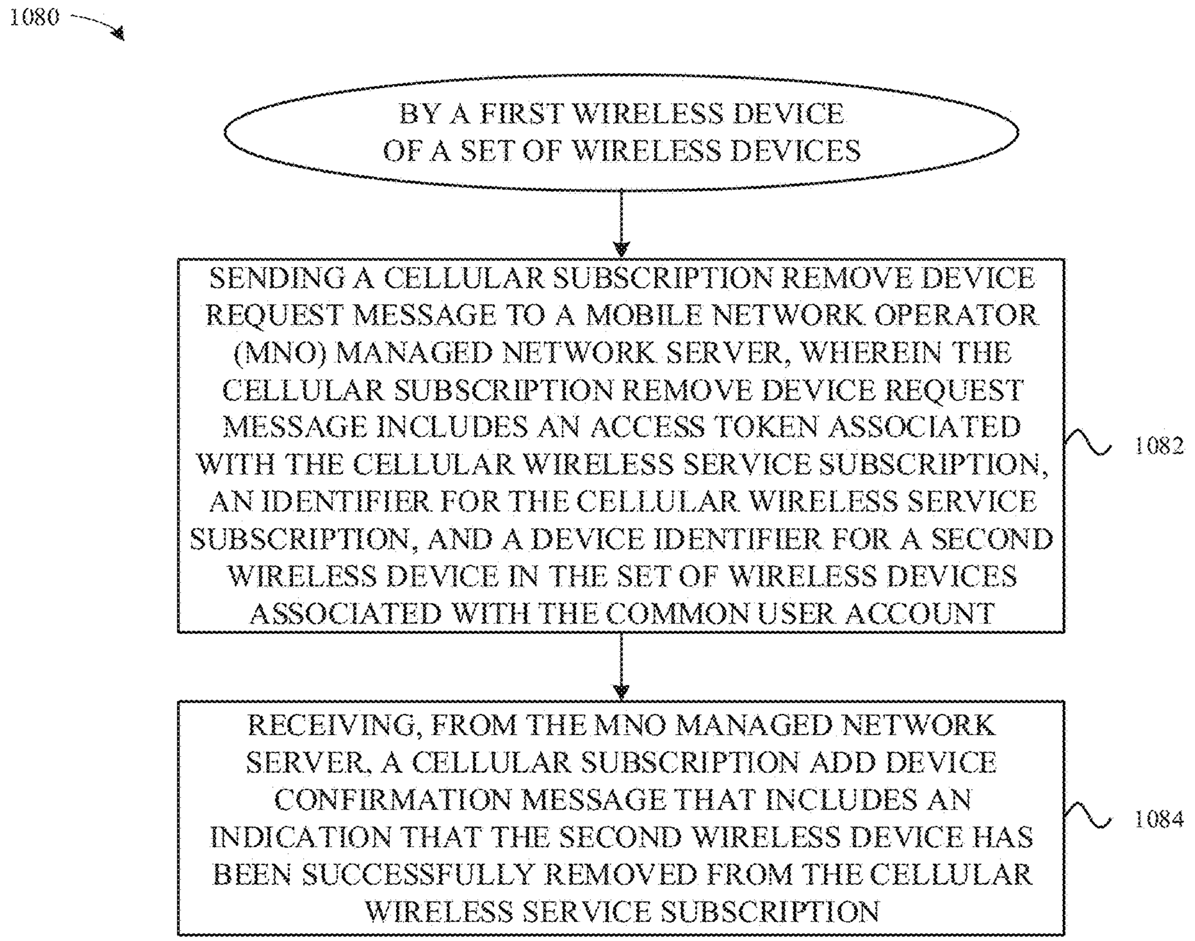

FIG. 10G illustrates a flowchart 1080 of another exemplary method for managing a cellular wireless service subscription for access to cellular wireless services of a cellular wireless network for a set of wireless devices associated with a common user account. At 1082, a first wireless device 102A of the set of wireless devices sends a cellular subscription remove device request message to a MNO managed network server 812, where the cellular subscription remove device request message includes the access token associated with the cellular wireless service subscription, an identifier for the cellular wireless service subscription, and a device identifier for a second wireless device 102E in the set of wireless devices associated with the common user account. At 1084, the first wireless device 102A receives, from the MNO managed network server 812, a cellular subscription remove device confirmation message that includes an indication that the second wireless device 102E has been successfully removed from the cellular wireless service subscription.

In some embodiments, the MNO managed network server 812 includes an MNO HSS 902. In some embodiments, the MNO managed network server 812 maintains a list of ICCID values of cellular wireless access credentials associated with the cellular wireless service subscription. In some embodiments, the MNO managed network server 812 removes an ICCID value for the second wireless device 102E from the list of ICCID values associated with the cellular wireless service subscription responsive to successful determination that the first wireless device 102A has authority to manage the cellular wireless service subscription based on the access token included in the cellular subscription remove device request message.

In some embodiments, CSS management of one or more cellular wireless service subscriptions for one or more wireless devices can occur at a user device, e.g., via a laptop computer, interacting with one or more MNO managed network servers. CSS management can include causing cellular wireless service for a cellular wireless service subscription to switch from a first (originating) wireless device to a second (destination) wireless device. In some cases, CSS management is performed to switch which wireless device is active for the cellular wireless service subscription. CSS management can be realized through a device associated with a common user account, where the device need not have cellular wireless capability, e.g., such as a laptop computer. CSS management can also occur via one of the wireless devices in the set of one or more wireless devices that are associated with a common user account, e.g., a cloud service account and/or an MNO cellular wireless service subscription account. A CSS software service can provide for controlling cellular services switching for one or more cellular wireless service subscriptions. In some embodiments, a user can dedicate a cellular wireless service subscription to a particular wireless device, e.g., a mobile phone, and an additional cellular wireless service subscription to be shared among one or more additional wireless devices, e.g., among a set of wearable wireless devices. Cellular service subscription information may be loaded and maintained in at least one wireless device of a set of associated wireless devices to provide CSS management, independent of whether the cellular wireless service subscription will be activated on the at least one wireless device providing the CSS management. For example, a first wireless device can be loaded with cellular wireless service subscription information for multiple cellular wireless service subscriptions, and the loaded cellular wireless service subscription information can be maintained at least in part by the first wireless device for cellular service switching purposes among other wireless devices in a set of wireless devices. In some embodiments, cellular wireless service subscription information and/or activation status for cellular wireless service subscriptions of a set of wireless devices can be maintained on a cloud service server that is accessible via external networks, e.g., the Internet, for a user to access and initiate cellular wireless service switching between different cellular capable wireless devices. In some cases, one or more of multiple cellular wireless service subscriptions may not be active on any of the set of wireless devices, and a user may later select via the CSS software service on which device (or devices) to activate a particular cellular wireless service subscription. In some embodiments, the CSS software service can be used to deactivate a cellular wireless service subscription on all wireless devices in a set of wireless devices associated with a common user account, such as when the user wants to stop use (or suspend use) of the cellular wireless service subscription on all the associated wireless devices. A cellular wireless service subscription referred to herein includes any cellular wireless network identity module and/or MNO cellular wireless subscription plan that can be used to provide to a user access to cellular wireless network services, independent of whether the access is hardware-based, software-based, and/or virtual-based.

Figure 11:
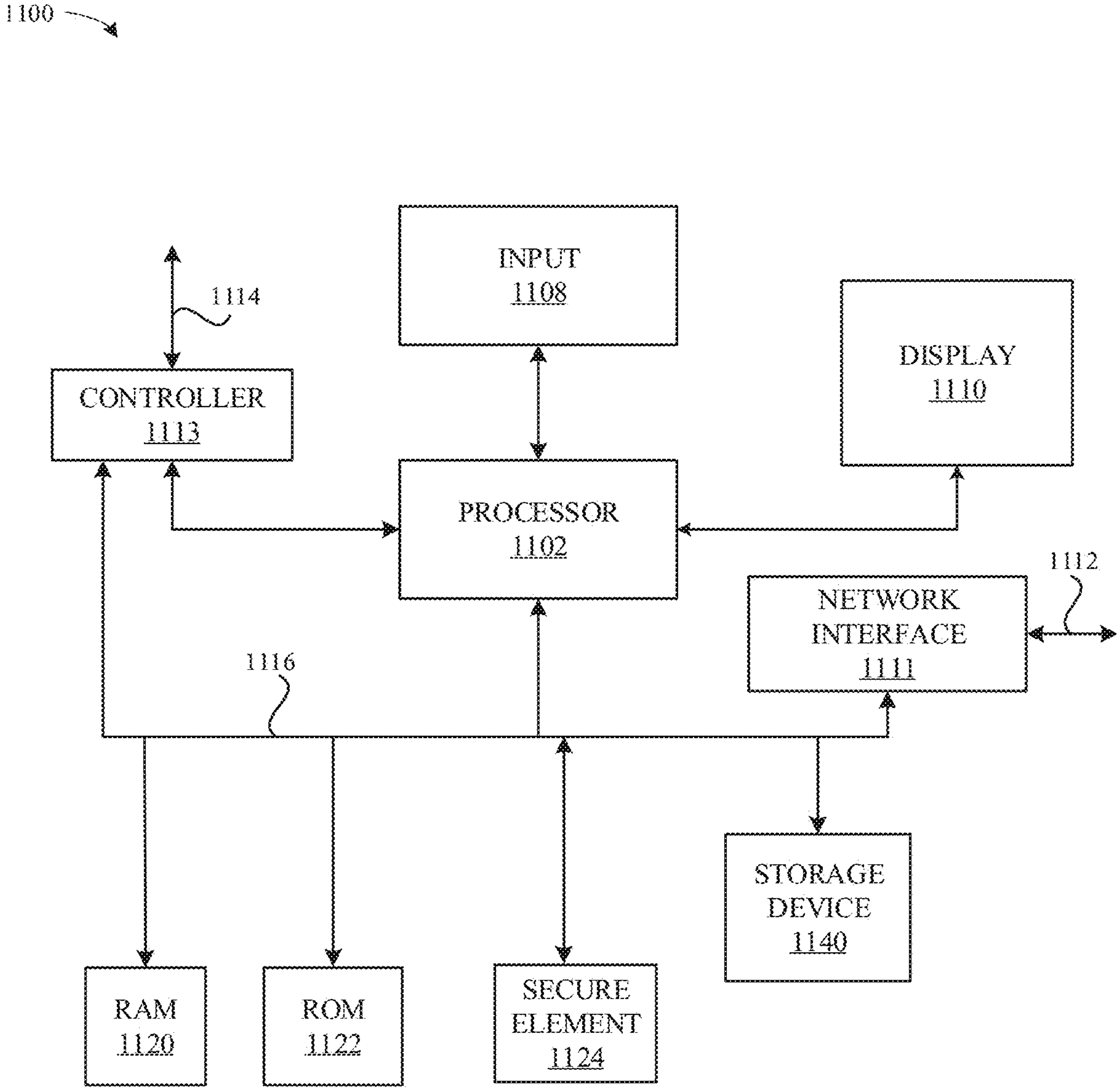
FIG. 11 illustrates a block diagram of exemplary elements of a wireless device, according to some embodiments.

FIG. 11 illustrates a detailed view of a representative computing device 1100 that can be used to implement various methods described herein, according to some embodiments. In particular, the detailed view illustrates various components that can be included in the wireless device 102, any of the wireless devices 102A, 102B, 102C, 102D, 102E, an originating wireless device 502, a destination wireless device 504, a default destination wireless device 534, a best candidate destination wireless device 536, or any other wireless device as discussed herein. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 that can be controlled by the processor 1102 to display information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that communicatively couples to a data link 1112. In the case of a wireless connection, the network/bus interface 1111 can include a wireless transceiver.

The computing device 1100 also includes a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element (SE) 1124, which can represent secure storage for credentials for cellular wireless system access by the computing device 1100. The secure element 1124 can include an eUICC 108 on which to store one or more eSIMs 208, one or more UICCs 118 that store SIM or eSIM credentials (profiles), and/or a processor and/or chip component in a system on chip (SoC) module that stores iSIM credentials (profiles).

Wireless Terminology

In accordance with various embodiments described herein, the terms “wireless communication device,” “wireless device,” “mobile wireless device,” “mobile station,” and “user equipment” (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an “ad hoc” wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Cellular wireless access credentials to provide access to cellular wireless services of a cellular wireless service provider can be installed in a wireless device in a variety of forms including but not limited to a universal integrated circuit card (UICC) storing a subscriber identity module (SIM), an embedded UICC (eUICC) storing an electronic SIM (eSIM), or in hardware, such as a processor of system on chip (SoC) module storing an integrated SIM (iSIM). The embodiments described herein can apply to all of these type of implementations. A UICC storing a SIM can also be referred to as a SIM card. A SIM, eSIM, or iSIM can also be referred to as a SIM profile, an eSIM profile, or an iSIM profile respectively, or simply as a profile.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing a cellular wireless service subscription for access to cellular wireless services of a cellular wireless network for a set of wireless devices associated with a common user account, the method comprising:

by an originating wireless device of the set of wireless devices:

determining one or more criteria for switching the cellular wireless service subscription from the originating wireless device to a destination wireless device of the set of wireless devices are satisfied;

disabling cellular wireless service access for the cellular wireless service subscription locally at the originating wireless device;

sending, via a local non-cellular wireless connection to the destination wireless device, a cellular wireless service switching request message; and receiving, via the local non-cellular wireless connection from the destination wireless device, a cellular wireless service switching confirmation message that includes an indication that the cellular wireless service subscription switched successfully to the destination wireless device.

2. The method of claim 1, wherein:

a mobile network operator (MNO) managed network server maintains a list of integrated circuit card identifier (ICCID) values of cellular wireless access credentials associated with the cellular wireless service subscription;

the list of ICCID values includes an ICCID value for a first cellular wireless access credential of the originating wireless device and a second ICCID value for a second cellular wireless access credential at the destination wireless device;

the first cellular wireless access credential of the originating wireless device is designated as active and the second cellular wireless access credential of the destination wireless device is designated as inactive prior to switching the cellular wireless service subscription from the originating wireless device to the destination wireless device; and the first cellular wireless access credential of the originating wireless device is designated as inactive and the second cellular wireless access credential of the destination wireless device is designated as active after switching the cellular wireless service subscription from the originating wireless device to the destination wireless device.

3. The method of claim 2, wherein:

the originating wireless device is allowed to access cellular wireless services of the cellular wireless network via the first cellular wireless access credential when the first cellular wireless access credential is active; and the originating wireless device is disallowed from accessing cellular wireless services of the cellular wireless network via the first cellular wireless access credential when the first cellular wireless access credential is inactive.

4. The method of claim 1, wherein disabling the cellular wireless service access for the cellular wireless service subscription locally at the originating wireless device occurs after sending the cellular wireless service switching request message.

5. The method of claim 4, wherein the cellular wireless network triggers de-registration of the originating wireless device from access to cellular wireless services associated with the cellular wireless service subscription in conjunction with registration of the destination wireless device to access cellular wireless services associated with the cellular wireless service subscription.

6. The method of claim 1, further comprising:

by the originating wireless device:

presenting, via a display of the originating wireless device prior to switching the cellular wireless service subscription to the destination wireless device, a list of wireless devices in the set of wireless devices associated with the cellular wireless service subscription with an indication that the cellular wireless service subscription is active for the originating wireless device; and wherein determining the one or more criteria for switching the cellular wireless service subscription from the originating wireless device to the destination wireless device are satisfied comprises receiving a selection of the destination wireless device, from the list of wireless devices, to which to switch the cellular wireless service subscription.

7. The method of claim 1, further comprising:

by the originating wireless device, prior to initiating transfer of the cellular wireless service subscription to the destination wireless device:

obtaining, from an MNO managed network server of the cellular wireless network via an MNO entitlement and authentication server of the cellular wireless network, an access token associated with the cellular wireless service subscription; and providing the access token to the destination wireless device, wherein the destination wireless device uses the access token to authenticate with the MNO entitlement and authentication server prior to the cellular wireless service subscription switching successfully to the destination wireless device.

8. The method of claim 7, wherein the originating wireless device provides the access token to the destination wireless device indirectly via a cloud-based service associated with the common user account by:

storing the access token securely at the cloud-based service associated with the common user account prior to initiating transfer of the cellular wireless service subscription to the destination wireless device, wherein the destination wireless device obtains the access token from the cloud-based service.

9. The method of claim 7, wherein the originating wireless device provides the access token to the destination wireless device directly via a local non-cellular wireless connection.

10. The method of claim 1, wherein determining the one or more criteria for switching the cellular wireless service subscription from the originating wireless device to the destination wireless device are satisfied comprises:

detecting a battery level of the originating wireless device satisfies a battery threshold or the originating wireless device is being powered off; and the destination wireless device is reachable by the originating wireless device.

11. The method of claim 1, wherein determining the one or more criteria for switching the cellular wireless service subscription from the originating wireless device to the destination wireless device are satisfied comprises:

detecting the originating wireless device is not being worn or not actively used; and the destination wireless device is reachable by the originating wireless device.

12. The method of claim 1, wherein the one or more criteria for switching the cellular wireless service subscription from the originating wireless device to the destination wireless device are satisfied comprises one or more of:

the originating wireless device satisfies a critical thermal condition;

the originating wireless device and the destination wireless device satisfy a proximity distance threshold;

the destination wireless device is being worn;

a particular application is initiated on the destination wireless device;

a battery level of the destination wireless device satisfies a battery level difference threshold relative to a corresponding battery level of the originating wireless device;

a maximum battery capacity of the destination wireless device exceeds a corresponding maximum battery capacity of the originating wireless device by a battery capacity difference threshold; or a cellular wireless connection capacity for the destination wireless device exceeds a corresponding cellular wireless connection capacity for the originating wireless device by a cellular capacity difference threshold.

13. The method of claim 1, wherein:

the originating wireless device disables cellular wireless service access for the cellular wireless service subscription locally at the originating wireless device while a cellular wireless connection with the cellular wireless network via the cellular wireless service subscription is active and without performing a deregistration procedure with a network server of the cellular wireless network associated with the cellular wireless service subscription; and the cellular wireless service switching request message, sent to the destination wireless device by the originating wireless device, includes cellular context information for the destination wireless device to use to resume the cellular wireless connection with the cellular wireless network.

14. The method of claim 13, wherein the cellular context information includes one or more of: network access stratum (NAS) layer information, access stratum (AS) layer information, or cellular subscription information required for the destination wireless device to resume the cellular wireless connection with the cellular wireless network.

15. An originating wireless device of a set of wireless devices, the originating wireless device configured to manage a cellular wireless service subscription for access to cellular wireless services of a cellular wireless network for the set of wireless devices associated with a common user account by at least:

determining one or more criteria for switching the cellular wireless service subscription from the originating wireless device to a destination wireless device of the set of wireless devices are satisfied;

disabling cellular wireless service access for the cellular wireless service subscription locally at the originating wireless device;

sending, via a local non-cellular wireless connection to the destination wireless device, a cellular wireless service switching request message; and receiving, via the local non-cellular wireless connection from the destination wireless device, a cellular wireless service switching confirmation message that includes an indication that the cellular wireless service subscription switched successfully to the destination wireless device.

16. The originating wireless device of claim 1, wherein determination of the one or more criteria for switching the cellular wireless service subscription from the originating wireless device to the destination wireless device are satisfied comprises:

detecting a battery level of the originating wireless device satisfies a battery threshold or the originating wireless device is being powered off; and the destination wireless device is reachable by the originating wireless device.

17. The originating wireless device of claim 15, wherein determination of the one or more criteria for switching the cellular wireless service subscription from the originating wireless device to the destination wireless device are satisfied comprises:

detecting the originating wireless device is not being worn or not actively used; and the destination wireless device is reachable by the originating wireless device.

18. The originating wireless device of claim 15, wherein the one or more criteria for switching the cellular wireless service subscription from the originating wireless device to the destination wireless device are satisfied comprises one or more of:

the originating wireless device satisfies a critical thermal condition;

the originating wireless device and the destination wireless device satisfy a proximity distance threshold;

the destination wireless device is being worn;

a particular application is initiated on the destination wireless device;

a battery level of the destination wireless device satisfies a battery level difference threshold relative to a corresponding battery level of the originating wireless device;

a maximum battery capacity of the destination wireless device exceeds a corresponding maximum battery capacity of the originating wireless device by a battery capacity difference threshold; or a cellular wireless connection capacity for the destination wireless device exceeds a corresponding cellular wireless connection capacity for the originating wireless device by a cellular capacity difference threshold.

19. The originating wireless device of claim 15, wherein:

the originating wireless device disables cellular wireless service access for the cellular wireless service subscription locally at the originating wireless device while a cellular wireless connection with the cellular wireless network via the cellular wireless service subscription is active and without performing a deregistration procedure with a network server of the cellular wireless network associated with the cellular wireless service subscription; and the cellular wireless service switching request message, sent to the destination wireless device by the originating wireless device, includes cellular context information for the destination wireless device to use to resume the cellular wireless connection with the cellular wireless network.

20. The originating wireless device of claim 19, wherein the cellular context information includes one or more of: network access stratum (NAS) layer information, access stratum (AS) layer information, or cellular subscription information required for the destination wireless device to resume the cellular wireless connection with the cellular wireless network.

* * * * *